(12) United States Patent
Takeuchi et al.

(10) Patent No.: US 6,453,100 B1
(45) Date of Patent: Sep. 17, 2002

(54) DISPLAY DEVICE AND METHOD FOR PRODUCING THE SAME

(75) Inventors: Yukihisa Takeuchi, Nishikamo-gun; Hiroyuki Tsuji, Nagoya; Tsutomu Nanataki, Toyoake; Twao Ohwada, Nagoya; Nobutoshi Toyama, Nagoya; Nobuchika Noguchi, Ichinomiya, all of (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 09/539,150

(22) Filed: Mar. 30, 2000

(30) Foreign Application Priority Data

Mar. 27, 2000 (JP) ........................................ 2000-087623

(51) Int. Cl.[7] .......................... G20B 6/04; G20B 26/08; G09G 3/34
(52) U.S. Cl. ........................ 385/120; 345/85; 359/222
(58) Field of Search .............................. 385/16–19, 30, 385/40, 41, 120; 359/222–224; 345/85

(56) References Cited

U.S. PATENT DOCUMENTS

| | | | |
|---|---|---|---|
| 5,106,181 A | * | 4/1992 | Rockwell, III .................. 385/2 |
| 5,210,455 A | | 5/1993 | Takeuchi et al. |
| 5,600,197 A | | 2/1997 | Takeuchi et al. |
| 5,638,199 A | | 6/1997 | Tsubota et al. |
| 5,862,275 A | | 1/1999 | Takeuchi et al. |
| 5,953,469 A | * | 9/1999 | Zhou ............................. 385/22 |
| 6,028,978 A | | 2/2000 | Takeuchi et al. |
| 6,089,090 A | | 7/2000 | Takeuchi et al. |
| 6,091,182 A | | 7/2000 | Takeuchi et al. |
| 6,108,479 A | * | 8/2000 | Takeuchi et al. ............. 385/129 |
| 6,226,080 B1 | | 5/2001 | Takeuchi et al. |

FOREIGN PATENT DOCUMENTS

| | | | |
|---|---|---|---|
| JP | 4-53675 | 12/1992 | |
| JP | 7-287176 | 10/1995 | |
| JP | 8-17086 | 2/1996 | |
| JP | 10-78549 | 3/1998 | |
| JP | 10-307542 A | * 11/1998 | ............. G09F/9/00 |
| JP | 11-194723 | 7/1999 | |
| JP | 11327448 A | 11/1999 | |

OTHER PUBLICATIONS

Kazuo Anzai, "Preparation of Electronic Materials by Electrophoretic Deposition," General Institute of Toshiba Corporation, Denki Kagaku 53, No. 1, 1985, pp. 63 to 68.

Atsushi Goto, et al., "$PbZrO_3/PbTiO_3$ Composite Ceramics Fabricated by Electrophoretic Deposition," Tokyo Metropolitan University, Tokyo Medical and Dental University, Proceedings of First Symposium on Higher–Order Ceramic Formation Method Based on Electrophoresis, 1998, pp. 5 and 6.

Kimihiro Yamashita, "Hybridization of Ceramics by Electrophoretic Deposition," Institute for Medical and Dental Engineering, Tokyo Medical and Dental University, Proceedings of First Symposium on Higher–Order Ceramic Formation Method Based on Electrophoresis, 1998, pp. 23 and 24.

* cited by examiner

*Primary Examiner*—Hemang Sanghavi
*Assistant Examiner*—Omar Rojas, Jr.
(74) *Attorney, Agent, or Firm*—Burr & Brown

(57) ABSTRACT

A large number of display components are arranged and fixed, for example, in a matrix configuration on a first principal surface of a large optical guide plate to construct a main display device body. A substance having a light-transmitting property adjusted for its refractive index is allowed to intervene at least between the large optical guide plate and the display components. The refractive index of the substance is preferably similar to the refractive index of the large optical guide plate as closely as possible. As for the light-transmitting property of the substrate, it is preferable that the transmittance is not less than 50% for the perpendicular incident light at the wavelength in the visible light region, and it is more preferable that the transmittance is not less than 70%, in order to successfully introduce the light into the display component and suppress the electric power consumption.

81 Claims, 56 Drawing Sheets

FIG. 13

| OFFSET POTENTIAL | ON SIGNAL | OFF SIGNAL |
|---|---|---|
| | 60V | 0V |
| 50V | -10V (LIGHT EMISSION) | 50V (LIGHT OFF) |

Pa<Pc<Pb
Pa<Pd<Pb

DISPLAY DEVICE AND METHOD FOR PRODUCING THE SAME

BACKGROUND OF THE INVENTION

1. Field of the Invention

The present invention relates to a display device and a method for producing the same. In particular, the present invention relates to a display device and a method for producing the same to be preferably used for producing a large screen display device by arranging a large number of display components having an optical waveguide plate for introducing light from a light source thereinto.

2. Description of the Related Art

Those hitherto known as the display device include, for example, cathode ray tubes (CRT) and liquid crystal display devices.

Those known as the cathode ray tube include, for example, ordinary television receivers and monitor units for computers. Although the cathode ray tube has a bright screen, it consumes a large amount of electric power. Further, the cathode ray tube involves a problem such that the depth of the entire display device is large as compared with the size of the screen.

On the other hand, the liquid crystal display device is advantageous in that the entire device can be miniaturized, and the display device consumes a small amount of electric power. However, the liquid crystal display device involves problems in that it is inferior in brightness of the screen, and the field angle of the screen is narrow.

In the case of the cathode ray tube and the liquid crystal display device, it is necessary for a color screen to use a number of picture elements (image pixels) which is three times a number of picture elements used in a black-and-white screen. For this reason, other problems occur, for example, the device itself is complicated, a great deal of electric power is consumed, and it is inevitable to cause the increase in cost.

In order to solve the problems described above, the present applicant has suggested a novel display device (see, for example, Japanese Laid-Open Patent Publication No. 7-287176). As shown in FIG. 56, this display device includes actuator elements 400 arranged for respective picture elements. Each of the actuator elements 400 comprises a main actuator element 408 including a piezoelectric/electrostrictive layer 402 and an upper electrode 404 and a lower electrode 406 formed on upper and lower surfaces of the piezoelectric/electrostrictive layer 402 respectively, and a substrate 414 including a vibrating section 410 and a fixed section 412 disposed under the main actuator element 408. The lower electrode 406 of the main actuator element 408 contacts with the vibrating section 410. The main actuator element 408 is supported by the vibrating section 410.

The substrate 414 is composed of ceramics in which the vibrating section 410 and the fixed section 412 are integrated into one unit. A recess 416 is formed in the substrate 414 so that the vibrating section 410 is thin-walled.

A displacement-transmitting section 420 for obtaining a predetermined size of contact area with respect to an optical waveguide plate 418 is connected to the upper electrode 404 of the main actuator element 408. In the illustrative display device shown in FIG. 56, the displacement-transmitting section 420 is arranged such that it is located closely near to the optical waveguide plate 418 in the OFF selection state or the unselection state in which the actuator element 400 stands still, while it contacts with the optical waveguide plate 418 in the ON selection state at a distance of not more than the wavelength of the light.

The light 422 is introduced, for example, from a lateral end of the optical waveguide plate 418. In this arrangement, all of the light 422 is totally reflected at the inside of the optical waveguide plate 418 without being transmitted through front and back surfaces thereof by controlling the magnitude of the refractive index of the optical waveguide plate 418. In this state, a voltage signal corresponding to an attribute of an image signal is selectively applied to the actuator element 400 by the aid of the upper electrode 404 and the lower electrode 406 so that the actuator element 400 is allowed to make a variety of displacement actions in conformity with the ON selection, the OFF selection, and the unselection. Thus, the displacement-transmitting section 420 is controlled for its contact and separation with respect to the optical waveguide plate 418. Accordingly, the scattered light (leakage light) 424 is controlled at a predetermined portion of the optical waveguide plate 418, and a picture image corresponding to the image signal is displayed on the optical waveguide plate 418.

When a color picture is displayed by using the display component, the following operation is performed. That is, for example, light sources for the three primary colors are switched to control the light emission time for the three primary colors, while synchronizing the contact time between the optical waveguide plate and the displacement-transmitting section with the cycle of color development. Alternatively, the contact time between the optical waveguide plate and the displacement-transmitting section is controlled, while synchronizing the light emission time for the three primary colors with the color development cycle.

Therefore, the illustrative display component suggested by the present applicant is advantageous in that it is unnecessary to increase the number of picture elements as compared with the black-and-white screen, even when the display device is applied to the color display system.

A large number of techniques have been hitherto suggested and practically used in order to produce a large screen display component by arranging a large number of display components (see, for example, Japanese Utility Model Publication No. 4-53675 and Japanese Laid-Open Patent Publication No. 8-17086).

However, when the large screen display device is produced by arranging a large number of display components having the optical waveguide plate as described above, the following problem arises. That is, if the display components are merely assembled with an adhesive or the like, then the light leaks at a boundary portion (juncture portion) of the optical waveguide plate, and the juncture portion is conspicuous.

It is also necessary that the design is made while considering such a feature that any disabled display component can be easily replaced with a new one.

Further, when a large screen display device is installed in a variety of districts, the production cost is effectively reduced if constitutive parts are transported to a working site, and the large screen display device is successfully assembled at the working site, as compared with a case in which the large screen display device is assembled in a factory, and it is transported therefrom.

SUMMARY OF THE INVENTION

The present invention has been made taking the foregoing problems into consideration, an object of which is to provide a display device and a method for producing the same which make it possible to allow a juncture portion between display components to be scarcely conspicuous when a large screen display device is produced by arranging the plurality of display components.

Another object of the present invention is to provide a display device excellent in repair performance and a method for producing the same which make it possible to easily exchange a disabled display component with new one, in addition to the requirement described above.

Still another object of the present invention is to provide a display device and a method for producing the same which make it possible to assemble the display device at a working site and effectively reduce the production cost.

According to the present invention, there is provided a display device comprising a main display device body including two or more display components arranged on a first principal surface of an optical guide plate for introducing light from a light source thereinto, wherein a substance having a light-transmitting property adjusted for its refractive index is allowed to intervene at least between the optical guide plate and the display components.

In this arrangement, the main display device body can be easily produced by arranging the display components along the first principal surface, while a display surface of the display component is opposed to the first principal surface of the optical guide plate for introducing the light from the light source thereinto, and the substance having the light-transmitting property adjusted for its refractive index is allowed to intervene between the surfaces.

According to another aspect of the present invention, there is provided a display device comprising a main display device body including two or more display modules arranged on a first principal surface of an optical guide plate for introducing light from a light source thereinto, wherein a substance having a light-transmitting property adjusted for its refractive index is allowed to intervene at least between the optical guide plate and the display modules.

In this arrangement, the main display device body can be easily produced by arranging the display modules along the first principal surface, while a display surface of the display module is opposed to the first principal surface of the optical guide plate for introducing the light from the light source thereinto, and the substance having the light-transmitting property adjusted for its refractive index is allowed to intervene between the surfaces.

The display module can be easily produced by arranging the display components along a first principal surface of a module optical guide plate, while a display surface of the display component is opposed to the first principal surface of the module optical guide plate for introducing the light from the light source thereinto, and a second substance having a light-transmitting property adjusted for its refractive index is allowed to intervene between the surfaces.

In the display device of the present invention described above, when the refractive index of the substance is adjusted to be substantially the same as the refractive index of the optical guide plate, it is possible to obtain a large screen display device in which the juncture portion of the display components or the display modules is scarcely conspicuous when the large screen display device is produced by arranging the plurality of display components or the plurality of display modules are arranged to produce the large screen display device.

The display module may be constructed by arranging two or more display components on a first principal surface of a module optical waveguide plate for introducing the light from the light source thereinto, and a second substance having a light-transmitting property adjusted for its refractive index is allowed to intervene at least between the module optical waveguide plate and the display components.

In the display device according to the present invention, it is preferable to use a display component described, for example, especially in Japanese Laid-Open Patent Publication Nos. 10-78549 and 11-194723. That is, the display component described in these patent documents comprises an optical waveguide plate for introducing light from a light source thereinto, a ceramic substrate provided opposingly to a back surface of the optical waveguide plate, and a large number of picture element assemblies arranged between the optical waveguide plate and the ceramic substrate. Any warpage occurs in the ceramic substrate in some cases due to the shrinkage phenomenon during the sintering. Any warpage also occurs in the entire display component resulting therefrom in some cases.

However, in the display device according to the present invention, when an adhesive is used as the substance or the second substance having the light-transmitting property adjusted for its refractive index, the display component is consequently secured with the adhesive to the optical guide plate or the module optical waveguide plate. Therefore, for example, the entire first principal surface (display surface) of the optical waveguide plate of each of the display components is secured to the optical guide plate with the adhesive intervening therebetween. At this stage, the warpage, which has occurred in the display component, is absorbed by the adhesive. Thus, the display component is tightly secured to the optical guide plate.

It is also preferable that the optical guide plate includes a plurality of divided optical guide plates which are arranged in a matrix configuration, and the plurality of divided optical guide plates are secured to one another with an adhesive having a light-transmitting property adjusted for its refractive index.

The substance having the light-transmitting property adjusted for its refractive index will now be explained. At first, as for the refractive index of the substance, it is preferable that the difference between the refractive index of the optical guide plate and the refractive index of the substance is decreased to be as small as possible, in order to avoid any sense of incongruity at the juncture of the display components or the display modules or at the juncture of the divided optical guide plates. The allowable difference in refractive index also relates to the thickness of the optical guide plate. However, assuming that the refractive index of the optical guide plate is $N_1$, the sense of incongruity can be generally avoided at the juncture if the refractive index $N_2$ of the substance satisfies the following expression:

$$0.9N_1 \leq N_2 \leq 1.1N_1$$

In addition to the effect described above, the thickness of the optical guide plate can be increased, and the assembling performance and the stability of the structure after the assembling are improved, if the refractive index $N_2$ of the substance satisfies the following expression:

$$0.99N_1 \leq N_2 \leq 1.01N_1$$

On the other hand, the juncture of the display components or the display modules or the juncture of the divided optical guide plates involves such a structural problem that the display components or the display modules are arranged. For this reason, the pitch of the picture element ranging over the juncture is larger than the ordinary pitch of the picture element, and the juncture is conspicuous in many cases. Accordingly, the refractive index is preferably adjusted to satisfy the following expression:

$$N_1 < N_2 \leq 1.01 N_1$$

Accordingly, when the light emitted from the picture element passes through the juncture portion, the light is refracted in accordance with the relationship of the refractive indexes adjusted as described above. At the stage at which the light outgoes from the display surface, the pitch of the picture element ranging over the juncture consequently approaches the ordinary pitch of the picture element. Thus, it is possible to mitigate the sense of incongruity at the juncture.

The light-transmitting property of the substance is preferably determined in order that the light is successfully introduced up to the display component in an efficient manner, and the electric power consumption is suppressed. That is, it is preferable that the transmittance is not less than 50% for the incident light at the right angle at the wavelength in the visible light region. It is more preferable that the transmittance is not less than 70%.

The form of the substance may be any one of gas, liquid, and solid, or it may be a mixture thereof, provided that the substance satisfies the foregoing conditions.

The shape of the divided optical guide plate may be any one including, for example, rectangular parallelepiped, prism, column, and truncated pyramid, provided that the display component or the display module can be secured thereto, and the display component or the display module can be stacked in a stable manner. However, the shape is preferably rectangular parallelepiped in view of the machining performance and the assembling performance.

In view of the assembling performance and the repair performance, the size of the divided optical guide plate is preferably a size having a length of 40 mm to 500 mm and a width of 40 mm to 500 mm. The thickness is preferably 2 mm to 40 mm in order to satisfy both of the assembling performance and the disappearance of the sense of incongruity at the juncture.

The material for the optical guide plate, the divided optical guide plate, or the module optical waveguide plate may be either an inorganic material or an organic material, provided that the light-transmitting property is satisfactory at the wavelength in the visible light region. Specifically, it is possible to use a simple substance or a combined material composed of, for example, glass, quartz, light-transmitting alumina, acrylic resin, methacrylic resin, polycarbonate, vinyl chloride resin, phenol resin, vinyl acetate resin, ABS, fluororesin, and unsaturated polyester resin. Especially, in view of the cost and the machining performance, it is preferable to use glass, acrylic resin, and methacrylic resin. As for the glass, it is preferable to use, for example, Vycor glass, 96% silicate glass, alumino silicate glass, borosilicate glass, zinc borosilicate glass, and barium borosilicate glass. As for the light-transmitting property, it is preferable that the transmittance is not less than 50% for the perpendicular incident light at the wavelength in the visible light region. It is more preferable that the transmittance is not less than 70%.

Explanation will now be made for the adhesive for securing the display component to the module optical waveguide plate and the adhesive as the substance, or the adhesive for securing the divided optical guide plates to one another. The adhesive herein has the meaning including adhesive, glue or sticker, adhesive to be solidified after curing, adhesive to be flexible after curing, rubber-like adhesive, and gel-like adhesive.

The curing method is not specifically limited, including, for example, those of the types of UV setting, hot setting, cold setting, condensation setting, addition setting, and two-part setting.

The material may be either an inorganic material or an organic material, provided that the light-transmitting property is satisfactory at the wavelength in the visible light region. It is preferable to use those which have high insulating performance and low ignitability. It is more preferable to use those which are excellent in wettability with respect to the optical guide plate and which are stable for a long period of time, for example, against heat, light, and moisture.

Specifically, it is possible to use a simple substance or a combined material based on, for example, urea-formaldehyde resin, phenol resin, epoxy resin, acrylic resin, methacrylic resin, cyanoacrylate, polyurethane, emulsion, hot melt, synthetic rubber, and natural rubber.

Especially, as for the adhesive for securing the display component to the module optical waveguide plate, it is preferable to use the adhesive to be solidified after curing, in order to avoid any securing discrepancy of the display component. In order to mitigate the thermal expansion, it is preferable to use the adhesive to be flexible after curing and the rubber-like adhesive. As for the adhesive as the substance having the light-transmitting property adjusted for its refractive index, it is preferable to use the adhesive to be flexible after curing, the rubber-like adhesive, and the gel-like adhesive, in order to effect the mitigation of the thermal expansion and the detachment performance upon repair.

In other words, when those to be completely solidified are used as the adhesive, the respective display components and the respective display modules are tightly secured with the adhesive. Therefore, it is possible to obtain the large screen display device having high mechanical strength. However, it is difficult to exchange any disabled display component or any disabled display module with new one. Therefore, such an adhesive is preferably adopted to the large screen display device which assumes the collective exchange all at once.

When those having flexibility are used as the adhesive, then it is possible to obtain the large screen display device having high mechanical strength, and it is easy to perform cutting. Therefore, it is easy to exchange any disabled display component or any disabled display module with new one. Therefore, such an adhesive is excellent in the repair performance. Further, such an adhesive is effective to mitigate the thermal stress generated by the thermal expansion.

It is preferable that the surface of the optical guide plate, the module optical waveguide plate, or the divided optical guide plate is coated with a hard coating material. Accordingly, it is possible to avoid any scratch on the surface of each of the optical guide plates. For example, it is possible to previously avoid such a phenomenon that the white dot locally appears when the black is displayed, or the brightness is increased as a whole.

The coating of the hard coating material referred to herein means the formation of a film or coating of a material having a hardness higher than that of the material for the optical guide plate on the surface of the optical guide plate. The coating on the front and back surfaces of the optical guide plate is important to avoid the scratch. However, it is not necessarily indispensable to apply the coating to the end surfaces. Specifically, those usable as the hard coating material include, for example, acrylic hard coating materials and silicone hard coating materials.

It is preferable that the end surface of the module optical waveguide plate or the divided optical guide plate is mirror-finished. Accordingly, it is possible to lower, up to the level of no sense of incongruity, the leakage of light from the juncture between the module optical waveguide plates or the divided optical guide plates. Thus, the juncture is scarcely conspicuous. Further, it is also possible to ensure a desired angle of visibility. In the mirror-finishing, in order to avoid any sense of incongruity at the juncture, it is preferable that Rmax is not more than 0.3, and it is more preferable that Rmax is not more than 0.05.

Further, it is preferable that when the module optical waveguide plate or the divided optical guide plate is machined, then the dimensional accuracy of the module optical waveguide plate or the divided optical guide plate is not more than ±0.1 mm with respect to the reference dimension of 100 mm, the perpendicularity between the end surfaces and between the end surface and the flat surface is not more than 0.1 mm, and the parallelism between the end surfaces and between the flat surfaces is not more than 0.1 mm. It is more preferable that the dimensional accuracy of the module optical waveguide plate or the divided optical guide plate is not more than ±0.03 mm with respect to the reference dimension of 100 mm, the perpendicularity between the end surfaces and between the end surface and the flat surface is not more than 0.03 mm, and the parallelism between the end surfaces and between the flat surfaces is not more than 0.03 mm.

Accordingly, it is possible to decrease the cumulative pitch error of the module optical waveguide plate or the divided optical guide plate during the assembling. As a result, it is possible to reduce the distortion of the image which would be otherwise caused by the discrepancy of the pitch of the picture element. It is possible to decrease the gap dispersion of the juncture, and it is possible to make the juncture to be more inconspicuous.

Alternatively, the substance having the light-transmitting property adjusted for its refractive index may be matching oil. In this arrangement, the obtained mechanical strength is not equivalent to that obtained by the adhesive. However, it is easy to exchange the disabled display component or the disabled display module with new one. Therefore, this arrangement is advantageous in repair performance.

In this arrangement, the matching oil is in a form of liquid or grease. The matching oil may be made of either an inorganic material or an organic material, provided that the light transmittance is satisfactory at the wavelength in the visible light region. It is preferable to use those which have high insulating performance and low ignitability. It is more preferable to use those which are excellent in wettability with respect to the optical guide plate and which are stable for a long period of time, for example, against heat, light, and moisture. Specifically, the matching oil includes, for example, dimethyl silicone oil, methyl phenyl silicone oil, glycerol, di-2-ethylhexyl phthalate, silicone grease, and optical gel.

When the matching oil in a liquid form is used, it is preferable that the viscosity is 100 to 1000 cSt, in order to simultaneously satisfy the two factors, i.e., the bubble generated upon application is easily released, and the liquid neither flow nor trickle excessively.

In the present invention, when the plurality of divided optical guide plates are arranged in the matrix configuration, it is also preferable that vertically ruled and/or horizontally ruled support members are allowed to intervene between at least two of the divided optical guide plates. In this arrangement, it is possible to adopt a method in which the vertically ruled and/or horizontally ruled support members are installed before the plurality of divided optical guide plates are arranged in the matrix configuration, and the support members are arranged so that they are interposed between at least two of the divided optical guide plates to produce the large screen display device.

Accordingly, it is possible to cancel the cumulative pitch error which would be otherwise caused during the process of stacking the divided optical guide plates, owing to the presence of the support members. Further, it is possible to absorb the dimensional dispersion of each of the divided optical guide plates. As a result, it is possible to reduce the distortion of the image which would be otherwise caused by the discrepancy of the pitch of the picture element. It is possible to decrease the gap dispersion of the juncture, and it is possible to make the juncture to be more inconspicuous.

In this arrangement, it is preferable that at least the surface of the support member, to which the end surface of the divided optical guide plate is opposed, is mirror-finished. Accordingly, it is possible to make the juncture to be inconspicuous, and it is possible to ensure the angle of visibility.

It is also preferable that the support member is formed to have a lattice-shaped configuration. In this arrangement, it is possible to tightly hold the divided optical guide plates. Further, it is possible to eliminate the cumulative pitch error in the vertical direction and in the horizontal direction. Furthermore, it is extremely easy to stack the divided optical guide plates, and it is possible to reduce the number of steps.

The support member may be made of either an inorganic material or an organic material, provided that the light-transmitting property is satisfactory at the wavelength in the visible light region. Specifically, it is possible to use a simple substance or a combined material composed of, for example, glass, quartz, light-transmitting alumina, acrylic resin, methacrylic resin, polycarbonate, vinyl chloride resin, phenol resin, vinyl acetate resin, ABS, fluororesin, and unsaturated polyester resin.

The support member is preferably made of the same material as that for the optical guide plate of the divided optical guide plate, for example, in view of the fact that the refractive index is identical, and the coefficient of thermal expansion is identical. As for the light-transmitting property, it is preferable that the transmittance is not less than 50% for the perpendicular incident light at the wavelength in the visible light region. It is more preferable that the transmittance is not less than 70%. The thickness of the support member is preferably 0.5 to 10 mm in order that there is no sense of incongruity at the juncture, and the support member has rigidity as a structural member.

It is also preferable that the display device of the present invention further comprises another optical guide plate arranged for a display surface of the main display device body, wherein a substance having a light-transmitting property adjusted for its refractive index is allowed to exist between the display surface and the another optical guide plate. Those usable as the another optical guide plate may have a structure composed of a transparent vessel filled with the substance having the light-transmitting property adjusted for its refractive index at the inside.

This arrangement is advantageous in that the juncture of the display components or the display modules is inconspicuous. Further, the assembling performance is satisfactory. Especially, when the matching oil is used as the substance having the light-transmitting property adjusted for its refractive index, the repair performance is also satisfactory. In this case, it is preferable to allow a seal member to intervene between the matching oil and the atmospheric air.

The seal member includes adhesive, glue or sticker, adhesive to be solidified after curing, adhesive to be flexible after curing, rubber-like adhesive, and gel-like adhesive. Alternatively, the seal member may be obtained by depositing such a material on a film-shaped member.

The material may be either an inorganic material or an organic material. It is preferable to use a material which does not cause any reaction with a substance to make contact therewith. Specifically, for example, it is possible to use those based on silicone, modified silicone, polysulfide, polyurethane, acrylic, epoxy, SBR, and butyl rubber.

It is preferable that the end of the seal member, which contacts with the atmospheric air, is subjected to surface adjustment with respect to (flushed with) the plane of the optical guide plate, in order that the light traveling in the optical guide plate is reflected at an appropriate angle. When a light-absorbing material is applied to the end, the light, which incomes at an unsuitable angle, can be absorbed. Therefore, it is possible to improve the image quality. In this case, it is unnecessary to make the surface adjustment for the end with respect to the optical guide plate. Accordingly, the degree of freedom of design is increased. Those usable as the light-absorbing material include, for example, pigments and dyes.

The another optical guide plate may be manufactured such that a plurality of divided optical guide plates are arranged in a matrix configuration, and they are secured to one another with an adhesive having a light-transmitting property adjusted for its refractive index.

The another optical guide plate may be made of either an inorganic material or an organic material, provided that the light-transmitting property is satisfactory at the wavelength in the visible light region. Specifically, it is possible to use a simple substance or a combined material composed of, for example, glass, quartz, light-transmitting alumina, acrylic resin, methacrylic resin, polycarbonate, vinyl chloride resin, phenol resin, vinyl acetate resin, ABS, fluororesin, and unsaturated polyester resin.

The another optical guide plate is preferably made of the same material as that for the optical guide plate of the main display device body, for example, in view of the fact that the refractive index is identical, and the coefficient of thermal expansion is identical. As for the light-transmitting property, it is preferable that the transmittance is not less than 50% for the perpendicular incident light at the wavelength in the visible light region. It is more preferable that the transmittance is not less than 70%. The thickness of the another optical guide plate is preferably 0.5 to 10 mm in view of the assembling performance.

When the optical guide plate of the main display device body is constructed by arranging the plurality of divided optical guide plates, it is not necessarily indispensable that the substance having the light-transmitting property adjusted for its refractive index (conveniently referred to as "first substance"), which is allowed to exist between the display surface of the main display device body and the another optical guide plate, is identical with the substance having the light-transmitting property adjusted for its refractive index (conveniently referred to as "second substance") which is allowed to exist at the end surface portion of the divided optical guide plate.

When the first and second substances are composed of different materials, it is preferable that the refractive index $N_3$ of the first substance satisfies the following expression, provided that the refractive index of the optical guide plate of the main display device body is $N_1$, and the refractive index of the another optical guide plate is $N_2$:

$$0.9N_1 \leq N_3 \leq 1.1N_2 (N_1 \leq N_2)$$

or $$0.9N_2 \leq N_3 \leq 1.1N_1 (N_2 \leq N_1)$$

Accordingly, the light can be sufficiently introduced into the display component, and it is possible to ensure the display brightness of the screen. In order to efficiently introduce the light into the display component and suppress the electric power consumption, it is preferable that the transmittance is not less than 50% for the perpendicular incident light at the wavelength in the visible light region. It is more preferable that the transmittance is not less than 70%.

When the first and second substances are composed of mutually different materials, and when the both are liquid, it is possible to prevent them from being mixed with each other by allowing a seal member to intervene between the both. When at least any one of them is solid or when both of them are solid, they are not mixed with each other. Therefore, it is possible to omit the installation of the seal member. When the foregoing conditions are satisfied, the first and second substances may be in any form including gas, liquid, and solid, or they may be a mixture thereof.

In the present invention, it is also preferable that the main display device body is accommodated in a vessel with its at least one surface having transparency; and a substance having a light-transmitting property adjusted for its refractive index is allowed to exist between a display surface of the main display device body and the surface of the vessel having the transparency.

In this arrangement, it is possible to adopt a method in which the main display device body is accommodated in the vessel, and the vessel is filled therein with the substance having the light-transmitting property adjusted for its refractive index to produce the large screen display device.

The surface having the transparency, of the surfaces for constructing the vessel may be made of either an inorganic material or an organic material, provided that the light-transmitting property is satisfactory at the wavelength in the visible light region. Specifically, it is possible to use a simple substance or a combined material composed of, for example, glass, quartz, light-transmitting alumina, acrylic resin, methacrylic resin, polycarbonate, vinyl chloride resin, phenol resin, vinyl acetate resin, ABS, fluororesin, and unsaturated polyester resin.

The surface of the vessel is preferably made of the same material as that for the optical guide plate of the main display device body, for example, in view of the fact that the refractive index is identical, and the coefficient of thermal expansion is identical. As for the light-transmitting property, it is preferable that the transmittance is not less than 50% for the perpendicular incident light at the wavelength in the visible light region. It is more preferable that the transmittance is not less than 70%. The thickness of the surface is preferably 0.5 to 100 mm in view of the assembling performance.

It is also possible to adopt a method comprising allowing a display surface of the main display device body to be opposed to a first principal surface of a plate member having transparency, and allowing a substance having a light-transmitting property adjusted for its refractive index to intervene between the surfaces, wherein the main display device body is fixed, and then a vessel including a constitutive component of the plate member is produced, so that the vessel is filled therein with the substance having the light-transmitting property adjusted for its refractive index to produce a large screen display device.

When matching oil is used as the substance having the light-transmitting property adjusted for its refractive index, it is necessary to allow a seal member to intervene between the substance and the atmospheric air. However, in the arrangement described above, the main display device body is consequently accommodated in the vessel filled with the matching oil. Therefore, it is unnecessary to use the seal member. This arrangement is also advantageous in that the juncture between the display components or between the display modules is inconspicuous. Further, the assembling performance is satisfactory, and the repair performance is satisfactory as well.

It is also preferable to use, as the plate member having the transparency, a member obtained by arranging a plurality of divided plates in a matrix configuration, and securing them to one another with an adhesive having a light-transmitting property adjusted for its refractive index. In this arrangement, it is possible to use the plate member which is compact and inexpensive. Further, it is possible to use the plate member having a good quality having few defects such as bubbles and foreign matters at the inside.

The arrangement described above may be exemplarily modified as follows. That is, a substance, which is different from the substance having the light-transmitting property adjusted for its refractive index, is allowed to exist between the vessel and the surface of the main display device body disposed oppositely to the display surface. In this arrangement, it is possible to adopt a method comprising allowing a display surface of the main display device body to be opposed to a first principal surface of a plate member having transparency, and allowing a substance having a light-transmitting property adjusted for its refractive index to intervene between the surfaces, wherein the main display device body is fixed, and then a vessel including a constitutive component of the plate member is produced, so that the vessel is filled therein with another substance which is different from the substance having the light-transmitting property adjusted for its refractive index to produce the display device.

In the case of this arrangement, when the substance having the light-transmitting property adjusted for its refractive index is matching oil, it is preferable to allow a seal member to intervene between the matching oil and the another substance. In the case of the arrangement described above, the substance having the light-transmitting property adjusted for its refractive index tends to be expensive. However, it is possible to decrease the range of the use of the substance. Therefore, this arrangement is advantageous to reduce the production cost, and it is advantageous in that no bubble is generated in the substance having the light-transmitting property adjusted for its refractive index.

The another substance and the substance having the light-transmitting property such as the matching oil to be charged in the vessel are preferably in the form of liquid or grease. The driving circuit of the main display device body is also immersed in the substances. Therefore, it is preferable to use those which have high insulating performance and low ignitability. When the another substance has a specific gravity which is equivalent to that of the substance having the light-transmitting property adjusted for its refractive index, the pressure, which is exerted on the main display device, is uniform without being affected by the depth, which is preferred.

The above and other objects, features, and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 13 shows a table illustrating an example of the relationship concerning the offset potential (bias potential) outputted from a row electrode-driving circuit, the electric potentials of an ON signal and an OFF signal outputted from a column electrode-driving circuit, and the voltage applied between a row electrode and a column electrode;

DESCRIPTION OF THE PREFERRED EMBODIMENTS

Illustrative embodiments of the display device and the method for producing the same according to the present invention will be explained below with reference to FIGS. 1 to 55.

At first, explanation will be made with reference to FIGS. 1 to 13 for an arrangement of a display component 14 which is applied to the display device according to this embodiment.

Figure 1:
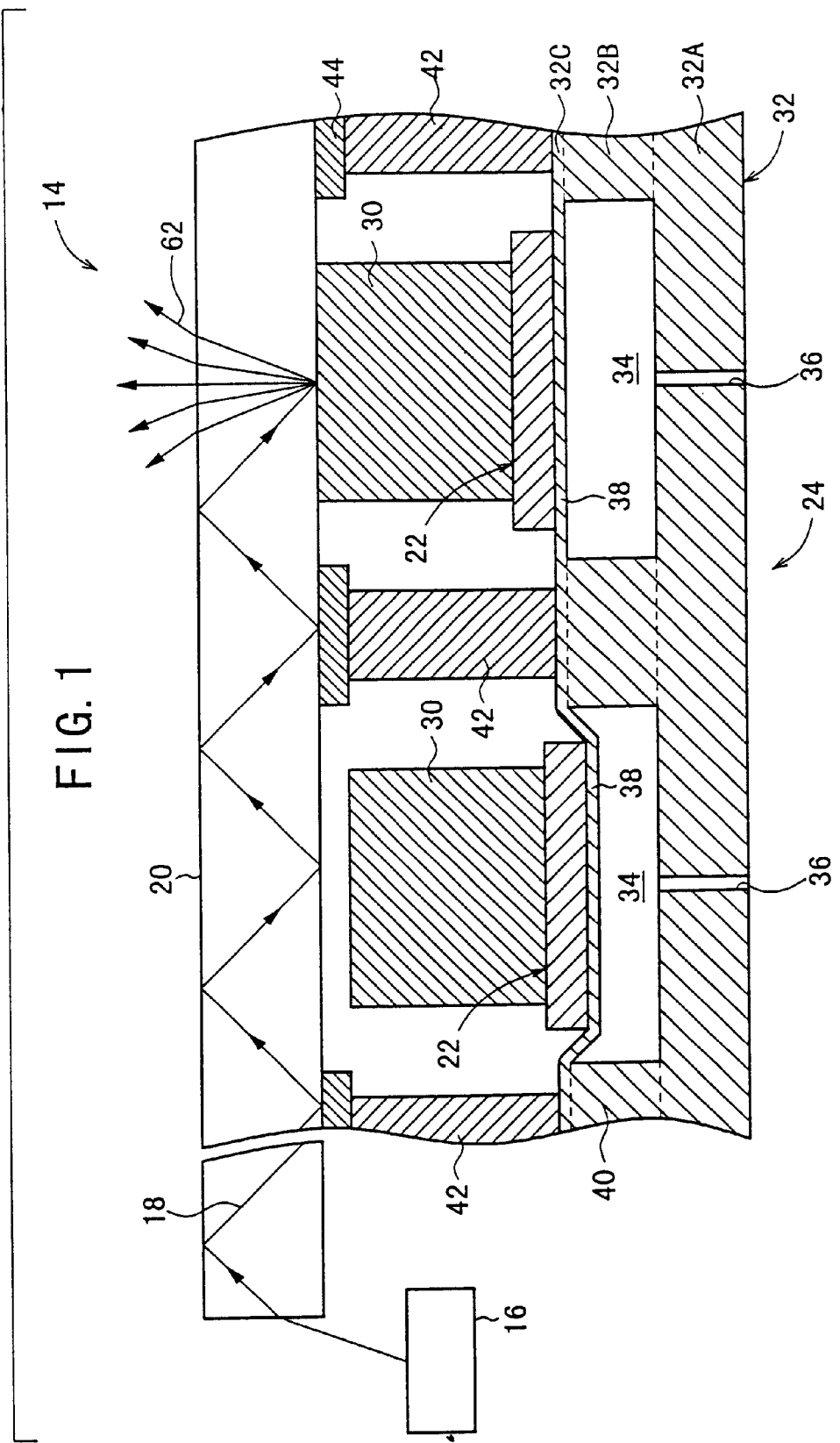
FIG. 1 shows an arrangement illustrating a display component for constructing a display device according to an embodiment of the present invention.

As shown in FIG. 1, the display component 14 comprises an optical waveguide plate 20 for introducing light 18 from a light source 16 thereinto, and a driving section 24 provided opposingly to the back surface of the optical waveguide plate 20 and including a large number of actuator elements 22 which are arranged corresponding to picture elements (image pixels) in a matrix configuration or in a zigzag configuration.

Figure 2:
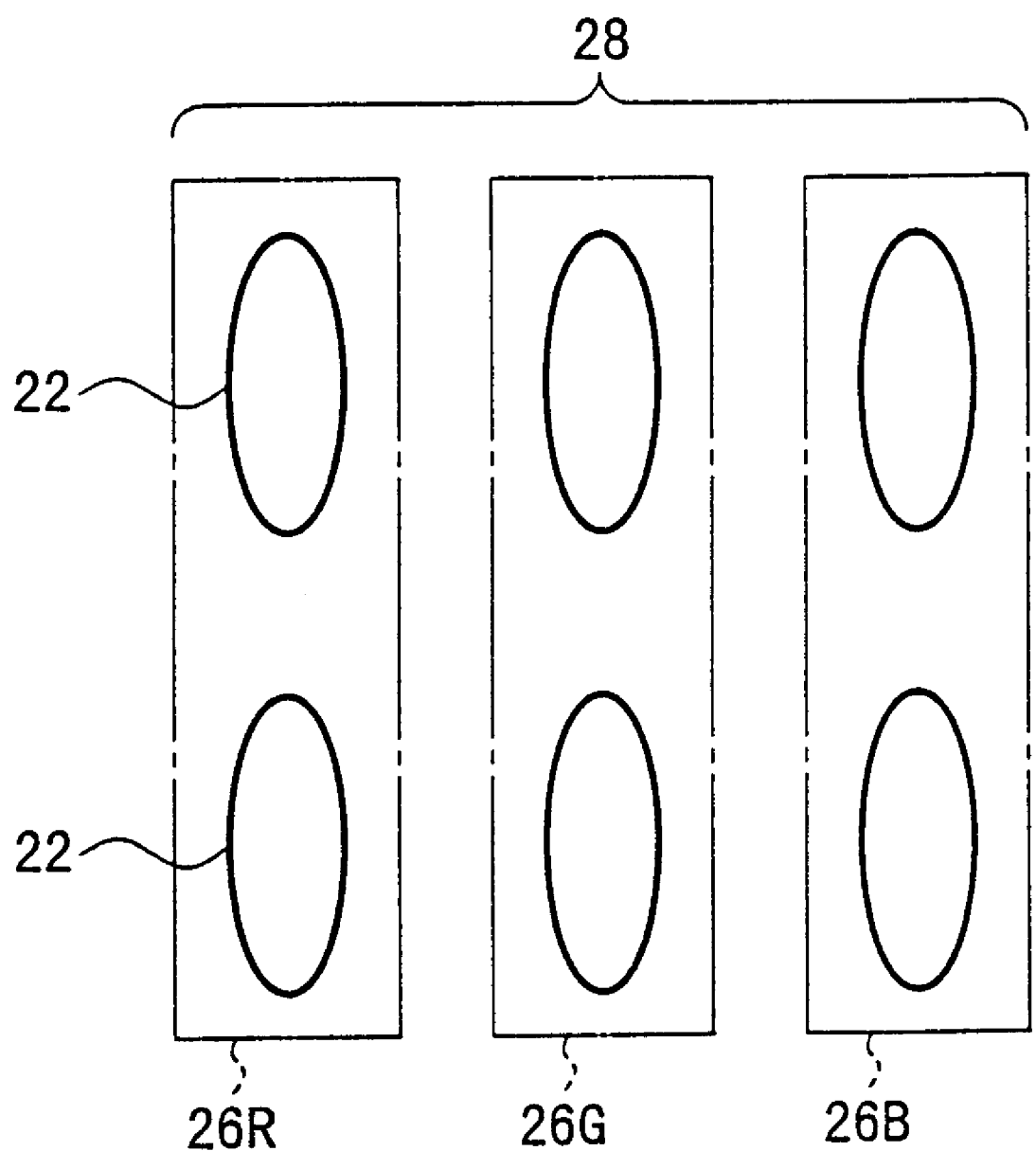
FIG. 2 illustrates an arrangement of picture elements of the display component.

The arrangement of the picture element array is as follows, for example, as shown in FIG. 2. That is, one dot 26 is constructed by two actuator elements 22 which are aligned in the vertical direction. One picture element 28 is constructed by three dots 26 (red dot 26R, green dot 26G, and blue dot 26B) which are aligned in the horizontal direction. In the display component 14, the picture elements 28 are aligned such that sixteen individuals (48 dots) are arranged in the horizontal direction, and sixteen individuals (16 dots) are arranged in the vertical direction.

In the display component 14, a picture element assembly 30 is stacked on each of the actuator elements 22. The picture element assembly 30 functions such that the contact area with the optical waveguide plate 20 is increased to give an areal size corresponding to the picture element.

The driving section 24 includes an actuator substrate 32 composed of, for example, ceramics. The actuator elements 22 are arranged at positions corresponding to the respective picture elements 28 on the actuator substrate 32. The actuator substrate 32 has its first principal surface which is arranged to oppose to the back surface of the optical waveguide plate 20. The first principal surface is a continuous surface (flushed surface). Hollow spaces 34 for forming respective vibrating sections as described later on are provided at positions corresponding to the respective picture elements 28 at the inside of the actuator substrate 32. The respective hollow spaces 34 communicate with the outside via through-holes 36 each having a small diameter and provided at the second principal surface of the actuator substrate 32.

The portion of the actuator substrate 32, at which the hollow space 34 is formed, is thin-walled. The other portion of the actuator substrate 32 is thick-walled. The thin-walled portion has a structure which tends to undergo vibration in response to external stress, and it functions as a vibrating section 38. The portion other than the hollow space 34 is thick-walled, and it functions as a fixed section 40 for supporting the vibrating section 38.

That is, the actuator substrate 32 has a stacked structure comprising a substrate layer 32A as a lowermost layer, a spacer layer 32B as an intermediate layer, and a thin plate layer 32C as an uppermost layer. The actuator substrate 32 can be recognized as an integrated structure including the hollow spaces 34 formed at the positions in the spacer layer 32B corresponding to the actuator elements 22. The substrate layer 32A functions as a substrate for reinforcement, as well as it functions as a substrate for wiring. The actuator substrate 32 may be sintered in an integrated manner, or it may be additionally attached.

Specified embodiments of the actuator element 22 and the picture element assembly 30 will now be explained with reference to FIGS. 3 to 12. The embodiments shown in FIGS. 3 to 12 are illustrative of a case in which a gap-forming layer 44 is provided between the optical waveguide plate 20 and a crosspiece 42 as described later on.

Figure 3:
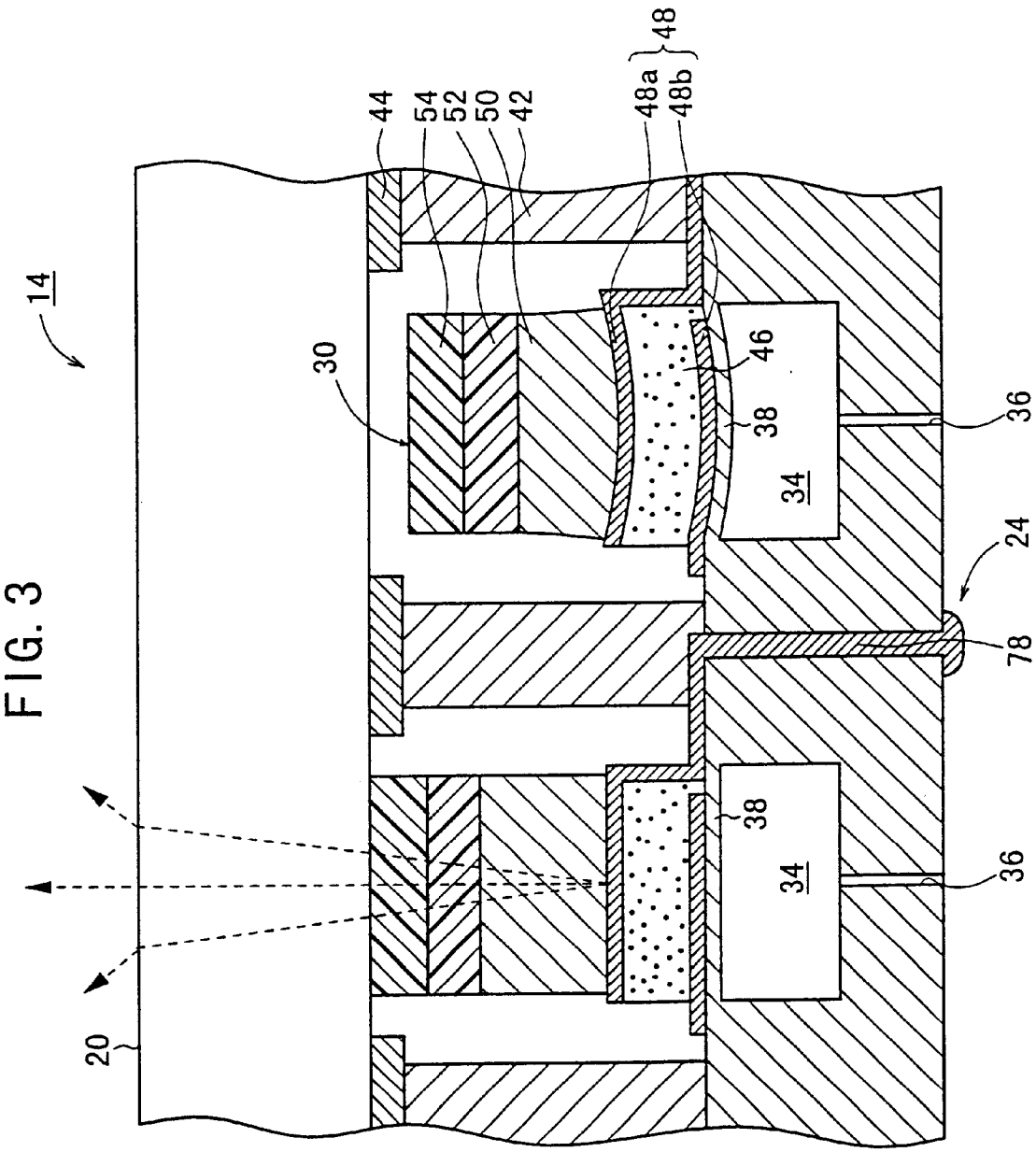
FIG. 3 shows a sectional view depicting a first illustrative arrangement of an actuator element and a picture element assembly.

At first, as shown in FIG. 3, each of the actuator elements 22 comprises the vibrating section 38 and the fixed section 40 described above, as well as a shape-retaining layer 46 composed of, for example, a piezoelectric/electrostrictive layer or an anti-ferroelectric layer directly formed on the vibrating section 38, and a pair of electrodes 48 (a row electrode 48a and a column electrode 48b) formed on an upper surface and a lower surface of the shape-retaining layer 46.

As shown in FIG. 3, the pair of electrodes 48 may have a structure in which they are formed on upper and lower sides of the shape-retaining layer 46, or they are formed on only one side of the shape-retaining layer 46. Alternatively, the pair of electrodes 48 may be formed on only the upper portion of the shape-retaining layer 46.

Figure 4:
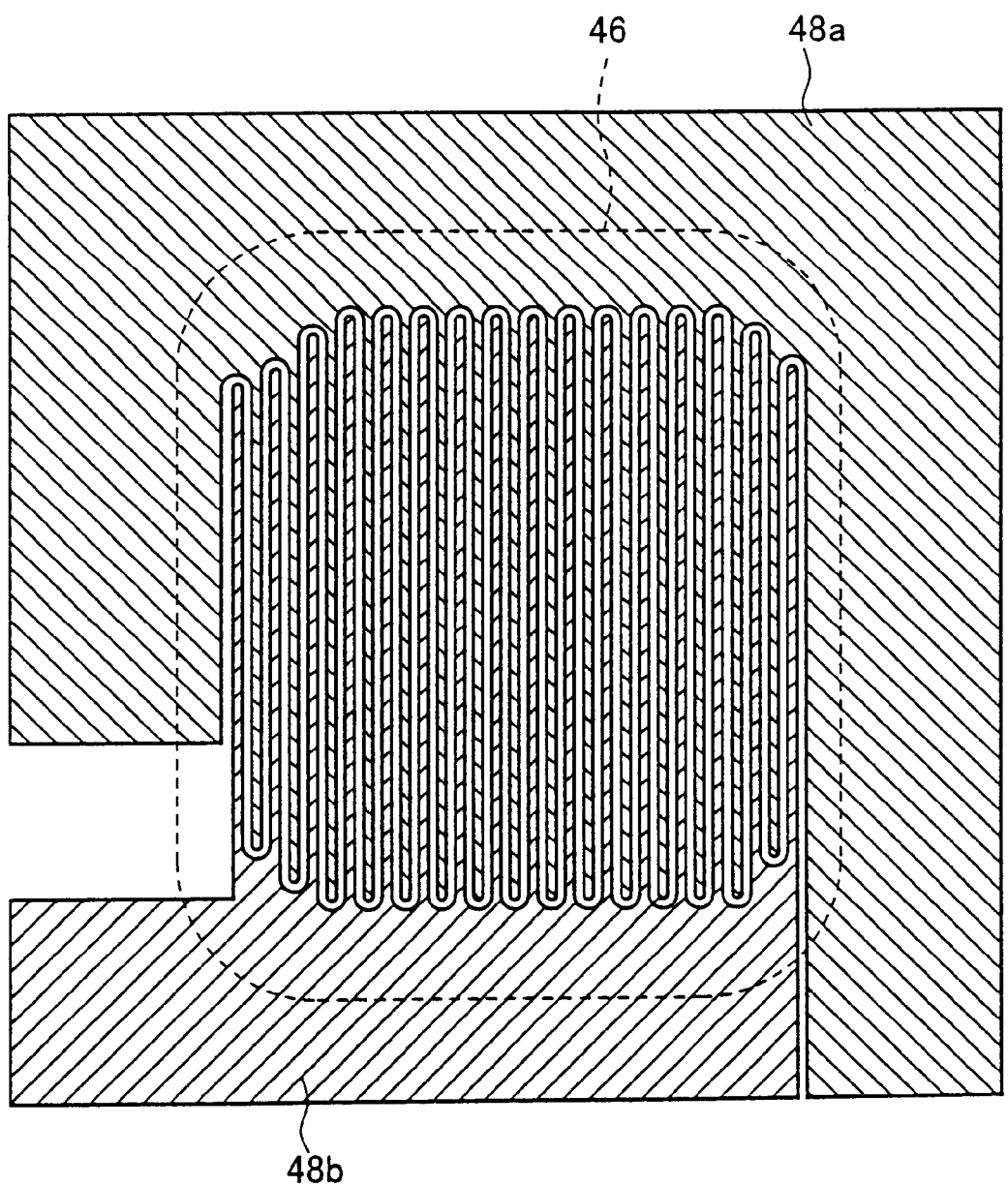
FIG. 4 shows an example of a planar configuration of a pair of electrodes formed on the actuator element.

When the pair of electrodes 48 are formed on only the upper portion of the shape-retaining layer 46, the planar configuration of the pair of electrodes 48 may be a shape in which a large number of comb teeth are opposed to one another in a complementary manner as shown in FIG. 4. Alternatively, it is possible to adopt, for example, the spiral configuration and the branched configuration as disclosed in Japanese Laid-Open Patent Publication No. 10-78549 as well.

Figure 5A:
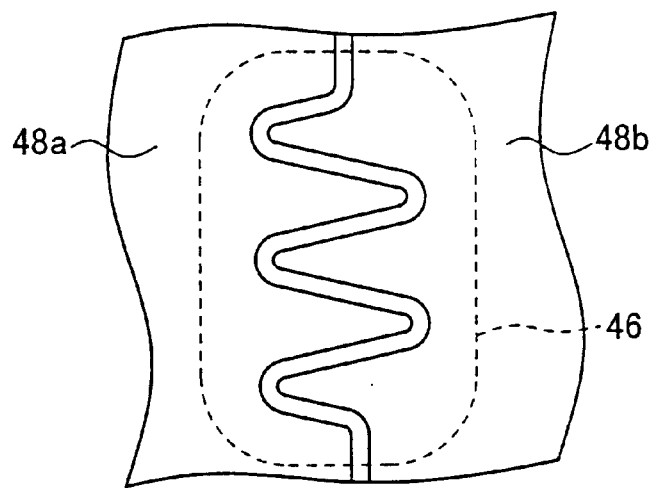
FIG. 5A illustrates an example in which comb teeth of the pair of electrodes are arranged along the major axis of a shape-retaining layer.
Figure 5B:
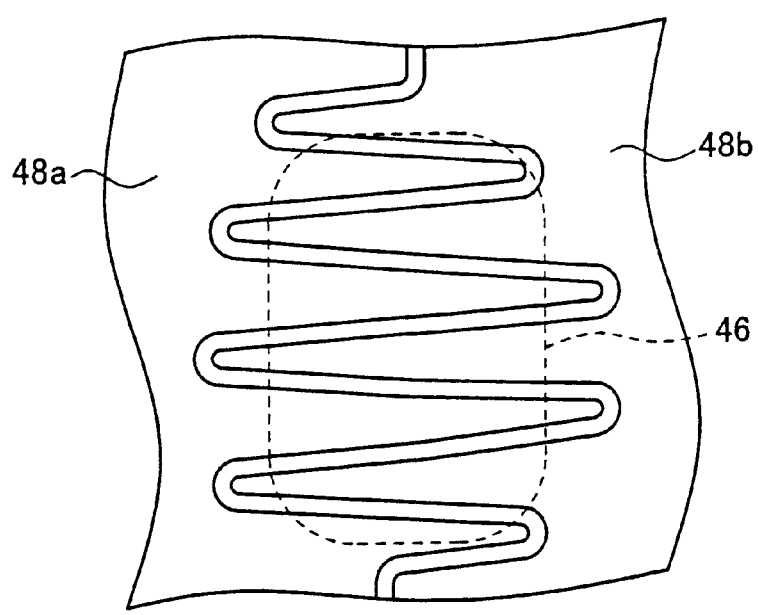
FIG. 5B illustrates another example.
Figure 6A:
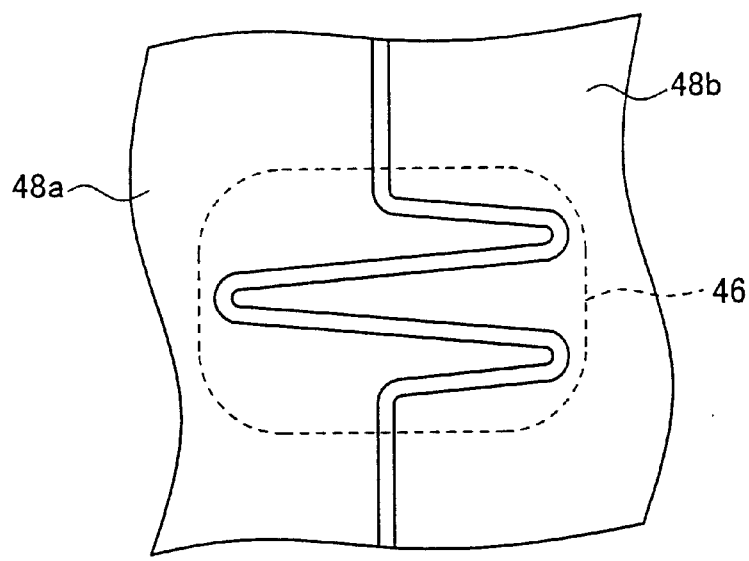
FIG. 6A illustrates an example in which comb teeth of the pair of electrodes are arranged along the minor axis of a shape-retaining layer.
Figure 6B:
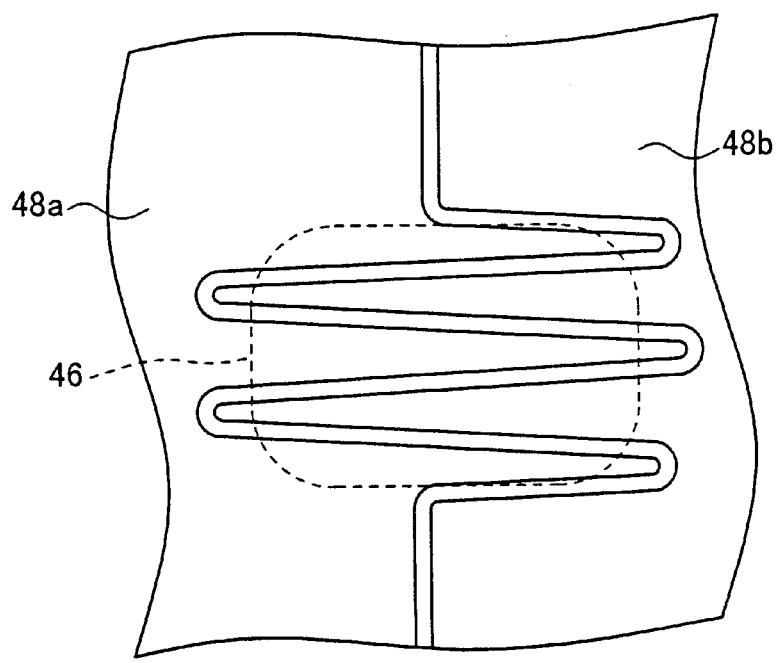
FIG. 6B illustrates another example.

When the planar configuration of the shape-retaining layer 46 is, for example, an elliptic configuration, and the pair of electrodes 48 are formed to have a comb teeth-shaped configuration, then it is possible to use, for example, a form in which the comb teeth of the pair of electrodes 48 are arranged along the major axis of the shape-retaining layer 46 as shown in FIGS. 5A and 5B, and a form in which the comb teeth of the pair of electrodes 48 are arranged along the minor axis of the shape-retaining layer 46 as shown in FIGS. 6A and 6B.

It is possible to use, for example, the form in which the comb teeth of the pair of electrodes 48 are included in the planar configuration of the shape-retaining layer 46 as shown in FIGS. 5A and 6A, and the form in which the comb teeth of the pair of electrodes 48 protrude from the planar configuration of the shape-retaining layer 48 as shown in FIGS. 5B and 6B. The forms shown in FIGS. 5B and 6B are more advantageous to effect the bending displacement of the actuator element 22.

Figure 7:
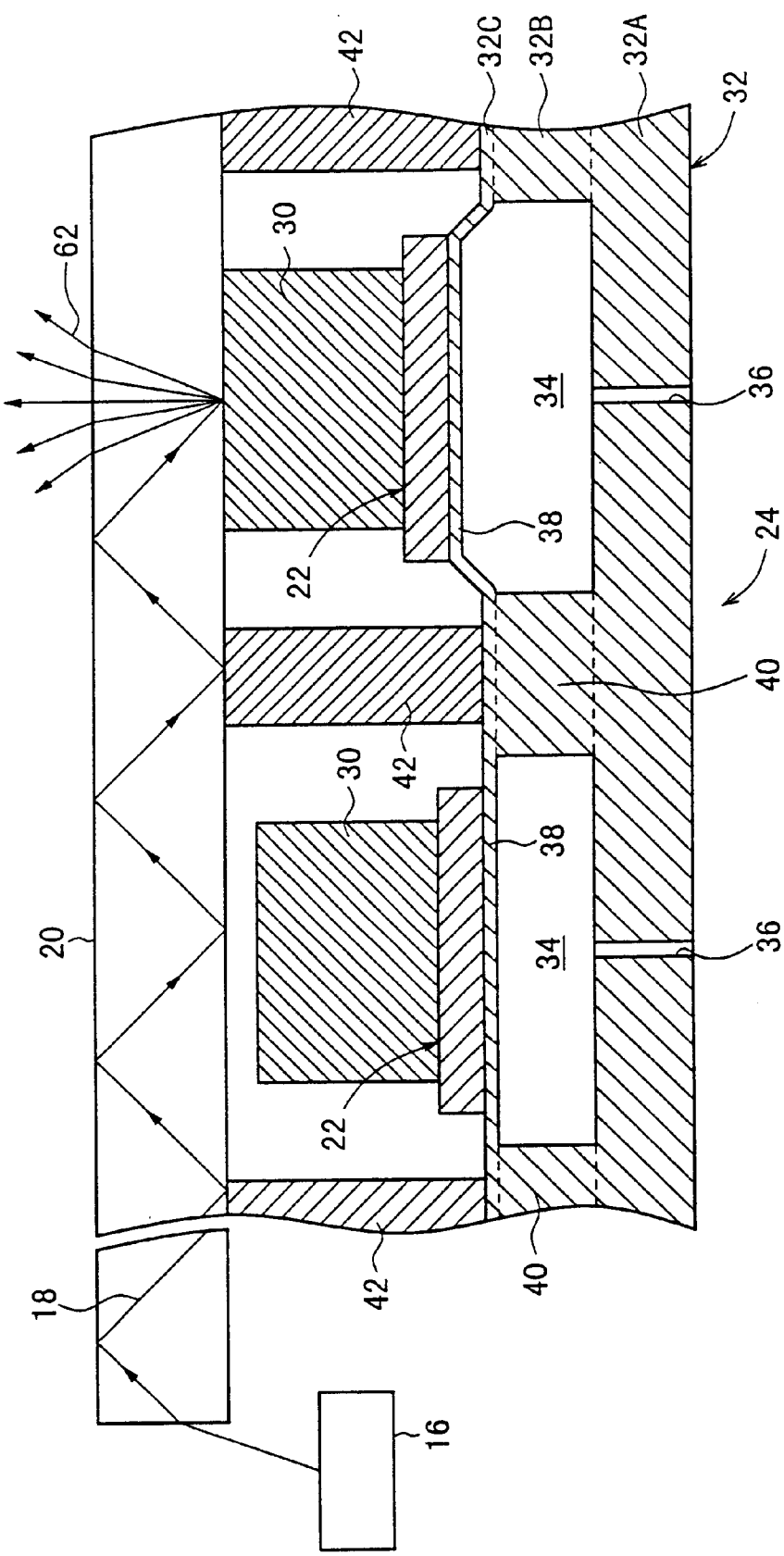
FIG. 7 shows a sectional view illustrating another arrangement of a display component.

As shown in FIG. 3, for example, when the pair of electrodes 48 are constructed such that the row electrode 48a is formed on the upper surface of the shape-retaining layer 46, and the column electrode 48b is formed on the lower surface of the shape-retaining layer 46, the actuator element 22 can be subjected to bending displacement in a first direction so that it is convex toward the hollow space 34 as shown in FIG. 1. Alternatively, as shown in FIG. 7, the actuator element 22 can be subjected to bending displacement in a second direction so that it is convex toward the optical waveguide plate 20. The example shown in FIG. 7 is illustrative of a case in which the gap-forming layer 44 (see FIG. 3) is not formed.

On the other hand, as shown in FIG. 3, for example, the picture element assembly 30 can be constructed by a stack comprising a light scattering element 50 as a displacement-transmitting section formed on the actuator element 22, a color filter 52, and a transparent layer 54.

Figure 8:
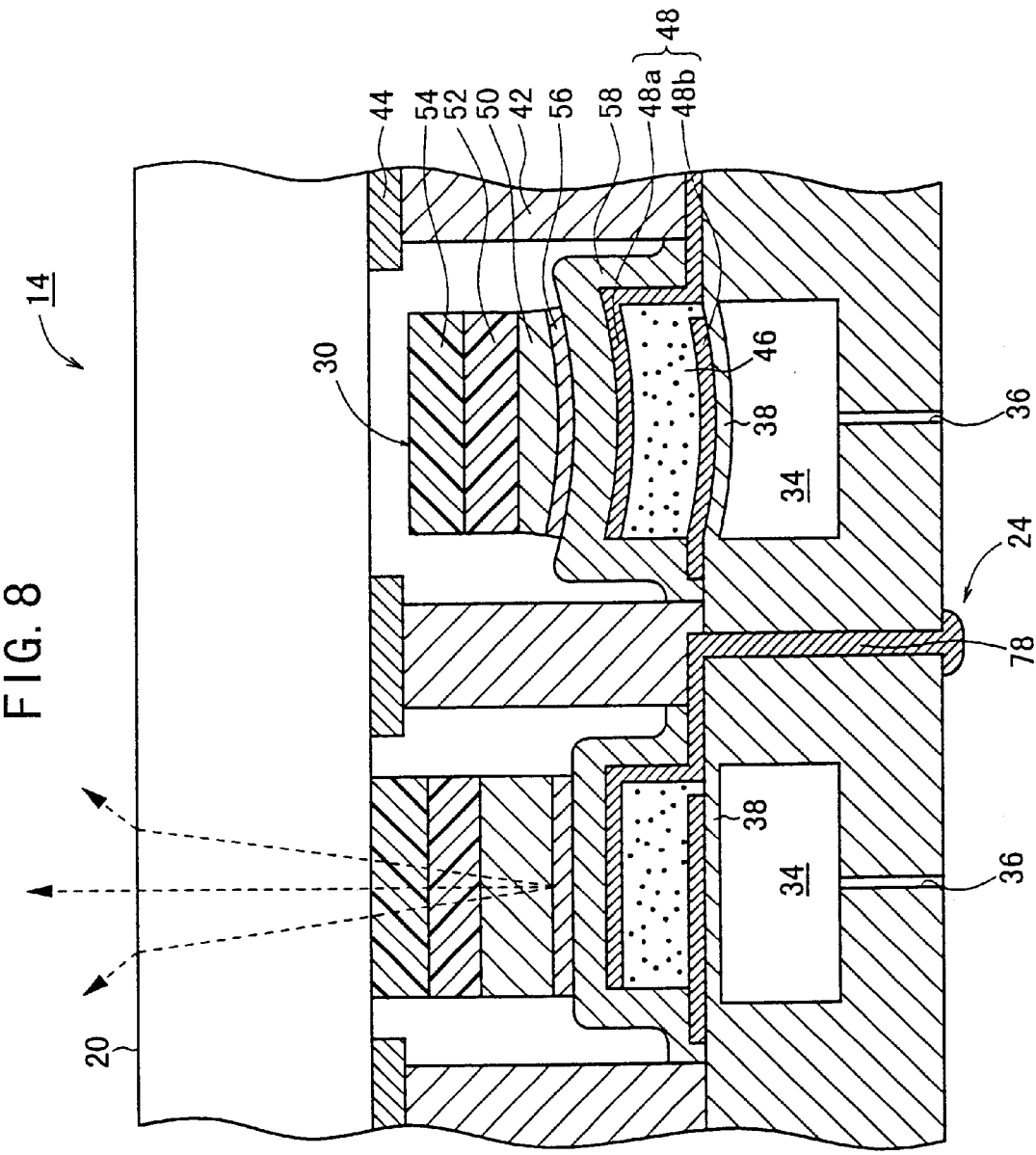
FIG. 8 shows a sectional view depicting a second illustrative arrangement of an actuator element and a picture element assembly.

Further, as shown in FIG. 8, a light-reflective layer 56 may be allowed to intervene as a lower layer of the light scattering element 50. In this arrangement, it is desirable that an insulative layer 58 is formed between the light-reflective layer 56 and the actuator element 22.

Figure 9:
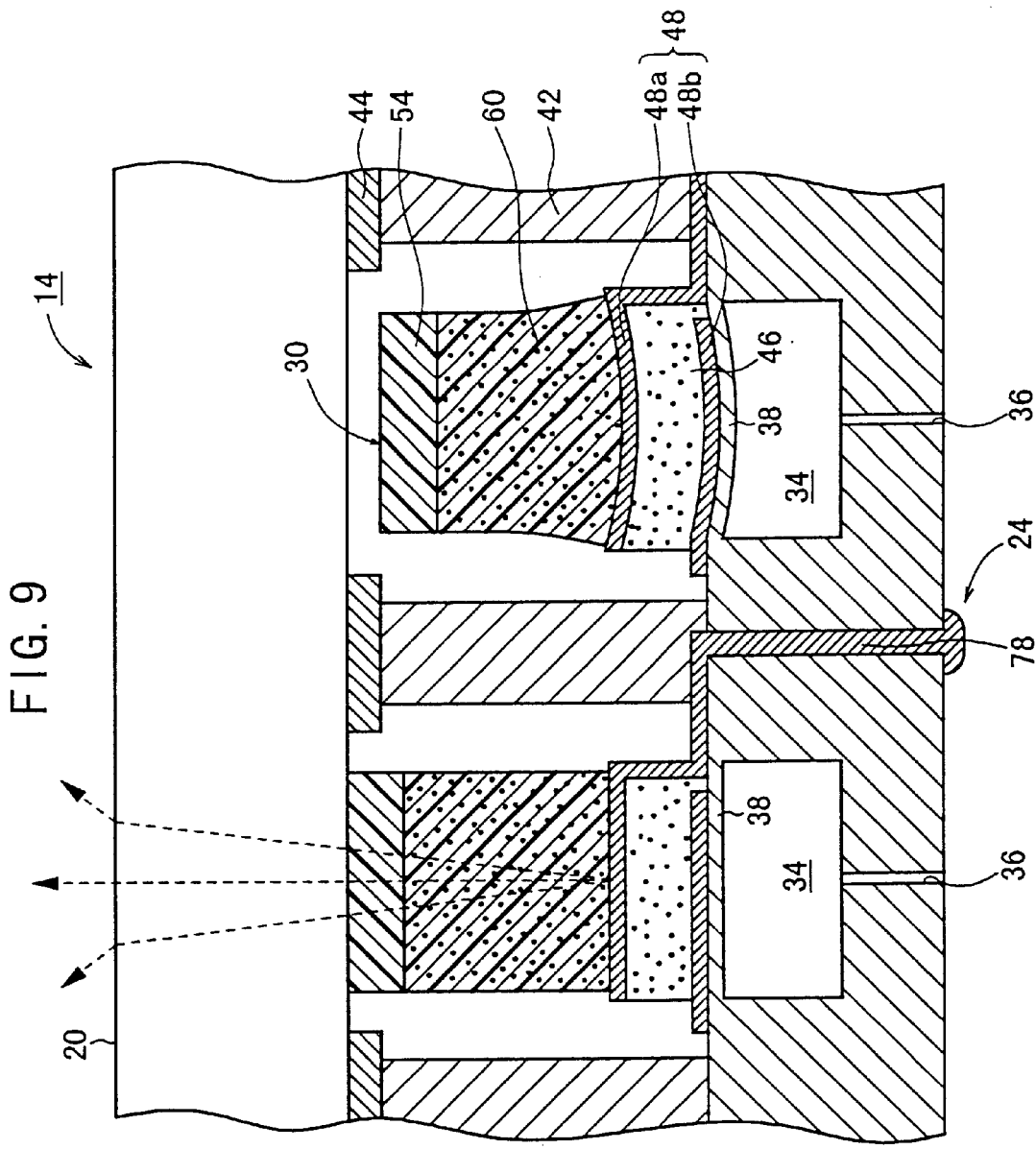
FIG. 9 shows a sectional view depicting a third illustrative arrangement of an actuator element and a picture element assembly.
Figure 10:
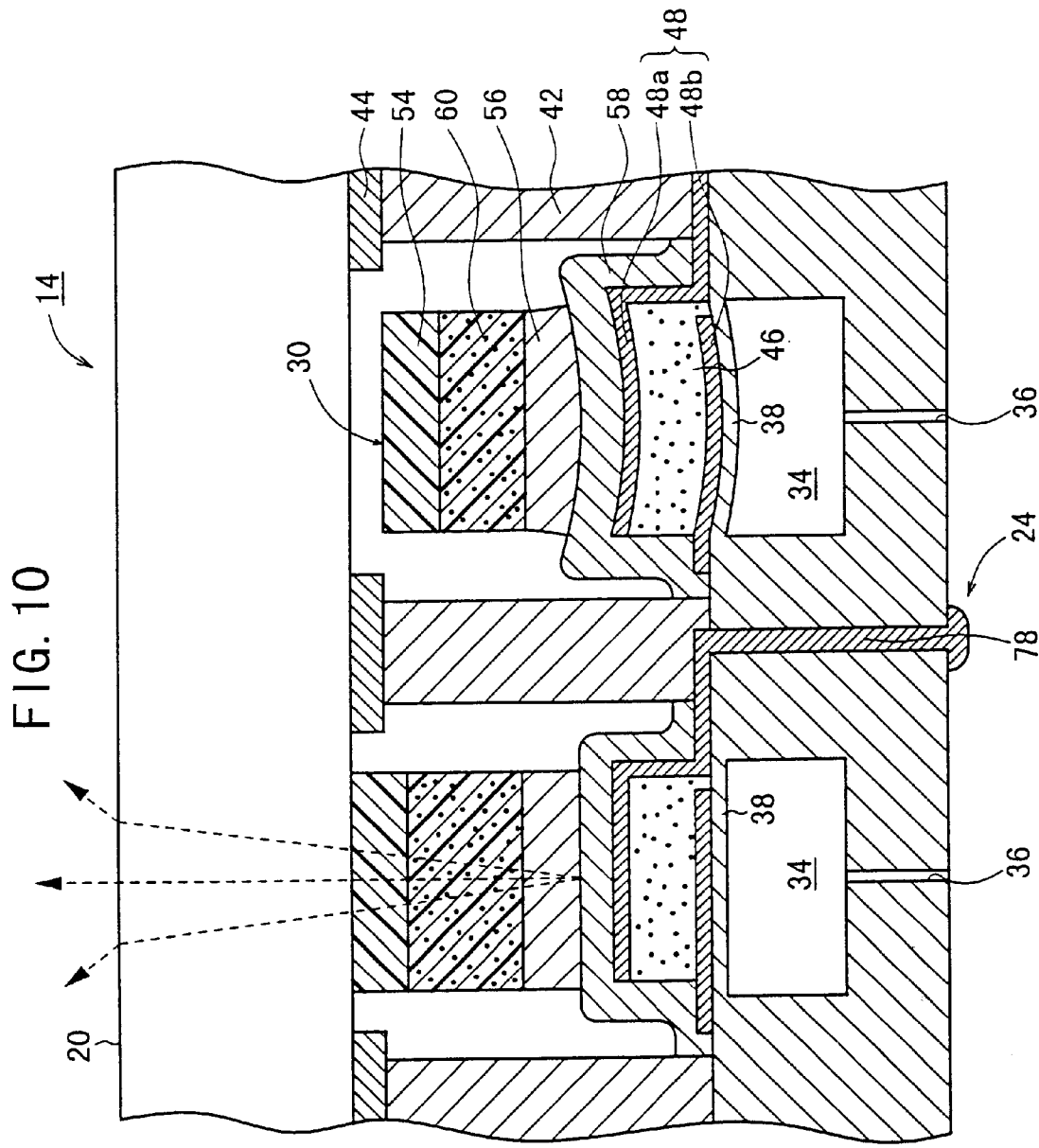
FIG. 10 shows a sectional view depicting a fourth illustrative arrangement of an actuator element and a picture element assembly.

Another example of the picture element assembly 30 is, for example, as shown in FIG. 9. That is, the picture element assembly 30 can be also constructed by a stack comprising a color scattering element 60 to also serve as a displacement-transmitting section formed on the actuator element 22, and a transparent layer 54. Also in this case, as shown in FIG. 10, a light-reflective layer 56 and an insulative layer 58 may be allowed to intervene between the actuator element 22 and the color scattering element 60.

As shown in FIGS. 1, 3, and 7, the display component 14 comprises the crosspieces 42 which are formed at the portions other than the picture element assembly 30 between the optical waveguide plate 20 and the actuator substrate 32. The example shown in FIG. 7 is illustrative of a case in which the optical waveguide plate 20 is directly secured to the upper surfaces of the crosspieces 42. It is preferable that the material for the crosspiece 42 is not deformed by heat and pressure.

Figure 11:
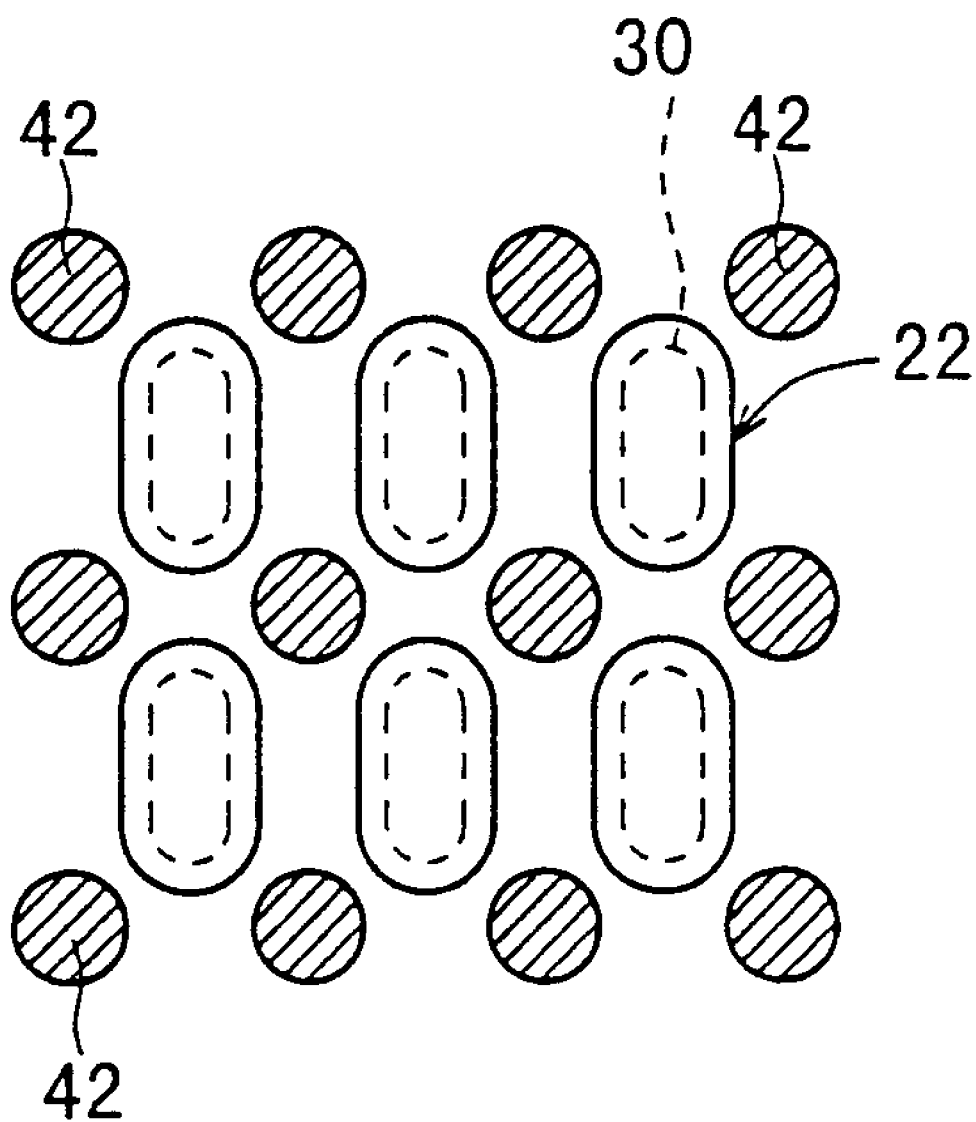
FIG. 11 illustrates an arrangement obtained when crosspieces are formed at four corners of the picture element assemblies respectively.

The crosspieces 42 can be formed, for example, at portions around four corners of the picture element assembly 30. The portions around four corners of the picture element assembly 30 are herein exemplified, for example, by positions corresponding to the respective corners as shown in FIG. 11, for example, when the picture element assembly 30 has a substantially rectangular or elliptic planar configuration. FIG. 11 is illustrative of a form in which one crosspiece 42 is shared by the adjoining picture element assembly 30.

Figure 12:
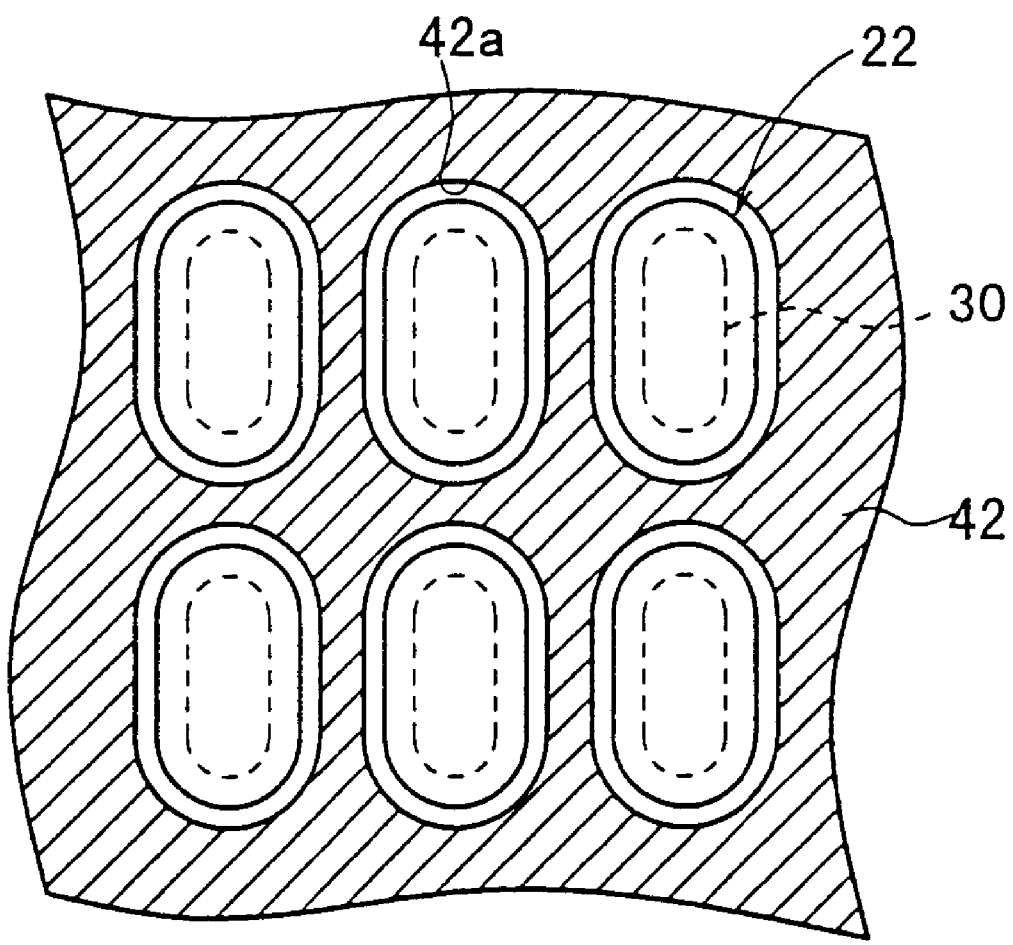
FIG. 12 illustrates another arrangement of the crosspiece.

Another example of the crosspiece 42 is shown in FIG. 12. That is, the crosspiece 42 is provided with windows 42a each of which surrounds at least one picture element assembly 30. The representative illustrative arrangement is as follows. That is, for example, the crosspiece 42 itself is formed to have a plate-shaped configuration. Windows (openings) 42a, each having a shape similar to the outer configuration of the picture element assembly 30, are formed at the positions corresponding to the picture element assemblies 30. Accordingly, all of the side surfaces of the picture element assembly 30 are consequently surrounded by the crosspiece 42. Thus, the actuator substrate 32 and the optical waveguide plate 20 are secured to one another more tightly.

Explanation will now be made for the respective constitutive members of the display component 14, especially for the selection of the material or the like for the respective constitutive member.

At first, the light 18 to be introduced into the optical waveguide plate 20 may be any one of those of ultraviolet, visible, and infrared regions. Those usable as the light source 16 include, for example, incandescent lamp, deuterium discharge lamp, fluorescent lamp, mercury lamp, metal halide lamp, halogen lamp, xenon lamp, tritium lamp, light emitting diode, laser, plasma light source, hot cathode tube (or one arranged with carbon nano tube-field emitter in place of filament-shaped hot cathode), and cold cathode tube.

It is preferable that the vibrating section 38 is composed of a highly heat-resistant material, because of the following reason. That is, when the actuator element 22 has the structure in which the vibrating section 38 is directly supported by the fixed section 40 without using any material such as an organic adhesive which is inferior in heat resistance, the vibrating section 38 is preferably composed of a highly heat-resistant material in order that the vibrating section 38 is not deteriorated in quality at least during the formation of the shape-retaining layer 46.

It is preferable that the vibrating section 38 is composed of an electrically insulative material in order to electrically separate the wiring connected to the row electrode 48a of the pair of electrodes 48 formed on the actuator substrate 32, from the wiring (for example, data line) connected to the column electrode 48b.

Therefore, the vibrating section 38 may be composed of a material such as a highly heat-resistant metal and a porcelain enamel produced by coating a surface of such a metal with a ceramic material such as glass. However, the vibrating section 38 is optimally composed of ceramics.

Those usable as the ceramics for constructing the vibrating section 38 include, for example, stabilized zirconium oxide, aluminum oxide, magnesium oxide, titanium oxide, spinel, mullite, aluminum nitride, silicon nitride, glass, and mixtures thereof. Stabilized zirconium oxide is especially preferred because of, for example, high mechanical strength obtained even when the thickness of the vibrating section 38 is thin, high toughness, and small chemical reactivity with the shape-retaining layer 46 and the pair of electrodes 48.

The term "stabilized zirconium oxide" includes stabilized zirconium oxide and partially stabilized zirconium oxide. Stabilized zirconium oxide has a crystal structure such as cubic crystal, and hence it does not cause phase transition.

On the other hand, zirconium oxide causes phase transition between monoclinic crystal and tetragonal crystal at about 1000° C. Cracks appear during the phase transition in some cases. Stabilized zirconium oxide contains 1 to 30 mole % of a stabilizer such as calcium oxide, magnesium oxide, yttrium oxide, scandium oxide, ytterbium oxide, cerium oxide, and oxides of rare earth metals. In order to enhance the mechanical strength of the vibrating section 22, the stabilizer preferably comprises yttrium oxide. In this composition, yttrium oxide is contained preferably in an amount of 1.5 to 6 mole %, and more preferably 2 to 4 mole %. It is preferable that aluminum oxide is further contained in an amount of 0.1 to 5 mole %.

The crystal phase may be, for example, a mixed phase of cubic crystal+monoclinic crystal, a mixed phase of tetragonal crystal+monoclinic crystal, and a mixed phase of cubic crystal+tetragonal crystal+monoclinic crystal. However, among them, most preferred are those having a principal crystal phase composed of tetragonal crystal or a mixed phase of tetragonal crystal+cubic crystal, from viewpoints of strength, toughness, and durability.

When the vibrating section 38 is composed of ceramics, a large number of crystal grains construct the vibrating section 38. In order to increase the mechanical strength of the vibrating section 38, the crystal grains preferably have an average grain diameter of 0.05 to 2 $\mu$m, and more preferably 0.1 to 1 $\mu$m.

The fixed section 40 is preferably composed of ceramics. The fixed section 40 may be composed of the same ceramic material as that used for the vibrating section 38, or the fixed section 40 may be composed of a ceramic material different from that used for the vibrating section 38. Those usable as the ceramic material for constructing the fixed section 40 include, for example, stabilized zirconium oxide, aluminum oxide, magnesium oxide, titanium oxide, spinel, mullite, aluminum nitride, silicon nitride, glass, and mixtures thereof, in the same manner as the material for the vibrating section 38.

Especially, those preferably adopted for the actuator substrate 32 used in the display component 14 include, for example, materials containing a major component of zirconium oxide, materials containing a major component of aluminum oxide, and materials containing a major component of a mixture thereof. Among them, those containing a major component of zirconium oxide are more preferable.

Clay or the like is added as a sintering aid in some cases. However, it is necessary to control components of the sintering aid in order not to contain an excessive amount of those liable to form glass such as silicon oxide and boron oxide because of the following reason. That is, although the materials which are liable to form glass are advantageous to join the actuator substrate 32 to the shape-retaining layer 46, the materials facilitate the reaction between the actuator substrate 32 and the shape-retaining layer 46, making it difficult to maintain a predetermined composition of the shape-retaining layer 46. As a result, the materials make a cause to deteriorate the element characteristics.

That is, it is preferable that silicon oxide or the like in the actuator substrate 32 is restricted to have a weight ratio of not more than 3%, and more preferably not more than 1%. The term "major component" herein refers to a component which exists in a proportion of not less than 50% in weight ratio.

As described above, those usable as the shape-retaining layer 46 include piezoelectric/electrostrictive layers and anti-ferroelectric layers. However, when the piezoelectric/electrostrictive layer is used as the shape-retaining layer 46, those usable as the piezoelectric/electrostrictive layer include ceramics containing, for example, lead zirconate, lead magnesium niobate, lead nickel niobate, lead zinc niobate, lead manganese niobate, lead magnesium tantalate, lead nickel tantalate, lead antimony stannate, lead titanate, barium titanate, lead magnesium tungstate, and lead cobalt niobate, or any combination of them.

It is needless to say that the major component contains the compound as described above in an amount of not less than 50% by weight. Among the ceramic materials described above, the ceramic material containing lead zirconate is most frequently used as the constitutive material for the piezoelectric/electrostrictive layer for constructing the shape-retaining layer 46.

When the piezoelectric/electrostrictive layer is composed of ceramics, it is also preferable to use ceramics obtained by appropriately adding, to the ceramics described above, oxide of, for example, lanthanum, calcium, strontium, molybdenum, tungsten, barium, niobium, zinc, nickel, and manganese, or any combination thereof or another type of compound thereof.

For example, it is preferable to use ceramics containing a major component composed of lead magnesium niobate, lead zirconate, and lead titanate and further containing lanthanum and strontium.

The piezoelectric/electrostrictive layer may be either dense or porous. When the piezoelectric/electrostrictive layer is porous, its porosity is preferably not more than 40%.

When the anti-ferroelectric layer is used as the shape-retaining layer 46, it is desirable to use, as the antiferroelectric layer, a compound containing a major component composed of lead zirconate, a compound containing a major component composed of lead zirconate and lead stannate, a compound obtained by adding lanthanum to lead zirconate, and a compound obtained by adding lead zirconate and lead niobate to a component composed of lead zirconate and lead stannate.

Especially, when an anti-ferroelectric film, which contains lead zirconate and lead stannate as represented by the following composition, is applied as a film-type element such as the actuator element 22, it is possible to perform driving at a relatively low voltage. Therefore, application of such an anti-ferroelectric film is especially preferred.

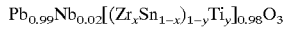

$Pb_{0.99}Nb_{0.02}[(Zr_xSn_{1-x})_{1-y}Ti_y]_{0.98}O_3$ wherein, $0.5<x<0.6$, $0.05<y<0.063$, $0.01<Nb<0.03$.

The anti-ferroelectric film may be porous. When the anti-ferroelectric film is porous, it is desirable that the porosity is not more than 30%.

Those usable as the method for forming the shape-retaining layer 46 on the vibrating section 38 include various types of the thick film formation method such as the screen printing method, the dipping method, the application method, and the electrophoresis method, and various types of the thin film formation method such as the ion beam method, the sputtering method, the vacuum evaporation method, the ion plating method, the chemical vapor deposition method (CVD), and the plating.

In this embodiment, when the shape-retaining layer 46 is formed on the vibrating section 38, the thick film formation method is preferably adopted, based on, for example, the screen printing method, the dipping method, the application method, and the electrophoresis method, because of the following reason.

That is, in the techniques described above, the shape-retaining layer 46 can be formed by using, for example, paste, slurry, suspension, emulsion, or sol containing a major component of piezoelectric ceramic particles having an average grain size of 0.01 to 5 μm, preferably 0.05 to 3 μm, in which it is possible to obtain good piezoelectric operation characteristics.

Especially, the electrophoresis method makes it possible to form the film at a high density with a high shape accuracy, and it further has the features as described in technical literatures such as "Electrochemistry and Industrial Physical Chemistry, Vol. 53, No. 1 (1985), pp. 63–68, written by Kazuo ANZAI" and "Proceedings of First Study Meeting on Higher Order Ceramic Formation Method Based on Electrophoresis (1998), pp. 5–6 and pp. 23–24". Therefore, the technique may be appropriately selected and used considering, for example, the required accuracy and the reliability.

It is preferable that the thickness of the vibrating section 38 has a dimension identical to that of the thickness of the shape-retaining layer 46, because of the following reason. That is, if the thickness of the vibrating section 38 is extremely thicker than the thickness of the shape-retaining layer 46 (if the former is different from the latter by not less than one figure), when the shape-retaining layer 46 makes shrinkage upon sintering, the vibrating section 38 behaves to inhibit the shrinkage. For this reason, the stress at the boundary surface between the shape-retaining layer 46 and the actuator substrate 32 is increased, and consequently they are easily peeled off from each other. On the contrary, when the dimension of the thickness is in an identical degree between the both, it is easy for the actuator substrate 32 (vibrating section 38) to follow the shrinkage of the shape-retaining layer 46 upon sintering. Accordingly, such dimension of the thickness is preferred to achieve integration. Specifically, the vibrating section 38 preferably has a thickness of 1 to 100 μm, more preferably 3 to 50 μm, and much more preferably 5 to 20 μm. On the other hand, the shape-retaining layer 46 preferably has a thickness of 5 to 100 μm, more preferably 5 to 50 μm, and much more preferably 5 to 30 μm.

The row electrode 48a and the column electrode 48b formed on the upper surface and the lower surface of the shape-retaining layer 46, or the pair of electrodes 34 formed on the shape-retaining layer 46 are allowed to have an appropriate thickness depending on the use or application. However, the thickness is preferably 0.01 to 50 μm, and more preferably 0.1 to 5 μm. The row electrode 48a and the column electrode 48b are preferably composed of a conductive metal which is solid at room temperature. The metal includes, for example, metal simple substances or alloys containing, for example, aluminum, titanium, chromium, iron, cobalt, nickel, copper, zinc, niobium, molybdenum, ruthenium, rhodium, silver, stannum, tantalum, tungsten, iridium, platinum, gold, and lead. It is needless to say that these elements may be contained in an arbitrary combination.

The optical waveguide plate 20 has an optical refractive index with which the light 18 introduced into the inside thereof is totally reflected by the front and back surfaces without being transmitted to the outside of the optical waveguide plate 20. It is necessary for the optical waveguide plate 20 to use those having a large and uniform light transmittance in the wavelength region of the light 18 to be introduced. The material for the optical waveguide plate 20 is not specifically limited provided that it satisfies the foregoing characteristic. However, specifically, those generally used for the optical waveguide plate 20 include, for example, glass, quartz, light-transmissive plastics such as acrylic plastics, light-transmissive ceramics, structural materials comprising a plurality of layers composed of materials having different refractive indexes, and those having a surface coating layer.

The color layer such as the color filter 52 and the color scattering element 60 included in the picture element assembly 30 is the layer which is used to extract only the light in a specified wavelength region, and it includes, for example, those which develop the color by absorbing, transmitting, reflecting, or scattering the light at a specified wavelength, and those which convert incident light into light having a different wavelength. The transparent member, the semi-transparent member, and the opaque member can be used singly or in combination.

The color layer is constructed, for example, as follows. That is, the color layer includes, for example, those obtained by dispersing or dissolving a dyestuff or a fluorescent material such as dye, pigment, and ion in rubber, organic resin, light-transmissive ceramic, glass, liquid or the like, those obtained by applying the dyestuff or the fluorescent material on the surface of the foregoing material, those obtained by sintering, for example, the powder of the dyestuff or the fluorescent material, and those obtained by pressing and solidifying the powder of the dyestuff or the fluorescent material. As for the material quality and the structure, the materials may be used singly, or the materials may be used in combination.

The difference between the color filter 52 and the color scattering element 60 lies in whether or not the brightness value of leakage light obtained by reflection and scattering effected by only the color layer is not less than 0.5-fold the brightness value of leakage light obtained by reflection and scattering effected by the entire structure including the picture element assembly 30 and the actuator element 22, when the light emission state is given by allowing the picture element assembly 30 to make contact with the optical waveguide plate 20 into which the light 18 is introduced. If the former brightness value is not less than 0.5-fold the latter brightness value, the color layer is defined to be the color scattering element 60. If the former brightness value is less than 0.5-fold the latter brightness value, the color layer is defined to be the color filter 52.

The measuring method is specifically exemplified as follows. That is, it is assumed that when the color layer is singly allowed to make contact with the back surface of the optical waveguide plate 20 into which the light 18 is introduced, A(nt) represents the front brightness of the light which passes from the color layer through the optical waveguide plate 20 and which leaks to the front surface. Further, it is assumed that when the picture element assembly 30 is allowed to make contact with the surface of the color layer on the side opposite to the side to make contact with the optical waveguide plate 20, B(nt) represents the front brightness of the light which leaks to the front surface. If $A \geq 0.5 \times B$ is satisfied, the color layer is the color scattering element 60. If $A<0.5\times B$ is satisfied, the color layer is the color filter 52.

The front brightness is the brightness measured by arranging a luminance meter so that the line which connects the color layer to the luminance meter for measuring the brightness is perpendicular to the surface of the optical waveguide plate 20 to make contact with the color layer (the detection surface of the luminance meter is parallel to the plate surface of the optical waveguide plate 20).

The color scattering element 60 is advantageous in that the color tone and the brightness are scarcely changed depending on the thickness of the layer. Accordingly, those applicable as the method for forming the layer includes various methods such as the screen printing which requires inexpensive cost although it is difficult to strictly control the layer thickness.

Owing to the arrangement in which the color scattering element 60 also serves as the displacement-transmitting section, it is possible to simplify the process for forming the layer. Further, it is possible to obtain a thin entire layer thickness. Therefore, the thickness of the entire display component 14 can be made thin. Further, it is possible to avoid the decrease in displacement amount of the actuator element 22, and improve the response speed.

The color filter 52 has the following advantages. That is, when the layer is formed on the side of the optical waveguide plate 20, the layer can be easily formed, because the optical waveguide plate 20 is flat, and it has high surface smoothness. Thus, the range of process selection is widened, and the cost becomes inexpensive. Further, it is easy to control the layer thickness which may affect the color tone and the brightness.

The method for forming the film of the color layer such as the color filter 52 and the color scattering element 60 is not specifically limited, to which it is possible to apply a variety of known film formation methods. Those usable include, for example, a film lamination method in which the color layer in a chip form or in a film form is directly stuck on the surface of the optical waveguide plate 20 or the actuator element 22, as well as a method for forming the color layer in which, for example, powder, paste, liquid, gas, or ion or the like to serve as a raw material for the color layer is formed into a film in accordance with the thick film formation method such as the screen printing, the photolithography method, the spray dipping, and the application, or in accordance with the thin film formation method such as the ion beam, the sputtering, the vacuum evaporation, the ion plating, CVD, and the plating.

Alternatively, it is also preferable that a light emissive layer is provided for a part or all of the picture element assembly 30. Those usable as the light-emissive layer include a fluorescent layer. The fluorescent layer includes those which are excited by invisible light (ultraviolet light and infrared light) to emit visible light, and those which are excited by visible light to emit visible light. However, any of them may be used.

A fluorescent pigment may be also used for the light-emissive layer. The use of the fluorescent pigment is effective for those added with fluorescent light having a wavelength approximately coincident with the color of the pigment itself, i.e., the color of the reflected light such that the color stimulus is large corresponding thereto, and the light emission is vivid. Therefore, the fluorescent pigment is used more preferably to obtain the high brightness for the display component and the display. A general daylight fluorescent pigment is preferably used.

A stimulus fluorescent material, a phosphorescent material, or a luminous pigment is also used for the light-emissive layer. These materials may be either organic materials or inorganic materials.

Those preferably used include those formed with the light-emissive layer by using the light-emissive material singly as described above, those formed with the light-emissive layer by using the light-emissive material as described above dispersed in resin, and those formed with the light-emissive layer by using the light-emissive material as described above dissolved in resin.

The afterglow or decay time of the light-emissive material is preferably not more than 1 second, more preferably 30 milliseconds. More preferably, the afterglow or decay time is not more than several milliseconds.

When the light-emissive layer is used as a part or all of the picture element assembly 30, the light source 16 is not specifically limited provided that it includes the light having a wavelength capable of exciting the light-emissive layer and it has an energy density sufficient for excitation. Those usable include, for example, cold cathode tube, hot cathode tube (or one arranged with carbon nano tube-field emitter in place of filament-shaped hot cathode), metal halide lamp, xenon lamp, laser including infrared laser, black light, halogen lamp, incandescent lamp, deuterium discharge lamp, fluorescent lamp, mercury lamp, tritium lamp, light emitting diode, and plasma light source or the like.

Next, the operation of the display component 14 will be briefly explained with reference to FIG. 1. As shown in FIG. 13, the description of the operation is illustrative of a case in which as the offset potential, for example, 50 V is used and applied to the row electrode 48a of each of the actuator elements 22, and as the electric potentials of the ON signal and the OFF signal, 60 V and 0 V are used and applied to the column electrode 48b of each of the actuator elements 22, respectively.

Therefore, the low level voltage (−10 V) is applied between the column electrode 48b and the row electrode 48a in the actuator element 22 in which the ON signal is applied to the column electrode 48b. The high level voltage (50 V) is applied between the column electrode 48b and the row electrode 48a in the actuator element 22 in which the OFF signal is applied to the column electrode 48b.

At first, the light 18 is introduced, for example, from the end portion of the optical waveguide plate 20. In this embodiment, all of the light 18 is totally reflected at the inside of the optical waveguide plate 20 without being transmitted through the front and back surfaces thereof by controlling the magnitude of the refractive index of the optical waveguide plate 20, in the state in which the picture element assembly 30 does not make contact with the optical waveguide plate 20. The reflection factor n of the optical waveguide plate 20 is desirably 1.3 to 1.8, and more desirably 1.4 to 1.7.

In this embodiment, in the natural state of the actuator element 22, the end surface of the picture element assembly 30 contacts with the back surface of the optical waveguide plate 20 at the distance of not more than the wavelength of the light 18. Therefore, the light 18 is reflected by the surface of the picture element assembly 30, and it behaves as scattered light 62. A part of the scattered light 62 is reflected again in the optical waveguide plate 20. However, almost all of the scattered light 62 is not reflected by the optical waveguide plate 20, and it is transmitted through the front surface (face) of the optical waveguide plate 20. Accordingly, all of the actuator elements 22 are in the ON state, and the ON state is expressed in a form of light emission. Further, the color of the light emission corresponds to the color of the color filter 52 or the color scattering element 60 included in the picture element assembly 30, or the color of the light emissive layer described above. In this case, all of the actuator elements 22 are in the ON state. Therefore, the white color is displayed on the screen of the display component 14.

Starting from this state, when the OFF signal is applied to the actuator element 22 corresponding to a certain dot 26, the concerning actuator element 22 makes the bending displacement to be convex toward the hollow space 34 as shown in FIG. 1, i.e., it makes the bending displacement in the first direction. The end surface of the picture element assembly 30 is separated from the optical waveguide plate 20, and the concerning actuator element 22 is in the OFF state. The OFF state can be recognized as light off.

That is, in the display component 14, the presence or absence of light emission (leakage light) at the front surface of the optical waveguide plate 20 can be controlled depending on the presence or absence of the contact of the picture element assembly 30 with the optical waveguide plate 20.

Especially, in the display component 14, one unit for making the displacement action of the picture element assembly 30 in the direction to make contact or separation with respect to the optical waveguide plate 20 is used one dot. The array of the three dots in the horizontal direction (red dot 26R, green dot 26G, and blue dot 26B) is used as one picture element. A large number of the picture elements are arranged in a matrix configuration or in a zigzag configuration concerning the respective rows. Therefore, it is possible to display a color picture image (characters and graphics) corresponding to the image signal on the front surface of the optical waveguide plate 20, i.e., on the display surface, in the same manner as in the cathode ray tube, the liquid crystal display device, and the plasma display, by controlling the displacement action in each of the picture elements in accordance with the attribute of the inputted image signal.

Figure 14:
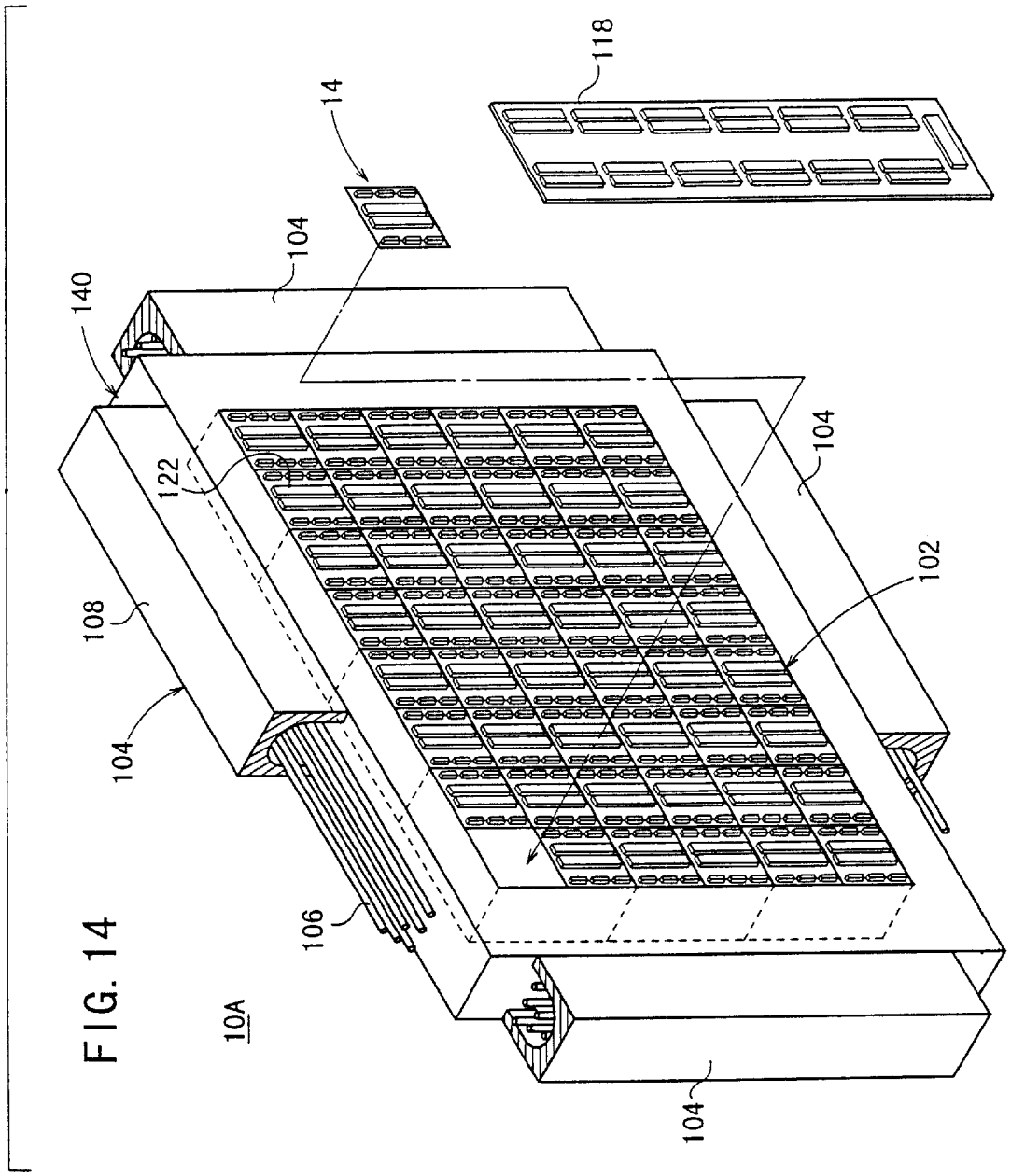
FIG. 14 shows an arrangement illustrating a display device according to a first embodiment.

As shown in FIG. 14, a display device 10A according to a first embodiment has a main display device body 102 which comprises a large number of display components 14 arranged, for example, in a matrix configuration on a first principal surface of a large optical guide plate 140. Light sources 104 are attached to respective outer side surfaces of the large optical guide plate 140. Each of the light sources 104 comprises, for example, a large number of cold cathode tubes 106, and a reflector 108 for reflecting the light from the cold cathode tubes 106 toward the optical guide plate.

Figure 15:
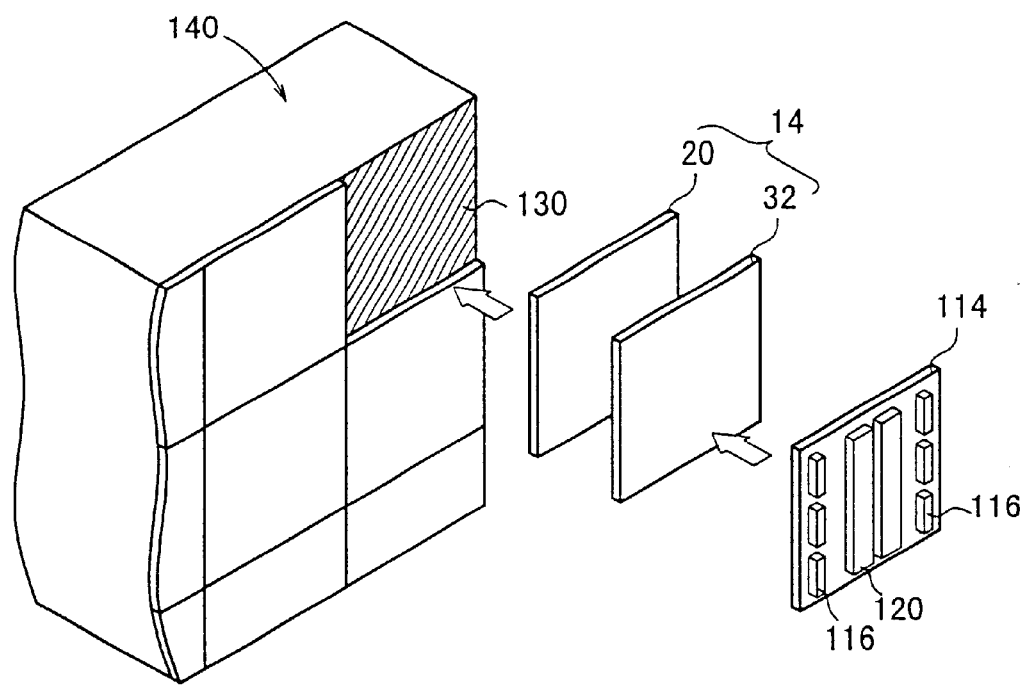
FIG. 15 shows an arrangement illustrating an example of a fixed state of the display component.

As shown in FIG. 15, a circuit board 114 is attached to the back surface of the actuator substrate 32 of each of the display components 14. The circuit board 114 includes a plurality of driving IC's 116 for driving the row electrode 48a and the column electrode 48b of the display component 14, and a connector 120 for connecting the driving IC's 116 to a driver board 118 (see FIG. 14) for processing the signal for each unit of group. Each of the driver boards 118 is connected to an unillustrated display controller for performing predetermined image data processing for the purpose of display.

Figure 16:
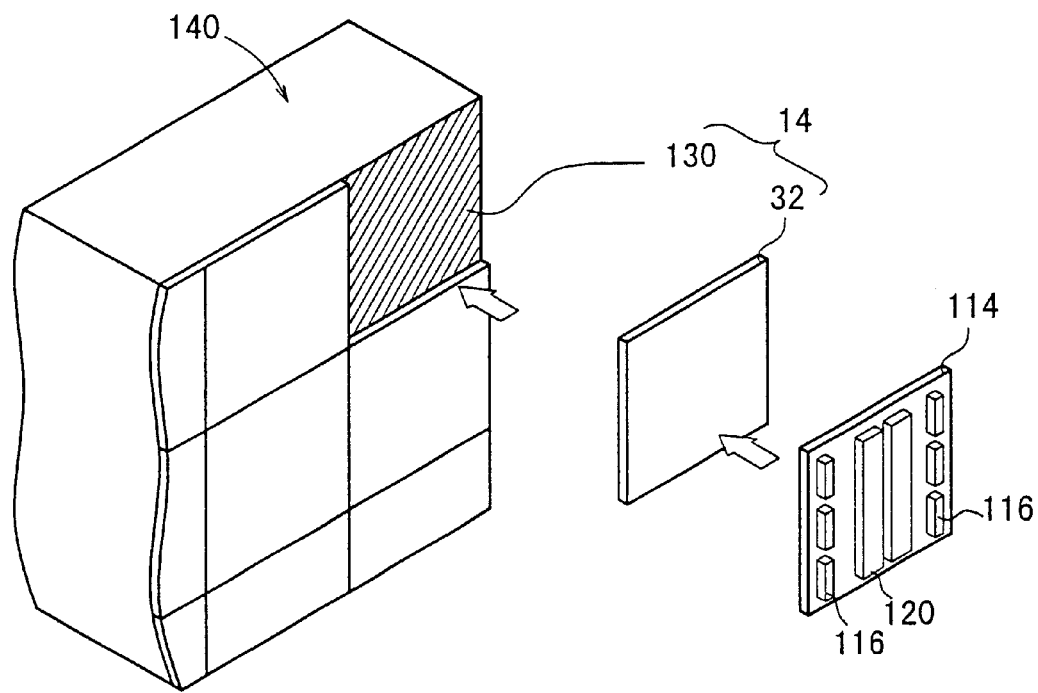
FIG. 16 shows an arrangement illustrating another example of a fixed state of the display component.

In the embodiment shown in FIG. 15, the optical waveguide plate 20, the display component 14 having the actuator substrate 32, and the circuit board 114 are stuck to the large optical guide plate 140. Alternatively, as shown in FIG. 16, it is also preferable that the display component 14 from which the optical waveguide plate 20 is omitted, and the circuit board 114 are stuck to the large optical guide plate 140. In this arrangement, the large optical guide plate 140 itself serves as the optical waveguide plate 20 which is the constitutive member of the display component.

For example, as shown in FIG. 15, the display device 10A according to the first embodiment is constructed such that a substance 130 having a light-transmitting property adjusted for its refractive index is allowed to intervene at least between the large optical guide plate 140 and the display component 14.

It is preferable that the refractive index of the substance 130 is similar to the refractive index of the large optical guide plate 140 as closely as possible. The allowable value concerning the difference between the refractive index of the large optical guide plate 140 and the refractive index of the substance 130 also relates to the thickness of the large optical guide plate 140. However, assuming that the refractive index of the large optical guide plate 140 is $N_1$, and the refractive index of the substance 130 is $N_2$, it is preferable to satisfy the following expression:

$$0.9N_1 \leq N_2 \leq 1.1N_1$$

Especially, if $0.99N_1 \leq N_2 \leq 1.01N_1$ is satisfied, then the thickness of the large optical guide plate 140 can be increased, and the stability of the structure is improved.

As for the light-transmitting property of the substance 130, in order to efficiently introduce the light into the display component 14 and suppress the electric power consumption, it is preferable that the transmittance is not less than 50% for the perpendicular incident light at the wavelength in the visible light region. It is more preferable that the transmittance is not less than 70%.

The form of the substance 130 may be any one of gas, liquid, and solid, or it may be a mixture thereof, provided that the substance 130 satisfies the foregoing conditions.

The material for the large optical guide plate 140 may be either an inorganic material or an organic material, provided that the light-transmitting property is satisfactory at the wavelength in the visible light region. Specifically, it is possible to use a simple substance or a combined material composed of, for example, glass, quartz, light-transmitting alumina, acrylic resin, methacrylic resin, polycarbonate, vinyl chloride resin, phenol resin, vinyl acetate resin, ABS, fluororesin, and unsaturated polyester resin. Especially, in view of the cost and the machining performance, it is preferable to use glass, acrylic resin, and methacrylic resin. As for the glass, it is preferable to use, for example, Vycor glass, 96% silicate glass, alumino silicate glass, borosilicate glass, zinc borosilicate glass, and barium borosilicate glass. As for the light-transmitting property, it is preferable that the transmittance is not less than 50% for the perpendicular incident light at the wavelength in the visible light region. It is more preferable that the transmittance is not less than 70%.

An adhesive, which has substantially the same refractive index as the refractive indexes of the large optical guide plate 140 and the optical waveguide plate 20 for constructing the display component 14, can be used as the substance 130. In this embodiment, the adhesive as the substance 130 intends to include adhesive, glue or sticker, adhesive to be solidified after curing, adhesive to be flexible after curing, rubber-like adhesive, and gel-like adhesive.

The curing method is not specifically limited, including, for example, those of the types of UV setting, hot setting, cold setting, condensation setting, addition setting, and two-part setting.

The material may be either an inorganic material or an organic material, provided that the light-transmitting property is satisfactory at the wavelength in the visible light region. It is preferable to use those which have high insulating performance and low ignitability. It is more preferable to use those which are excellent in wettability with respect to the large optical guide plate 140 and which are stable for a long period of time, for example, against heat, light, and moisture.

Specifically, it is possible to use a simple substance or a combined material based on, for example, urea-formaldehyde resin, phenol resin, epoxy resin, acrylic resin, methacrylic resin, cyanoacrylate, polyurethane, emulsion, hot melt, synthetic rubber, and natural rubber.

In other words, when those to be completely solidified are used as the adhesive which is used for the substance 130, the respective display components 14 are tightly secured with the adhesive. Therefore, it is possible to obtain the display device 10A having high mechanical strength. However, it is difficult to exchange any disabled display component 14 with new one. Therefore, such an adhesive is preferably adopted to the display device 10A which assumes the collective exchange all at once.

When those having flexibility are used as the adhesive, then it is possible to obtain the display device 10A having high mechanical strength, and it is easy to perform cutting. Therefore, it is easy to exchange any disabled display component 14 with new one, which is excellent in the repair performance.

Next, explanation will be made for a method for producing the display device 10A according to the first embodiment. At first, the large optical guide plate 140 is subjected to a surface treatment. Specifically, the surface of the large optical guide plate 140 is coated with a hard coating material. Accordingly, it is possible to avoid any scratch on the surface of the large optical guide plate 140. For example, it is possible to previously avoid such a phenomenon that the white dot locally appears when the black is displayed, or the brightness is increased as a whole.

The coating of the hard coating material referred to herein means the formation of a film or coating of a material having a hardness higher than that of the material for the large optical guide plate 140 on the surface of the large optical guide plate 140. The coating on the front and back surfaces of the large optical guide plate 140 is important to avoid the scratch. However, it is not necessarily indispensable to apply the coating on the end surfaces. Specifically, those usable as the hard coating material include, for example, acrylic hard coating materials and silicone hard coating materials.

Subsequently, the end surface of the optical waveguide plate 20 for constructing the display component 14 is mirror-finished. Accordingly, it is possible to lower, up to the level of no sense of incongruity, the leakage of light from the juncture of the optical waveguide plates 20. Thus, the juncture is scarcely conspicuous. When the end surface of the optical waveguide plate 20 is mirror-finished, the light from the light source 104 is sufficiently delivered over the large optical guide plate 140. Therefore, it is also possible to ensure a desired angle of visibility. In the mirror-finishing, in order to avoid any sense of incongruity at the juncture; it is preferable that Rmax is not more than 0.3, and it is more preferable that Rmax is not more than 0.05.

Especially, it is preferable that when the optical waveguide plate 20 is machined, then the dimensional accuracy of the optical waveguide plate 20 is not more than ±0.1 mm with respect to the reference dimension of 100 mm, the perpendicularity between the end surfaces and between the end surface and the flat surface is not more than 0.1 mm, and the parallelism between the end surfaces and between the flat surfaces is not more than 0.1 mm. It is more preferable that the dimensional accuracy of the optical waveguide plate 20 is not more than ±0.03 mm with respect to the reference dimension of 100 mm, the perpendicularity between the end surfaces and between the end surface and the flat surface is not more than 0.03 mm, and the parallelism between the end surfaces and between the flat surfaces is not more than 0.03 mm.

Accordingly, it is possible to decrease the cumulative pitch error when the display components 14 are successively arranged. As a result, it is possible to reduce the distortion of the image which would be otherwise caused by the discrepancy of the pitch of the picture element. It is possible to decrease the gap dispersion of the juncture. Further, the thickness dispersion of the optical waveguide plate 20 is also decreased. Therefore, when the machining conditions described above are satisfied, it is possible to make the juncture to be more inconspicuous.

It is preferable that the pitch of the picture element of each of the display components 14 conforms to the distance between the picture elements at the juncture portion between the display components 14. Accordingly, it is possible to eliminate any discrepancy between the pitch of the picture element in the display component 14 and the pitch of the picture element at the juncture of the display components 14. Thus, it is possible to reduce the distortion of the image.

Subsequently, the plurality of display components 14 are successively arranged and secured to the first principal surface of the large optical guide plate 140. In this process, the large optical guide plate 140 is opposed to the optical waveguide plate 20 of the display component 14. For example, an adhesive of the completely solidifying type (for example, BENEFIX VL or BENEFIX α produced by ADELL Co., Ltd.) or a flexible adhesive is applied between the large optical guide plate 140 and the optical waveguide plate 20. The large optical guide plate 140 and the optical waveguide plate 20 are stuck to one another, and then the adhesive is cured.

Any warpage is generated in some cases in the actuator substrate 32 for constructing the display component 14, due to the shrinkage phenomenon during the sintering. Any warpage is also generated in the entire display component 14 resulting therefrom in some cases.

However, when the display component 14 is secured with the adhesive to the large optical guide plate 140 as described above, the entire first principal surface (display surface) of the optical waveguide plate 20 is secured via the adhesive to the large optical guide plate 140. At this stage, the warpage, which has been generated in the display component 14, is absorbed by the adhesive. Thus, the display component 14 is tightly secured to the large optical guide plate 140.

Alternatively, other than the adhesive, matching oil may be used as the substance 130 which is allowed to intervene between the large optical guide plate 140 and the optical waveguide plate 20. In this case, the matching oil is in a form of liquid or grease. The matching oil may be made of either an inorganic material or an organic material, provided that the light transmittance is satisfactory at the wavelength in the visible light region. It is preferable to use those which have high insulating performance and low ignitability. It is more preferable to use those which are excellent in wettability with respect to the large optical guide plate 140 and which are stable for a long period of time, for example, against heat, light, and moisture. Specifically, the matching oil includes, for example, dimethyl silicone oil, methyl phenyl silicone oil, glycerol, di-2-ethylhexyl phthalate, silicone grease, and optical gel.

When the matching oil in a liquid form is used, it is preferable that the viscosity is 100 to 1000 cSt, in order to simultaneously satisfy the two factors, i.e., the bubble generated upon application is easily released, and the liquid neither flow nor trickle excessively.

When the matching oil is used, it does not have so much effect to absorb the warpage of the display component 14. However, the use of the matching oil is excellent in repair performance. It is easy to perform the exchange of the display component 14.

The driver board 118 is attached to the circuit boards 114 of the respective display components 14 to make electric connection. Thus, the display device 10A according to the first embodiment is completed.

As described above, in the display device 10A according to the first embodiment, the plurality of display components 14 are arranged on the first principal surface of the large optical guide plate 140, and the substance 130 (adhesive or matching oil), which has the light-transmitting property and which is adjusted for the refractive index, is allowed to intervene between the large optical guide plate 140 and the display components 14. Therefore, when the display device 10A is produced by arranging the plurality of display components 14, it is possible to obtain the display device 10A in which the juncture portions between the display components 14 are scarcely conspicuous. Further, the pitch of the picture element is fine, and thus it is possible to display the image with certain fineness.

Next, a display device 10B according to a second embodiment will be explained with reference to FIG. 17.

Figure 17:
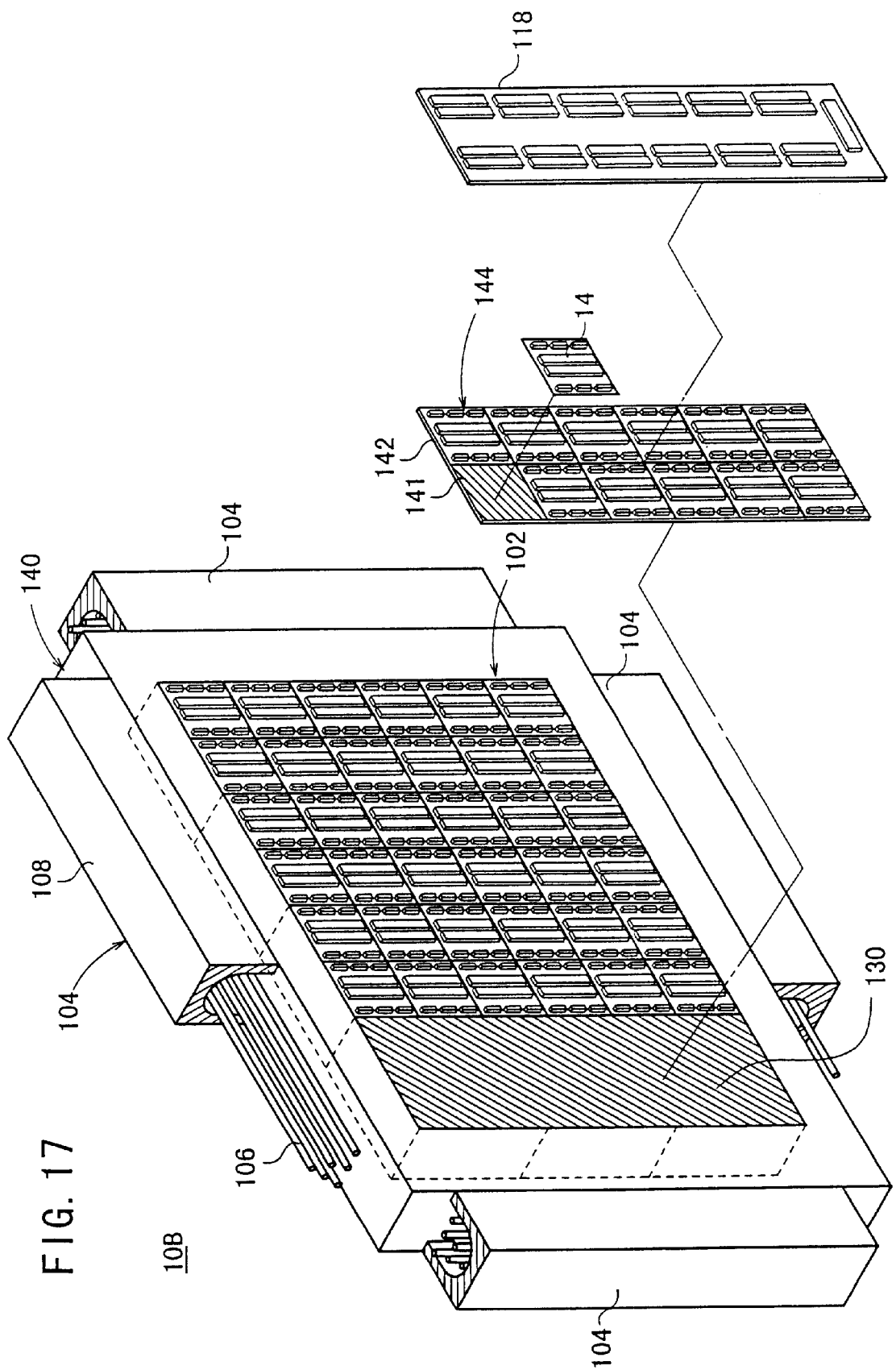
FIG. 17 shows an arrangement illustrating a display device according to a second embodiment.

As shown in FIG. 17, the display device according to the second embodiment is constructed in approximately the same manner as the display device 10A according to the first embodiment described above. However, the display device 10B comprises a plurality of display modules 144 which are arranged on the first principal surface of the large optical guide plate 140.

The display module 144 includes a plurality of display components 14 which are stuck to a module optical waveguide plate 142. Also in this arrangement, the substance 130 having the light-transmitting property adjusted for its refractive index described above is allowed to intervene between the large optical guide plate 140 and the module optical waveguide plate 142.

It is desirable that the module optical waveguide plate 142 has a size obtained by multiplying the size of the display component 14 by an integer. In the embodiment shown in FIG. 17, the module optical waveguide plate 142 has substantially the same thickness as that of the optical waveguide plate 20 for constructing the display component 14, and it has a size corresponding to the length of the display surface of the large optical guide plate 140 in the vertical direction.

Especially, the adhesive 141, which is used to secure the display component 14 to the module optical waveguide plate 142, is preferably an adhesive to be solidified after curing, in order to avoid any securing discrepancy of the display component 14. In order to mitigate the thermal expansion, it is preferable to use an adhesive to be flexible after curing, and a rubber-like adhesive. In this embodiment, the entire first principal surface (display surface) of the optical waveguide plate 20 of each of the display components 14 is secured to the module optical waveguide plate 142 by the aid of the adhesive. At this stage, any warpage, which has been generated in the display component 14, is absorbed by the adhesive 141. Thus, the display components 14 are tightly secured to the module optical waveguide plate 142.

The display device 10B according to the second embodiment is similar to the display device 10A according to the first embodiment described above as follows. That is, when the display device 10B is produced by arranging the plurality of display modules 144, the juncture portion between the display modules 144 is scarcely conspicuous in the display device 10B. Further, the display device 10B is excellent in repair performance.

When the display device 10B according to the second embodiment is produced, the procedure may be performed along with the production method for the display device 10A according to the first embodiment described above. Especially, it is preferable that the end surface of the module optical waveguide plate 142 is mirror-finished. Accordingly, it is possible to decrease the leakage of light from the juncture of the module optical waveguide plate 142 to be at a level of no sense of incongruity. The juncture is almost inconspicuous. When the end surface of the module optical waveguide plate 142 is mirror-finished, the light from the light source 104 is fully delivered to the large optical guide plate 140. Therefore, it is possible to ensure a desired angle of visibility. In the mirror-finishing, in order to avoid any sense of incongruity at the juncture, it is preferable that Rmax is not more than 0.3, and it is more preferable that Rmax is not more than 0.05.

Especially, it is preferable that when the module optical waveguide plate 142 is machined, then the dimensional accuracy of the module optical waveguide plate 142 is not more than ±0.1 mm with respect to the reference dimension of 100 mm, the perpendicularity between the end surfaces and between the end surface and the flat surface is not more than 0.1 mm, and the parallelism between the end surfaces and between the flat surfaces is not more than 0.1 mm. It is more preferable that the dimensional accuracy of the module optical waveguide plate 142 is not more than ±0.03 mm with respect to the reference dimension of 100 mm, the perpendicularity between the end surfaces and between the end surface and the flat surface is not more than 0.03 mm, and the parallelism between the end surfaces and between the flat surfaces is not more than 0.03 mm.

Figure 18:
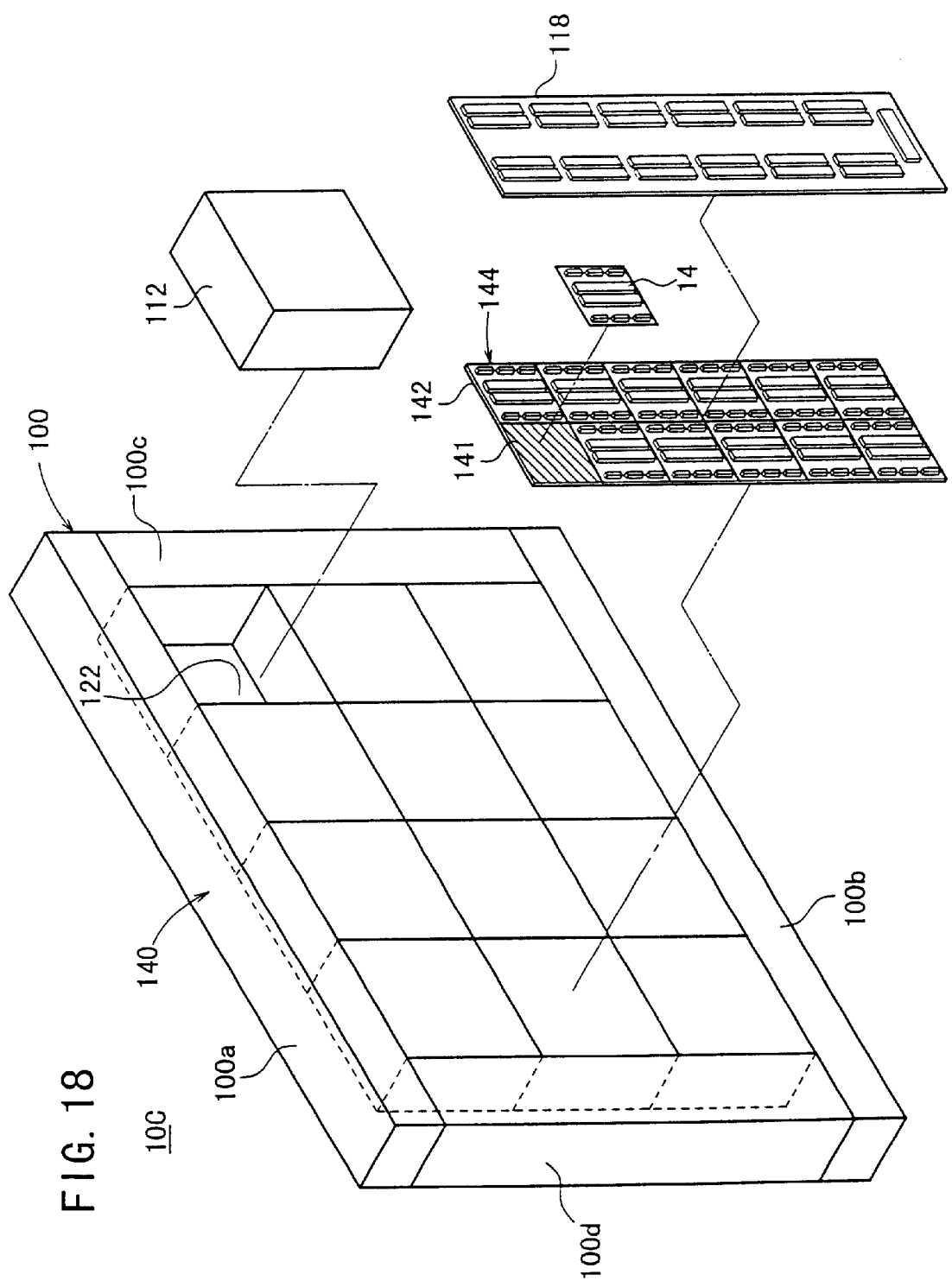
FIG. 18 shows an arrangement illustrating a display device according to a third embodiment.

Next, a display device 10C according to a third embodiment will be explained with reference to FIG. 18. In FIG. 18, the light source 104 is omitted from the illustration.

As shown in FIG. 18, the display device 10C according to the third embodiment is constructed in approximately the same manner as the display device 10B according to the second embodiment described above. However, the former is different from the latter in that a large optical guide plate 140 is constructed by arranging a plurality of divided optical guide plates 112 in a matrix configuration.

Specifically, the display device 10C according to the third embodiment includes a frame 100 constructed by assembling transparent plate members 100a, 100b, 100c, 100d. The plurality of divided optical guide plates 112 are incorporated into the frame 100 to construct the large optical guide plate 140. Further, a plurality of display components 14 or a plurality of display modules 144 are arranged on the first principal surface of the large optical guide plate 140. In the embodiment shown in FIG. 18, an example is shown, in which the plurality of display modules 144 are arranged on the first principal surface of the large optical guide plate 140. The frame 100 is constructed, for example, by assembling, into a frame-shaped form, the upper plate 100a, the lower plate 100b, and the two side plates 100c, 100d each of which is made of acrylic material having a prism-shaped configuration.

Figure 19:
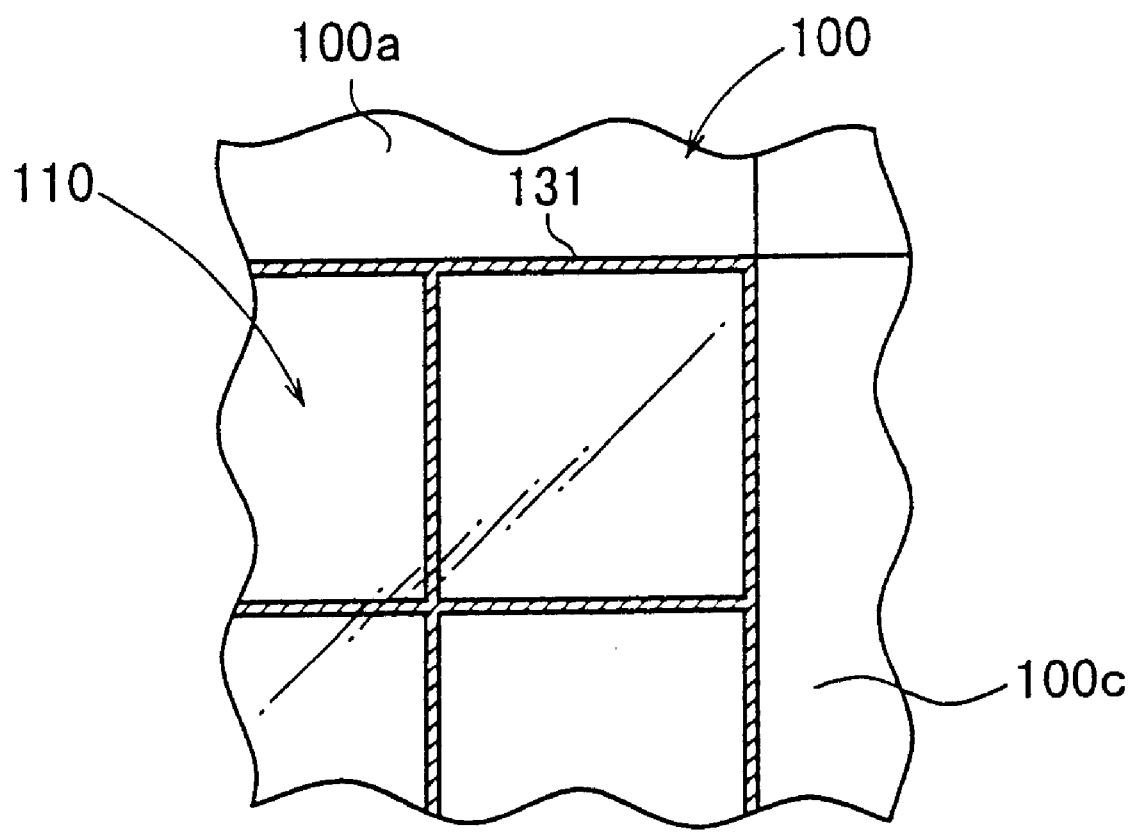
FIG. 19 illustrates an example in which divided optical guide plates are stacked and secured in a frame.

That is, in the display device 10C shown in FIG. 18, the divided optical guide plates 112 are stacked in the opening 122 of the frame 100. Thus, one large optical guide plate 140 is completed by the flame 100 and a large number of divided optical guide plates 112. One display module 144 is constructed by sticking a plurality of display components 14 to the module optical waveguide plate 142. The display module 144 is stuck to the large optical guide plate 140. Thus, the display device 10C according to the third embodiment is constructed. In this arrangement, as shown in FIG. 19, a substance 131 having a light-transmitting property adjusted for its refractive index is allowed to intervene between end surface portions of the respective divided optical guide plates 112 and between the divided optical guide plates 112 and the inner wall of the frame 100.

In this arrangement, the module optical waveguide plate 142 has a size which is obtained by multiplying a size of the divided optical guide plate 112 or the display component 14 by an integer. It is preferable to select the multiplication by the integer so that the juncture of the module optical waveguide plates 142 is superimposed on the juncture of the divided optical guide plates 112. In the embodiment shown in FIG. 18, the module optical waveguide plate 142 has substantially the same thickness as that of the optical waveguide plate 20 for constructing the display component 14, and it has a size as obtained by arranging one array of the divided optical guide plates 112 in the vertical direction. Therefore, one display module 144 is allotted and secured to the divided optical guide plates 112 corresponding to one array arranged in the vertical direction.

As for the refractive index of the substance 131, it is preferable that the difference between the refractive index of the divided optical guide plate 112 and the refractive index of the substance 131 is decreased to be as small as possible, in order to avoid any sense of incongruity at the juncture of the divided optical guide plates 112. The allowable difference in refractive index also relates to the thickness of the divided optical guide plate 112. However, assuming that the refractive index of the divided optical guide plate 112 is $N_1$, the sense of incongruity can be generally avoided at the juncture if the refractive index $N_2$ of the substance 131 satisfies the following expression:

$$0.9N_1 \leq N_2 \leq 1.1N_1$$

In addition to the effect described above, the thickness of the divided optical guide plate 112 can be increased, and the assembling performance and the stability of the structure after the assembling are improved, if the refractive index $N_2$ of the substance 131 satisfies the following expression:

$$0.99N_1 \leq N_2 \leq 1.01N_1$$

Figure 20:
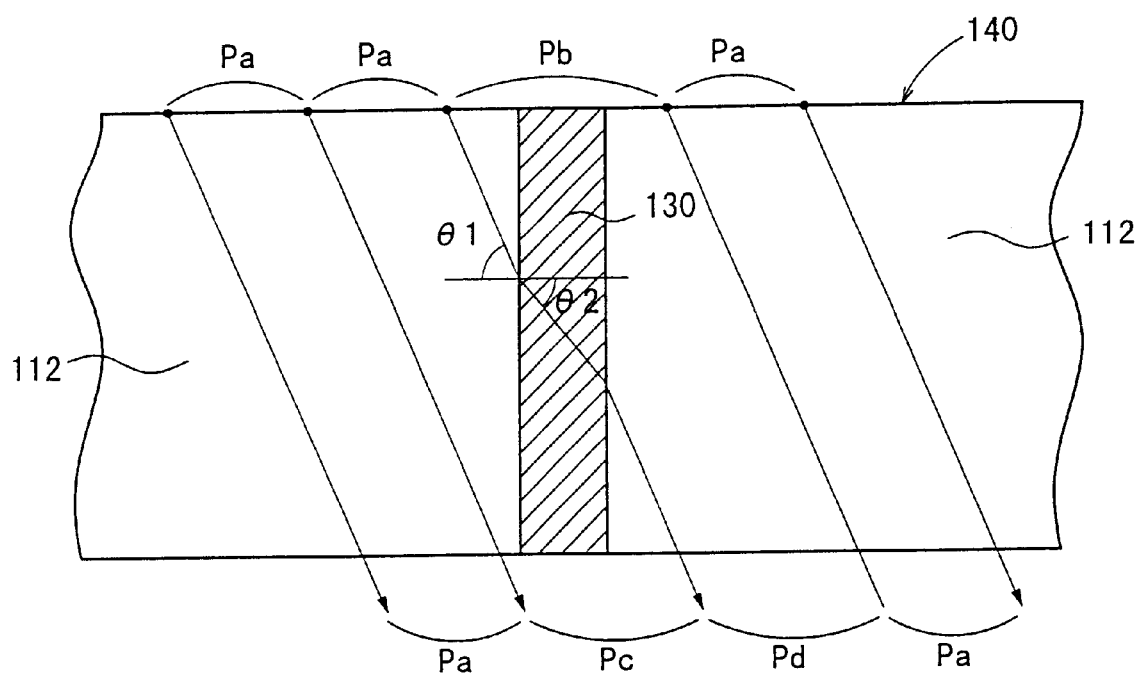
FIG. 20 illustrates the pitch of the picture element at the juncture portion of the divided optical guide plates.

On the other hand, the juncture of the divided optical guide plates 112 involves such a structural problem that the divided optical guide plates 112 are arranged. For this reason, as shown in FIG. 20, the pitch Pb of the picture element ranging over the juncture is larger than the ordinary pitch Pa of the picture element, and the juncture is conspicuous in many cases. Accordingly, the refractive index $N_2$ of the substance 131 is preferably adjusted to satisfy the following expression:

$$N_1 < N_2 \leq 1.01N_1$$

Accordingly, when the light emitted from the picture element passes through the juncture portion, the light is refracted in accordance with the relationship of the refractive indexes $N_1$ and $N_2$ adjusted as described above. When the light outgoes from the display surface, the pitches Pc, Pd of the picture elements ranging over the juncture consequently approach the ordinary pitch Pa of the picture element (Pa<Pc<Pb, Pa<Pd<Pb). Thus, it is possible to mitigate the sense of incongruity at the juncture.

The light-transmitting property of the substance 131 is determined in order that the light is successfully introduced up to the display component 14 in an efficient manner, and the electric power consumption is suppressed. Therefore, it is preferable that the transmittance is not less than 50% for the perpendicular incident light at the wavelength in the visible light region. It is more preferable that the transmittance is not less than 70%.

The form of the substance 131 may be any one of gas, liquid, and solid, or it may be a mixture thereof, provided that the substance 131 satisfies the foregoing conditions.

The shape of the divided optical guide plate 112 may be any one including, for example, rectangular parallelepiped, prism, column, and truncated pyramid, provided that the display component 14 can be secured thereto, and the display component 14 can be stacked in a stable manner. However, the shape is preferably rectangular parallelepiped in view of the machining performance and the assembling performance.

In view of the assembling performance and the repair performance, the size of the divided optical guide plate 112 is preferably a size having a length of 40 mm to 500 mm and a width of 40 mm to 500 mm. The thickness is preferably 2 mm to 40 mm in order to satisfy both of the assembling performance and the disappearance of the sense of incongruity at the juncture.

The material for the divided optical guide plate 112, and the material for the upper plate 100a, the lower plate 100b, and the side plates 100c, 100d for constructing the frame 100 may be either an inorganic material or an organic material, provided that the light-transmitting property is satisfactory at the wavelength in the visible light region, in the same manner as in the large optical guide plate 140. Specifically, it is possible to use a simple substance or a combined material composed of, for example, glass, quartz, light-transmitting alumina, acrylic resin, methacrylic resin, polycarbonate, vinyl chloride resin, phenol resin, vinyl acetate resin, ABS, fluororesin, and unsaturated polyester resin. Especially, in view of the cost and the machining performance, it is preferable to use glass, acrylic resin, and methacrylic resin. As for the glass, it is preferable to use, for example, Vycor glass, 96% silicate glass, alumino silicate glass, borosilicate glass, zinc borosilicate glass, and barium borosilicate glass. As for the light-transmitting property, it is preferable that the transmittance is not less than 50% for the perpendicular incident light at the wavelength in the visible light region. It is more preferable that the transmittance is not less than 70%.

An adhesive, which has substantially the same refractive index as that of the frame 100 or the divided optical guide plate 112, may be used as the substance 131.

Explanation will now be made for the adhesive for assembling the upper plate 100a, the lower plate 100b, and the side plates 100c, 100d into the frame 100 and for the adhesive as the substance 131.

The adhesive herein has the meaning including adhesive, glue or sticker, adhesive to be solidified after curing, adhesive to be flexible after curing, rubber-like adhesive, and gel-like adhesive.

The curing method is not specifically limited, including, for example, those of the types of UV setting, hot setting, cold setting, condensation setting, addition setting, and two-part setting.

The material may be either an inorganic material or an organic material, provided that the light-transmitting property is satisfactory at the wavelength in the visible light region. It is preferable to use those which have high insulating performance and low ignitability. It is more preferable to use those which are excellent in wettability with respect to the optical guide plate and which are stable for a long period of time, for example, against heat, light, and moisture.

Specifically, it is possible to use a simple substance or a combined material based on, for example, urea-formaldehyde resin, phenol resin, epoxy resin, acrylic resin, methacrylic resin, cyanoacrylate, polyurethane, emulsion, hot melt, synthetic rubber, and natural rubber.

As for the adhesive as the substance 131, it is preferable to use the adhesive to be flexible after curing, the rubber-like adhesive, and the gel-like adhesive, in order to effect the mitigation of the thermal expansion and the detachment performance upon repair.

In other words, when those to be completely solidified are used as the adhesive to be used as the substance 131, the divided optical guide plates 112 are tightly secured with the adhesive. Therefore, it is possible to obtain the display device 10C having high mechanical strength. However, it is difficult to exchange any disabled display component 14 or any display module 144 stuck with the disabled display component 14 with new one. Therefore, such an adhesive is preferably adopted to the display device 10C which assumes the collective exchange all at once.

When those having flexibility are used as the adhesive, then it is possible to obtain the display device 10C having high mechanical strength, and it is easy to perform cutting. Therefore, it is easy to exchange any disabled display component 14 or any display module 144 stuck with the disabled display component 14 with new one, which is excellent in the repair performance.

As for the substance 131, the completely solidifying type may be used for all portions, or the flexible type may be used for all portions. Alternatively, for example, a plurality of divided optical guide plates 112 corresponding to a plurality of display components 14 which are managed by one driver board 118, or a plurality of divided optical guide plates 112 corresponding, for example, to one display module 144 (three divided optical guide plates 112 in the vertical direction in the embodiment shown in FIG. 18) may be secured with an adhesive of the completely solidifying type to provide a certain unit. A flexible type adhesive as the substance 131 may be allowed to intervene at end surface portions of the plurality of units and between the units and the frame 100.

Next, explanation will be made for a method for producing the display device 10C according to the third embodiment. At first, the divided optical guide plate 112 is subjected to a surface treatment. Specifically, the surface of the divided optical guide plate 112 is coated with a hard coating material. Accordingly, it is possible to avoid any scratch on the surface of the divided optical guide plate 112. For example, it is possible to previously avoid such a phenomenon that the white dot locally appears when the black is displayed, or the brightness is increased as a whole. Also in this case, it is possible to use, as the hard coating material, acrylic hard coating materials and silicone hard coating materials.

Subsequently, the end surface of the divided optical guide plate 112 is mirror-finished. Accordingly, it is possible to lower, up to the level of no sense of incongruity, the leakage of light from the juncture of the divided optical guide plate 112. Thus, the juncture is scarcely conspicuous. When the end surface of the divided optical guide plate 112 is mirror-finished, the light from the light source 104 is sufficiently delivered over all of the divided optical guide plates 112. Therefore, it is possible to ensure a desired angle of visibility (angle of visibility corresponding to the number of the divided optical guide plates 112). In the mirror-finishing, in order to avoid any sense of incongruity at the juncture, it is preferable that Rmax is not more than 0.3, and it is more preferable that Rmax is not more than 0.05.

Especially, it is preferable that when the divided optical guide plate 112 is machined, then the dimensional accuracy of the divided optical guide plate 112 is not more than ±0.1 mm with respect to the reference dimension of 100 mm, the perpendicularity between the end surfaces and between the end surface and the flat surface is not more than 0.1 mm, and the parallelism between the end surfaces and between the flat surfaces is not more than 0.1 mm. It is more preferable that the dimensional accuracy of the divided optical guide plate 112 is not more than ±0.03 mm with respect to the reference dimension of 100 mm, the perpendicularity between the end surfaces and between the end surface and the flat surface is not more than 0.03 mm, and the parallelism between the end surfaces and between the flat surfaces is not more than 0.03 mm.

Accordingly, it is possible to decrease the cumulative pitch error when the divided optical guide plates 112 are stacked in the opening 122 of the frame 100. As a result, it is possible to decrease the gap dispersion of the juncture. Further, the thickness dispersion of the divided optical guide plate 112 is also decreased. It is possible to suppress the leakage of light which would be otherwise caused by the difference in level or height. Accordingly, when the machining conditions described above are satisfied, it is possible to make the juncture to be more inconspicuous.

It is preferable that the pitch of the picture element of each of the display components 14 conforms to the distance between the picture elements at the juncture portion between the display components 14. Accordingly, it is possible to eliminate any discrepancy between the pitch of the picture element in the display component 14 and the pitch of the picture element at the juncture of the display components 14. Thus, it is possible to reduce the distortion of the image.

Subsequently, the two side plates 100c, 100d are secured to the lower plate 100b, for example, with the adhesive of the completely solidifying type to produce a frame having an angular U-shaped configuration.

Subsequently, the plurality of divided optical guide plates 112 are successively stacked from the stacking base point of the upper surface of the lower plate 100b of the angular U-shaped frame. During this process, the stacking is performed while allowing, for example, the flexible type adhesive 130 (for example, XSG-1 or XVL-14SG2 produced by Kyoritsu Chemical & Co., Ltd., or 3088B produced by Threebond Co., Ltd.) to intervene between the lower plate 100b and the divided optical guide plates 112, between the side plates 100c, 100d and the divided optical guide plates 112, and between the end surfaces of the respective divided optical guide plates 112.

After stacking all of the divided optical guide plates 112, the upper plate 100a for constructing the frame 100 is stacked as shown in FIG. 18. In this process, for example, the adhesive of the completely solidifying type is applied between the upper plate 100a and the side plates 100c, 100d. For example, the flexible type adhesive is allowed to intervene between the upper plate 100a and the divided optical guide plates 112. A certain load is applied downwardly to obtain substantially uniform spacing distances between the respective divided optical guide plates 112. After that, the upper plate 100a and the side plates 100c, 100d are tightly secured to one another.

At this stage, the large optical guide plate 140 is constructed by the frame 100 and the plurality of divided optical guide plates 112. The display surface is formed by the first principal surface of the large optical guide plate 140. However, a minute difference in level or height is occasionally formed on the display surface due to the dispersion of the thickness of the divided optical guide plate 112. In this case, it is preferable to eliminate the minute difference in level or height, for example, by means of polishing. Accordingly, the juncture becomes inconspicuous.

Subsequently, the plurality of display components 14 or the plurality of display modules 144 are arranged and secured to the first principal surface of the large optical guide plate 140 to construct the main display device body 102. In the embodiment shown in FIG. 18, for example, the large optical guide plate 140 is opposed to the module optical waveguide plate 142 of the display module 144. An adhesive of the completely solidifying type (for example, BENEFIX VL produced by ADELL Co., Ltd. or 3088B produced by Threebond Co., Ltd.) is applied between the large optical guide plate 140 and the module optical waveguide plate 142. The large optical guide plate 140 and the plurality of module optical waveguide plates 142 are stuck to one another, and then the adhesive is cured.

The driver board 118 is attached to the circuit boards 114 of the respective display components 14 to make electric connection. Thus, the display device 10C according to the third embodiment is completed.

As described above, in the display device 10C according to the third embodiment, for example, the flexible type adhesive 131, which has substantially the same refractive index as that of the divided optical guide plate 112, is allowed to intervene at the end surface portion of each of the divided optical guide plates 112. Therefore, when the plurality of divided optical guide plates 112 are arranged to produce the display device 10C, it is possible to obtain the display device 10C in which the juncture portion between the divided optical guide plates 112 is scarcely conspicuous.

When the plurality of divided optical guide plates 112 are arranged to produce the display device 10C, the stacking is successfully performed while allowing the substance 131 (for example, the adhesive) to intervene at the end surface portions of the divided optical guide plates 112. Therefore, when the display device 10C is installed in a variety of districts, then the plurality of divided optical guide plates 112 are transported to a working site, and the divided optical guide plates 112 are successfully stacked at the working site to produce the display device 10C. Accordingly, it is possible to reduce the production cost and the cost required for the transport, as compared with a case in which the display device 10C itself is transported.

Next, explanation will be made with reference to FIGS. 21 to 25 for several modified embodiments of the display device 10C according to the third embodiment. In the explanation of the modified embodiments, the description of the light source 104 and the driver board 118 will be omitted.

Figure 21:
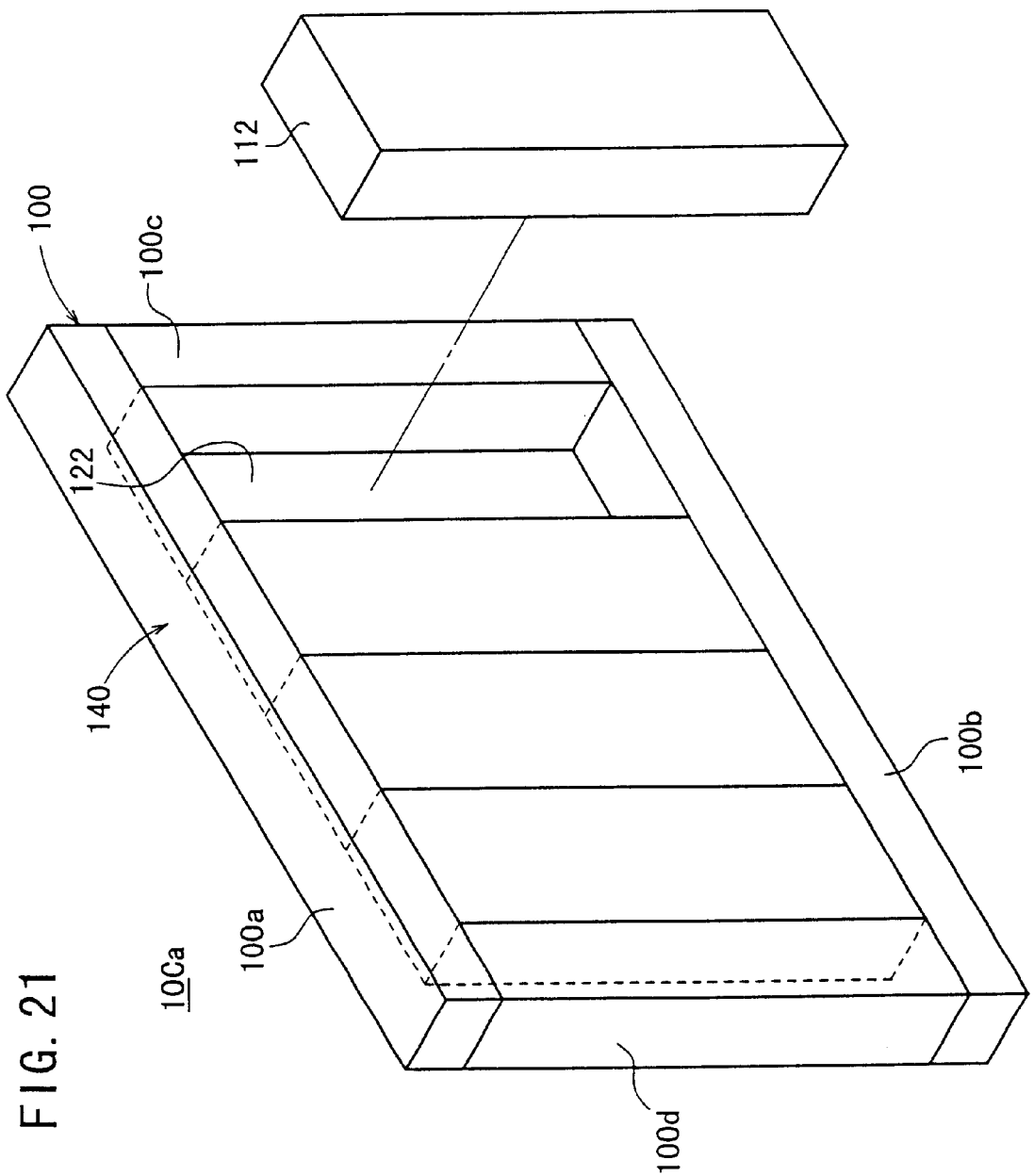
FIG. 21 shows, with partial omission, an arrangement of a first modified embodiment of the display device according to the third embodiment.

As shown in FIG. 21, a display device 10Ca according to a first modified embodiment is constructed in approximately the same manner as the display device 10C according to the third embodiment described above. However, the former is different from the latter in that the length of the divided optical guide plate 112 in the vertical direction is substantially the same as the length of the opening 122 of the frame 100 in the perpendicular direction (vertical direction). In this arrangement, it is enough to use a small number of divided optical guide plates 112 as compared with the display device 10C according to the third embodiment. Therefore, it is possible to greatly reduce the number of assembling steps.

Figure 22:
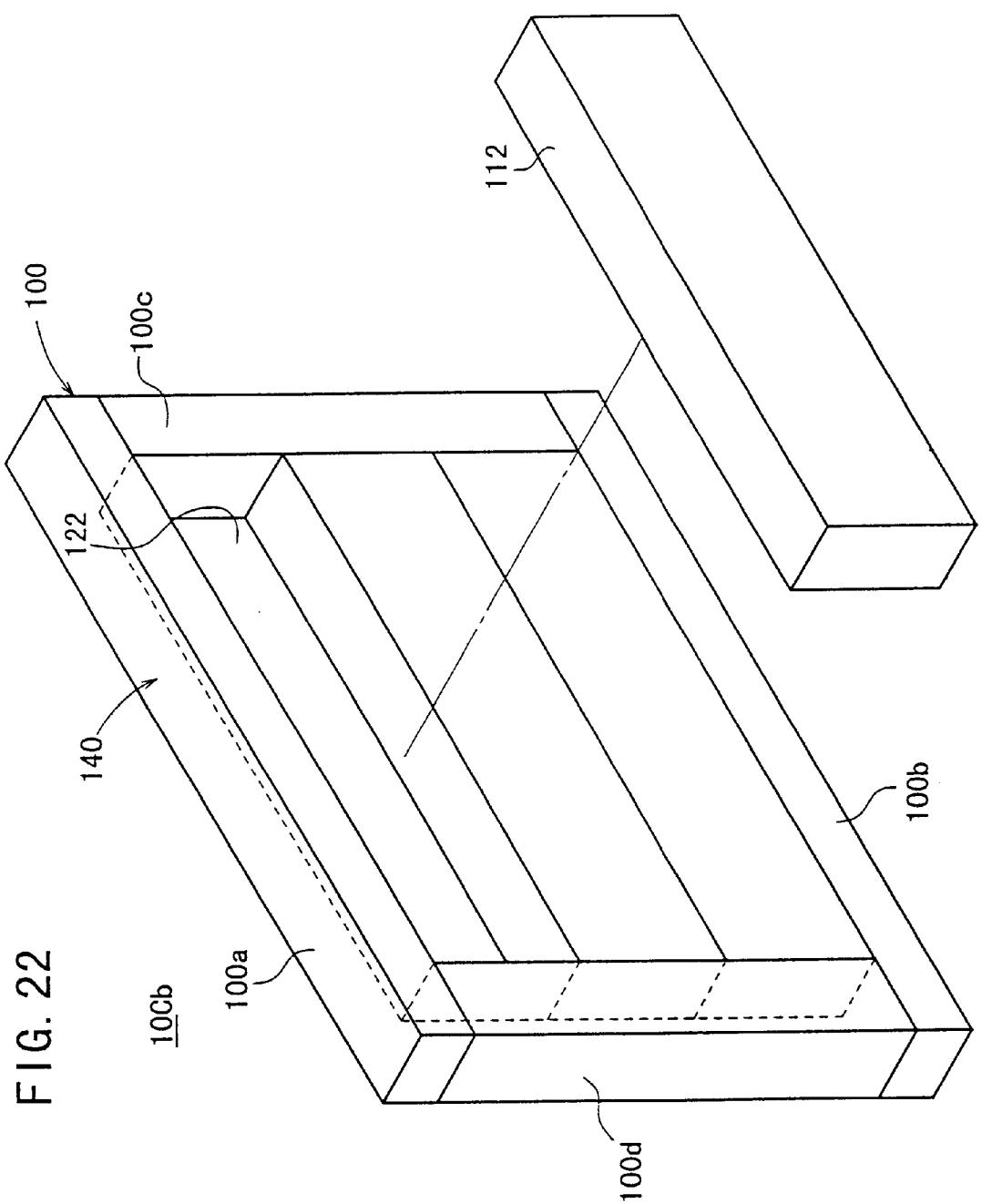
FIG. 22 shows, with partial omission, an arrangement of a second modified embodiment of the display device according to the third embodiment.

As shown in FIG. 22, a display device 10Cb according to a second modified embodiment is constructed in approximately the same manner as the display device 10C according to the third embodiment described above. However, the former is different from the latter in that the length of the divided optical guide plate 112 in the lateral direction is substantially the same as the length of the opening 122 of the frame 100 in the horizontal direction (lateral direction). Also in this arrangement, it is possible to greatly reduce the number of assembling steps.

Figure 23:
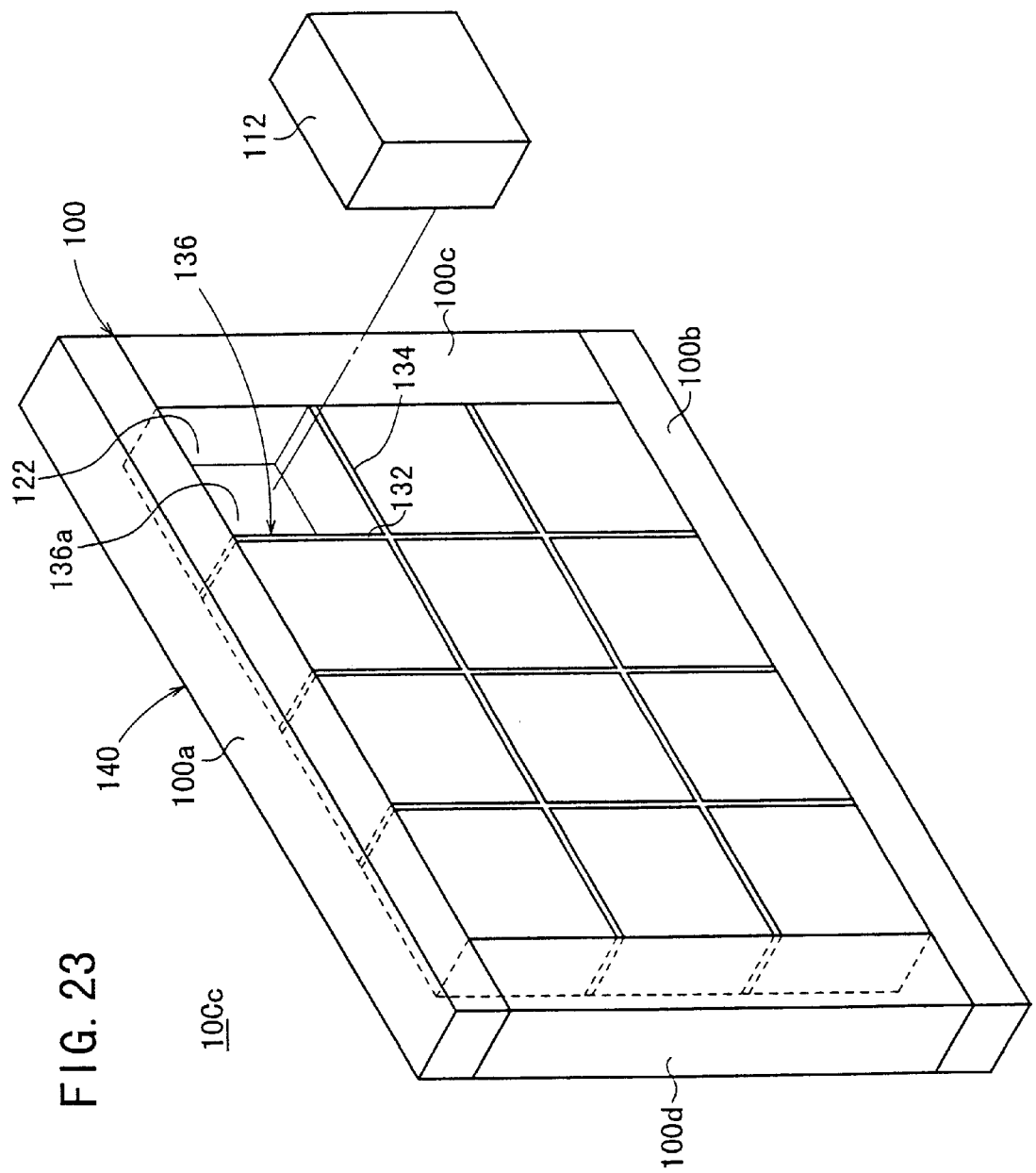
FIG. 23 shows, with partial omission, an arrangement of a third modified embodiment of the display device according to the third embodiment.

As shown in FIG. 23, a display device 10Cc according to a third modified embodiment is constructed in approximately the same manner as the display device 10C according to the third embodiment described above. However, the former is different from the latter in that a plurality of support members 132, 134 are arranged in the opening 122 of the frame 100. This embodiment is illustrative of a case in which the support members 132, 134 are assembled and arranged in a lattice-shaped configuration (lattice-shaped support member 136). One opening (lattice window 136a) of the lattice-shaped support member 136 has a size which is approximately the same as or slightly larger than the divided optical guide plate 112.

When the lattice-shaped support member 136 is produced, for example, it may be integrally formed with transparent resin. Alternatively, the lattice-shaped support member 136 may be constructed by forming cutouts at necessary portions of plate-shaped support members 132, 134, and inserting the cutouts of the respective support members 132, 134 while matching them to one another. The lattice-shaped support member 136 and the frame 100 may be secured to one another, for example, with the completely solidifying type adhesive or the flexible type adhesive. Alternatively, the lattice-shaped support member 136 may be in a floating state in the opening 122 without securing the lattice-shaped support member 136 to the frame 100.

Next, explanation will be made for a method for producing the display device 10Cc according to the third modified embodiment. The divided optical guide plate 112 is subjected to the surface treatment, and the end surface is mirror-finished. After that, the support members 132, 134 for constructing the lattice-shaped support member 136 are subjected to the surface treatment. In this process, the surface of the support member 136 is coated with a hard coating material. Accordingly, it is possible to avoid any scratch on the surfaces of the support members 132, 134. For example, it is possible to previously avoid such a phenomenon that the white dot locally appears when the black is displayed, or the brightness is increased as a whole.

Subsequently, the surfaces of the support members 132, 134 are mirror-finished so that Rmax is not more than 0.3. Accordingly, the juncture is scarcely conspicuous. It is also possible to ensure a desired angle of visibility. Further, in the same manner as the divided optical guide plate 112, it is also preferable that the dimensional accuracy of the support members 132, 134 is not more than ±0.1 mm with respect to the reference dimension of 100 mm, the perpendicularity between the end surfaces and between the end surface and the flat surface is not more than 0.1 mm, and the parallelism between the end surfaces and between the flat surfaces is not more than 0.1 mm. It is more preferable that the dimensional accuracy of the support members 132, 134 is not more than ±0.03 mm with respect to the reference dimension of 100 mm, the perpendicularity between the end surfaces and between the end surface and the flat surface is not more than 0.03 mm, and the parallelism between the end surfaces and between the flat surfaces is not more than 0.03 mm.

Subsequently, the two side plates 100c, 100d are secured to the lower plate 100b, for example, with the adhesive of the completely solidifying type to produce a frame having an angular U-shaped configuration. After that, the support members 132, 134 are assembled into the lattice form to provide the lattice-shaped support member 136. The lattice-shaped support member 136 is installed in the frame 100. In this arrangement, the lattice-shaped support member 136 may be secured to the frame 100.

Subsequently, the divided optical guide plates 112 are successively stacked in the lattice windows 136a of the lattice-shaped support member 136. During this process, the stacking is performed while allowing, for example, the flexible type adhesive 131 to intervene between the lower plate 100b and the divided optical guide plates 112, between the side plates 100c, 100d and the divided optical guide plates 112, and between the lattice-shaped support members 136 and the end surfaces of the respective divided optical guide plates 112.

After stacking all of the divided optical guide plates 112, the upper plate 100a for constructing the frame 100 is stacked and secured, and thus the large optical guide plate 140 is constructed. Subsequently, the minute difference in level or height, which results from the dispersion of the thickness of the divided optical guide plates 112 formed on the display surface of the large optical guide plate 140, is eliminated by means of polishing. Subsequently, the plurality of display components 14 or the plurality of display modules 144 are arranged and secured to the first principal surface of the large optical guide plate 140 to construct the main display device body 102. After that, the driver board 118 is attached to the circuit boards 114 of the respective display components 14 to make electric connection. Thus, the display device 10Cc according to the third modified embodiment is completed.

In the display device 10Cc according to the third modified embodiment, the assembling is performed by arranging the lattice-shaped support member 136 in the opening 122 of the frame 100, and inserting the divided optical guide plates 112 into the respective lattice windows 136a of the lattice-shaped support member 136. Therefore, it is easy to perform the stacking operation for the divided optical guide plates 112. Thus, it is possible to shorten the working time.

Figure 24:
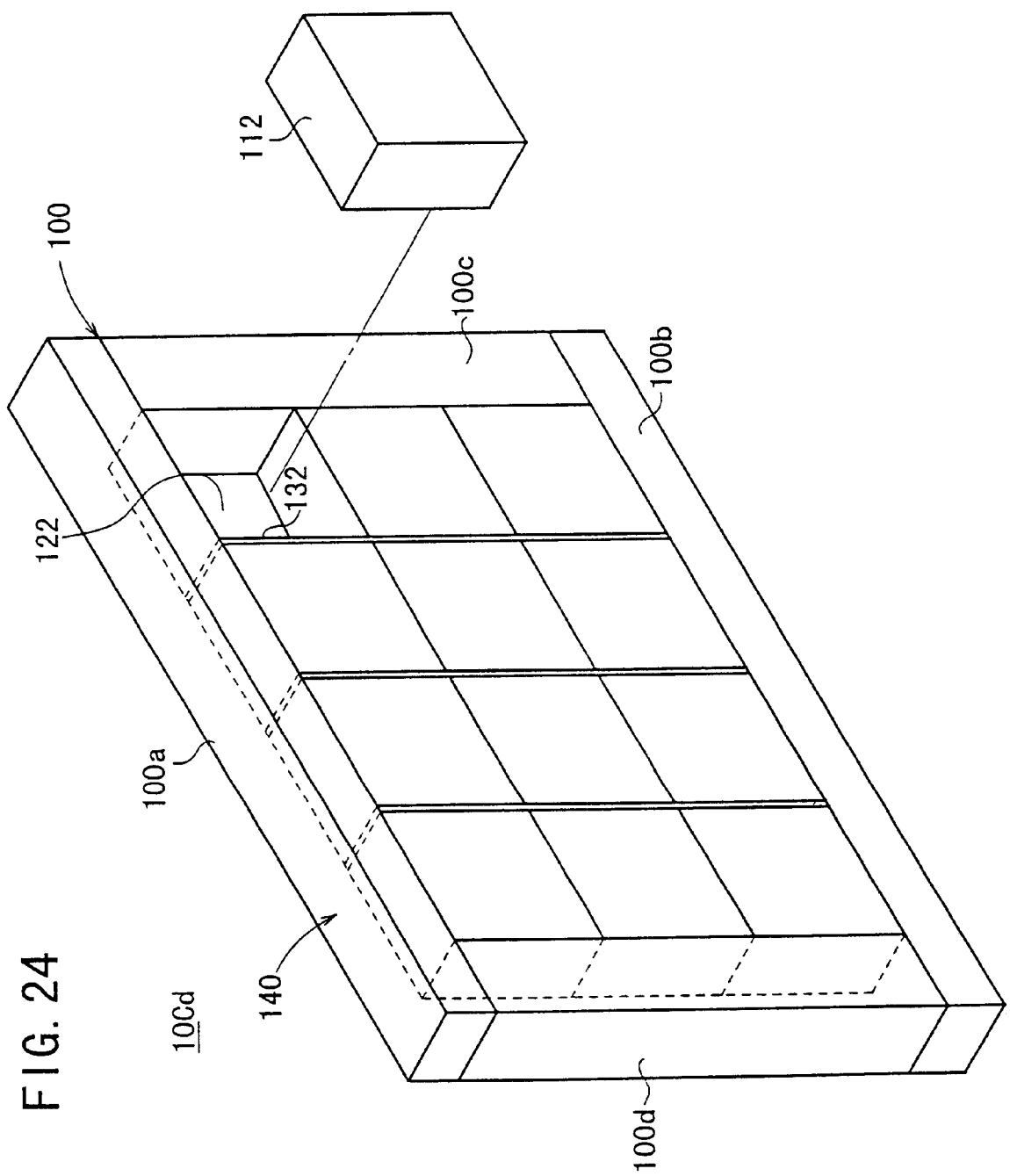
FIG. 24 shows, with partial omission, an arrangement of a fourth modified embodiment of the display device according to the third embodiment.

As shown in FIG. 24, a display device 10Cd according to a fourth modified embodiment is constructed in approximately the same manner as the display device 10Cc according to the third modified embodiment described above. However, the former is different from the latter in that a plurality of plate-shaped support members 132 are installed in the vertical direction respectively in place of the lattice-shaped support member 136. In this embodiment, the discrepancy of the arrangement in the horizontal direction is canceled owing to the presence of the support members 132.

Figure 25:
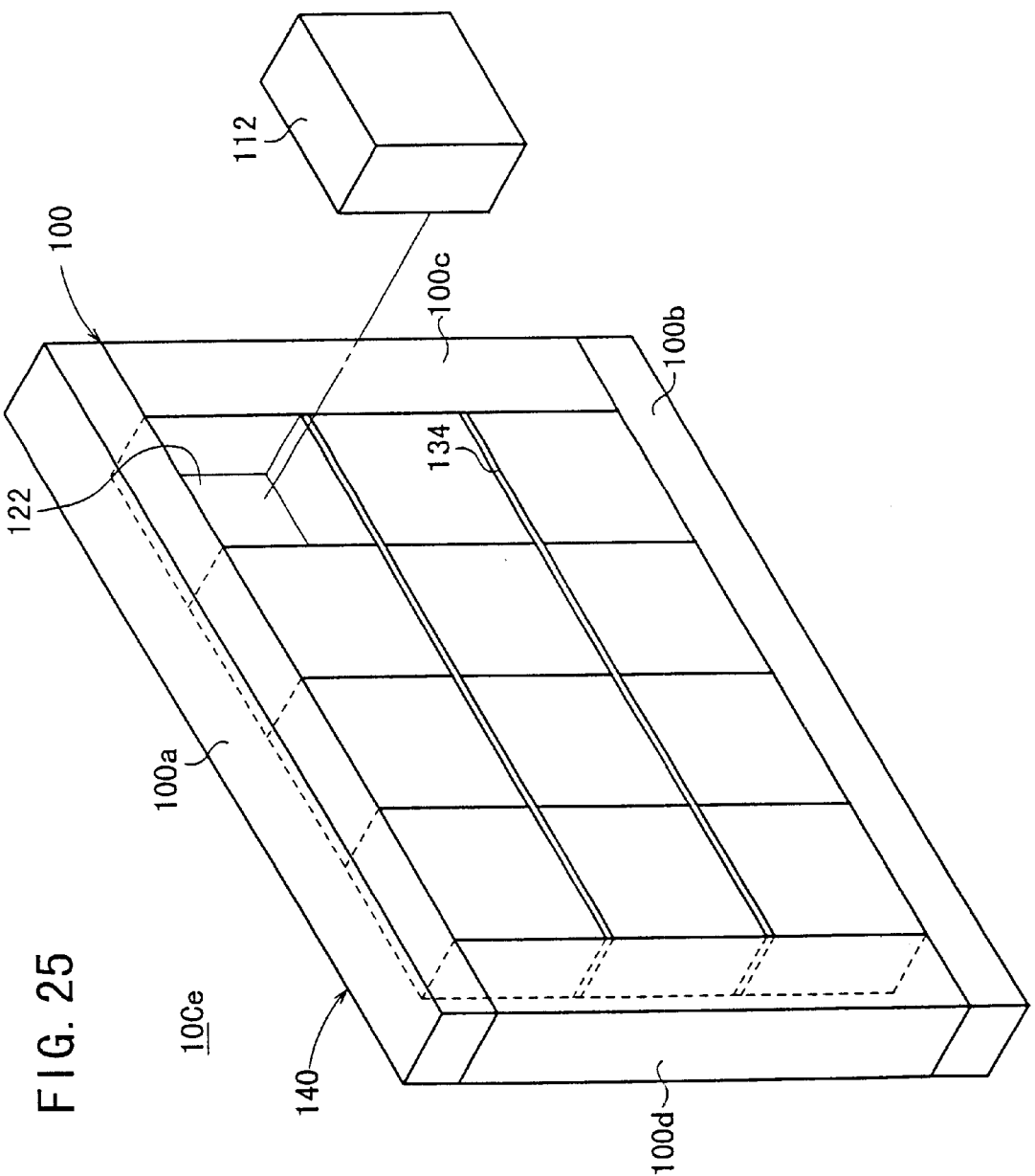
FIG. 25 shows, with partial omission, an arrangement of a fifth modified embodiment of the display device according to the third embodiment.

As shown in FIG. 25, a display device 10Ce according to a fifth modified embodiment is constructed in approximately the same manner as the display device 10Cc according to the third modified embodiment described above. However, the former is different from the latter in that a plurality of plate-shaped support members 134 are installed in the lateral direction respectively in place of the lattice-shaped support member 136. In this embodiment, the discrepancy of the arrangement in the vertical direction during the stacking is canceled owing to the presence of the support members 134.

Next, explanation will be made with reference to FIGS. 26 to 29 for a display device 10D according to a fourth embodiment and a modified embodiment 10Da thereof.

Figure 26:
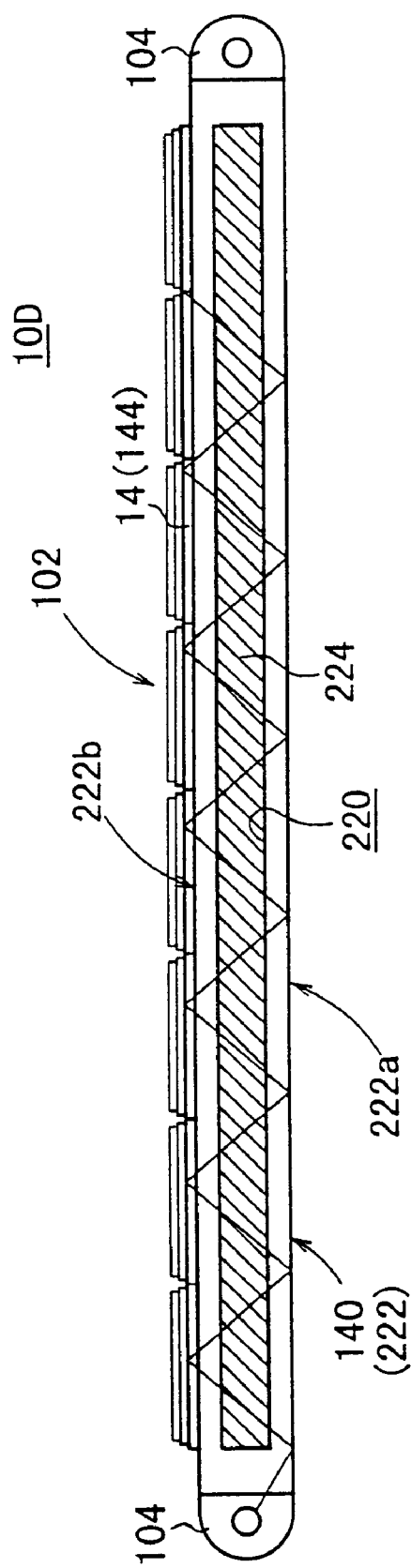
FIG. 26 shows, with partial omission, a sectional view illustrating a display device according to a fourth embodiment.
Figure 27:
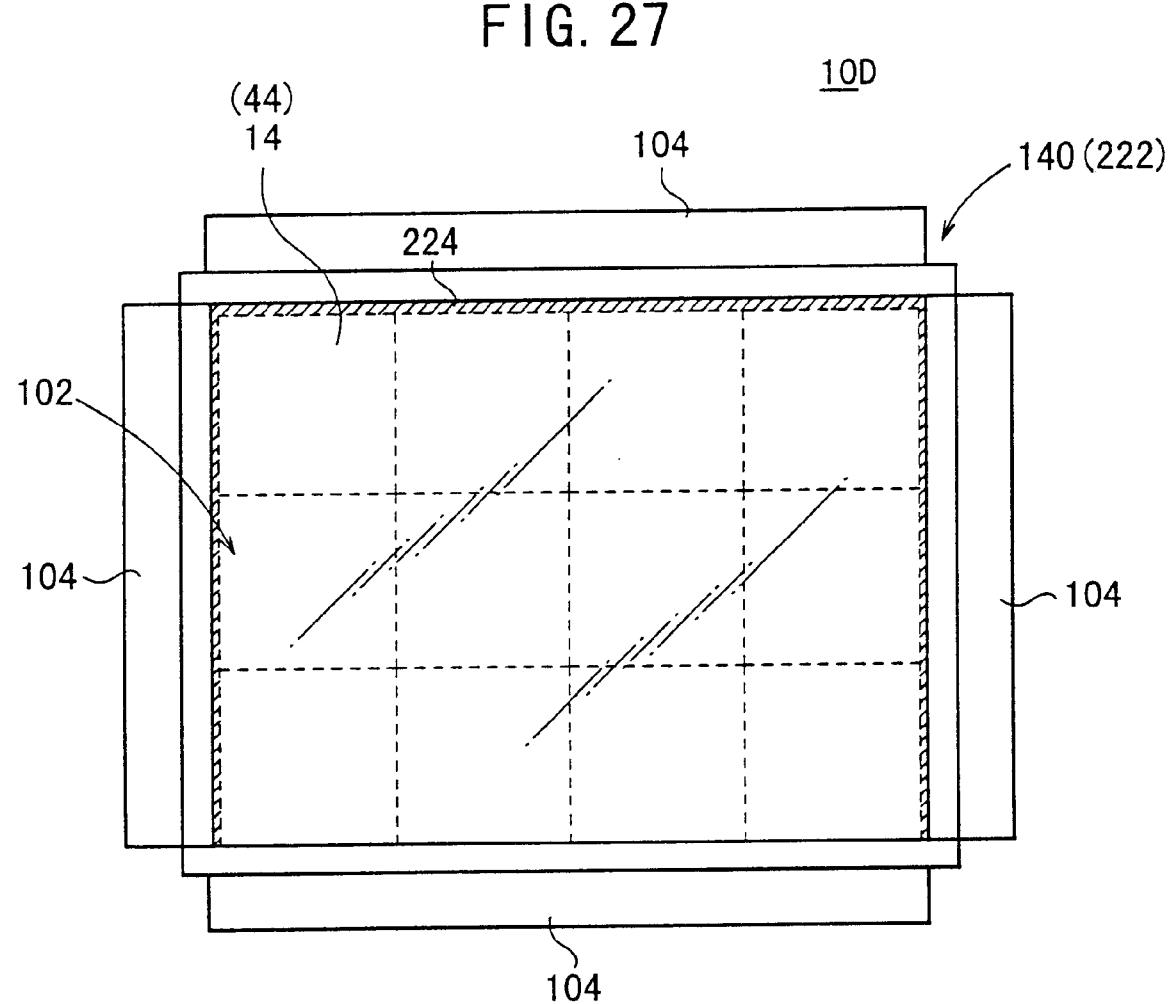
FIG. 27 shows, with partial omission, a plan view illustrating the display device according to the fourth embodiment.

As shown in FIGS. 26 and 27, the display device 10D according to the fourth embodiment is different in that the large optical guide plate 140 is constructed by a transparent vessel 222 having a hollow section 220. The hollow section 220 is filled with a substance 224 having a light-transmitting property adjusted for its refractive index. The matching oil described above can be used as the substance 224.

Figure 28:
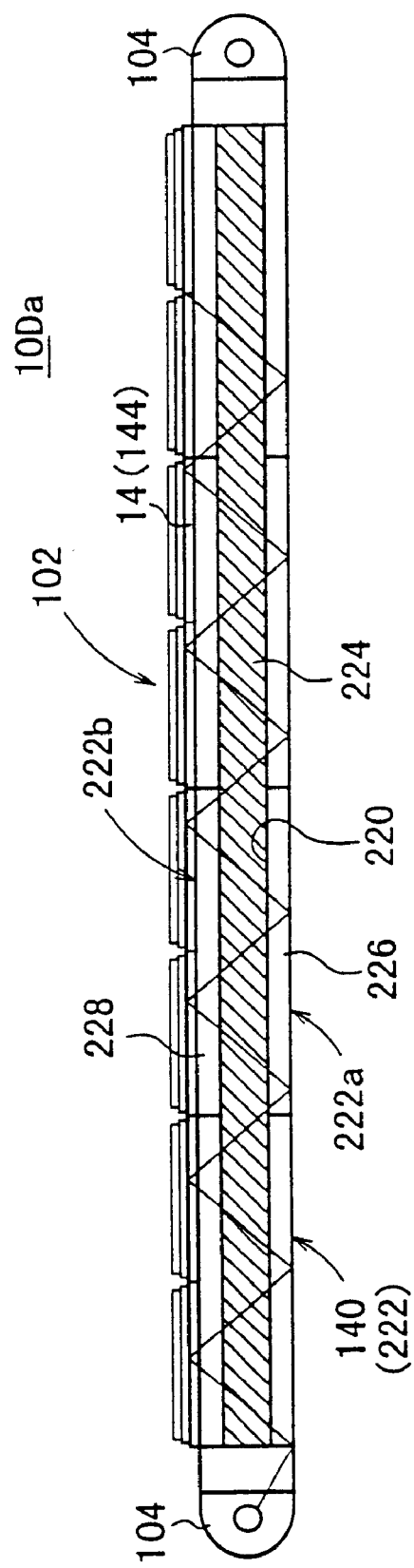
FIG. 28 shows, with partial omission, a sectional view illustrating a modified embodiment of the display device according to the fourth embodiment.
Figure 29:
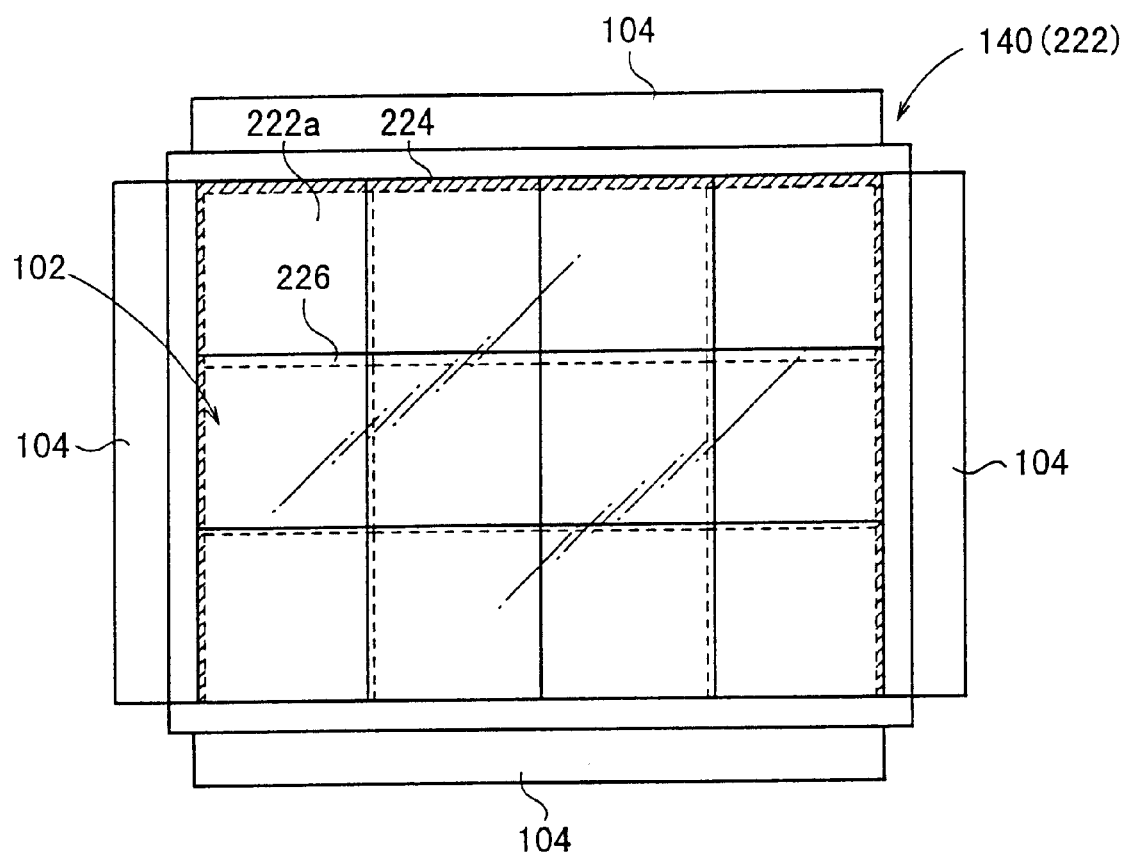
FIG. 29 shows, with partial omission, a plan view illustrating the modified embodiment of the display device according to the fourth embodiment.

As shown in FIGS. 28 and 29, the modified embodiment 10Da of the display device 10D according to the fourth embodiment is different in that a front panel 222a, which constitutes the vessel 222, is composed of a plurality of divided plates 226 arranged in a matrix configuration, and end surfaces of the respective divided plates 226 are secured to one another, for example, with an adhesive of the completely solidifying type. In this embodiment, a back panel 222b is composed of a plurality of divided plates 228 arranged in a matrix configuration, and end surfaces of the respective divided plates 228 are secured to one another, for example, with an adhesive of the completely solidifying type.

Therefore, when the display device 10Da according to this modified embodiment is produced, the process includes a step of producing the front panel 222a and the back panel 222b, and a step of producing the vessel 222, followed by the same steps as those of the method for producing the display device 10A or 10B according to the first or second embodiment described above.

In the display device 10Da according to this modified embodiment, the front panel 222a is constructed by arranging the plurality of divided plates 226. Therefore, the divided plate 226 to be used can be compact and inexpensive. Further, it is possible to use the divided plate 226 having a good quality involving few defects such as bubbles and foreign matters at the inside. The display device 10Da can be also assembled at a working site.

Next, explanation will be made with reference to FIG. 30 for a display device 10E according to a fifth embodiment.

Figure 30:
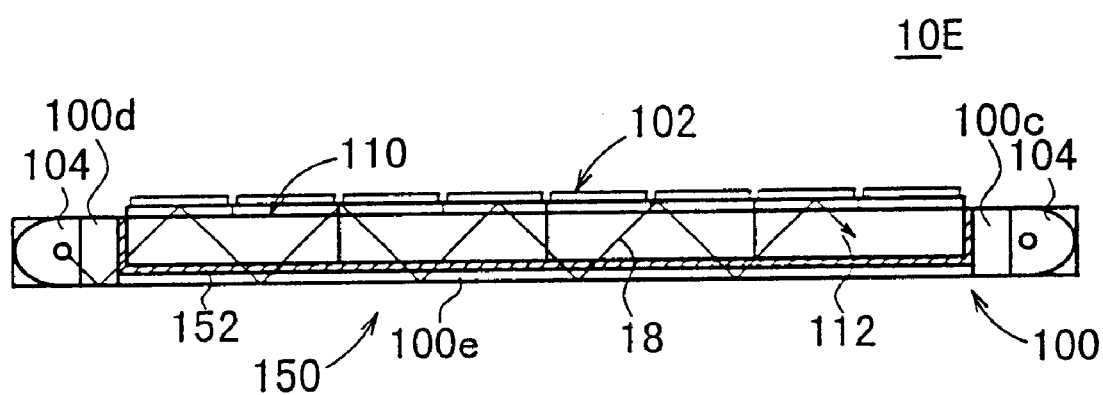
FIG. 30 shows, with partial omission, a sectional view illustrating a display device according to a fifth embodiment.
Figure 31:
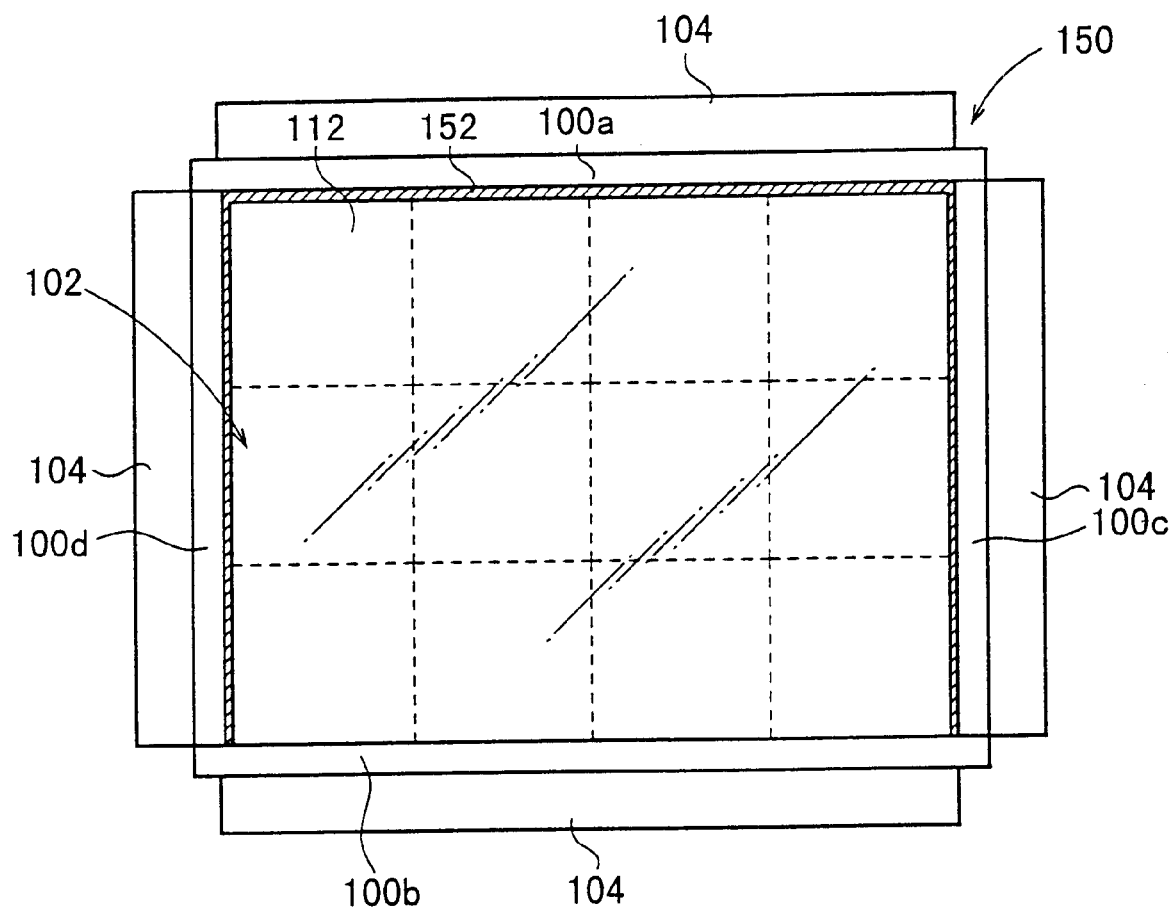
FIG. 31 shows, with partial omission, a plan view illustrating the display device according to the fifth embodiment.

As shown in FIGS. 30 and 31, the display device according to the fifth embodiment is constructed such that a main display device body 102 is accommodated in a casing 150 with a back opening composed of an upper plate 100a, a lower plate 100b, side plates 100c, 100d, and a front panel 100e each of which is made of an acrylic material. The main display device body 102 comprises a large number of divided optical guide plates 112 which are arranged in a matrix configuration, and a plurality of display components or a plurality of display modules 144 which are arranged and fixed.

The casing 150 is constructed such that the front panel 100e is secured, for example, with an adhesive of the completely solidifying type, to the frame 100 composed of the upper plate 100a, the lower plate 100b, and the side plates 100c, 100d.

The main display device body 102 is accommodated so that its display surface is opposed to the front panel 100e. A substance 152 having a light-transmitting property adjusted for its refractive index is allowed to intervene between the display surface and the front panel 100e and between the end surfaces of the respective divided optical guide plates 112. The display surface is tightly in contact with the front panel 100e by the aid of the substance 152 intervening therebetween. Further, the end surfaces of the respective divided optical guide plates 110 is tightly in contact with each other by the aid of the substance 152 intervening therebetween.

That is, the display device 10E according to the fifth embodiment has such a structure that the front panel 100e of the casing 150 is arranged at the front surfaces (display surfaces) of the respective divided optical guide plates 112, and thus the respective divided optical guide plates 112 are allowed to have the plate thickness required to introduce the light.

The matching oil described above can be used as the substance 152. On the other hand, the front panel 100e of the casing 150 may be made of either an inorganic material or an organic material, provided that the light-transmitting property is satisfactory at the wavelength in the visible light region. Specifically, it is possible to use a simple substance or a combined material composed of, for example, glass, quartz, light-transmitting alumina, acrylic resin, methacrylic resin, polycarbonate, vinyl chloride resin, phenol resin, vinyl acetate resin, ABS, fluororesin, and unsaturated polyester resin.

It is preferable that the front panel 100e of the casing 150 is made of the same material as that for the divided optical guide plate 112, for example, in view of the fact that the refractive index is identical, and the coefficient of thermal expansion is identical. As for the light-transmitting property, it is preferable that the transmittance is not less than 50% for the perpendicular incident light at the wavelength in the visible light region. It is more preferable that the transmittance is not less than 70%. The thickness of the front panel 100e is preferably 0.5 to 100 mm in view of the assembling performance.

Figure 32:
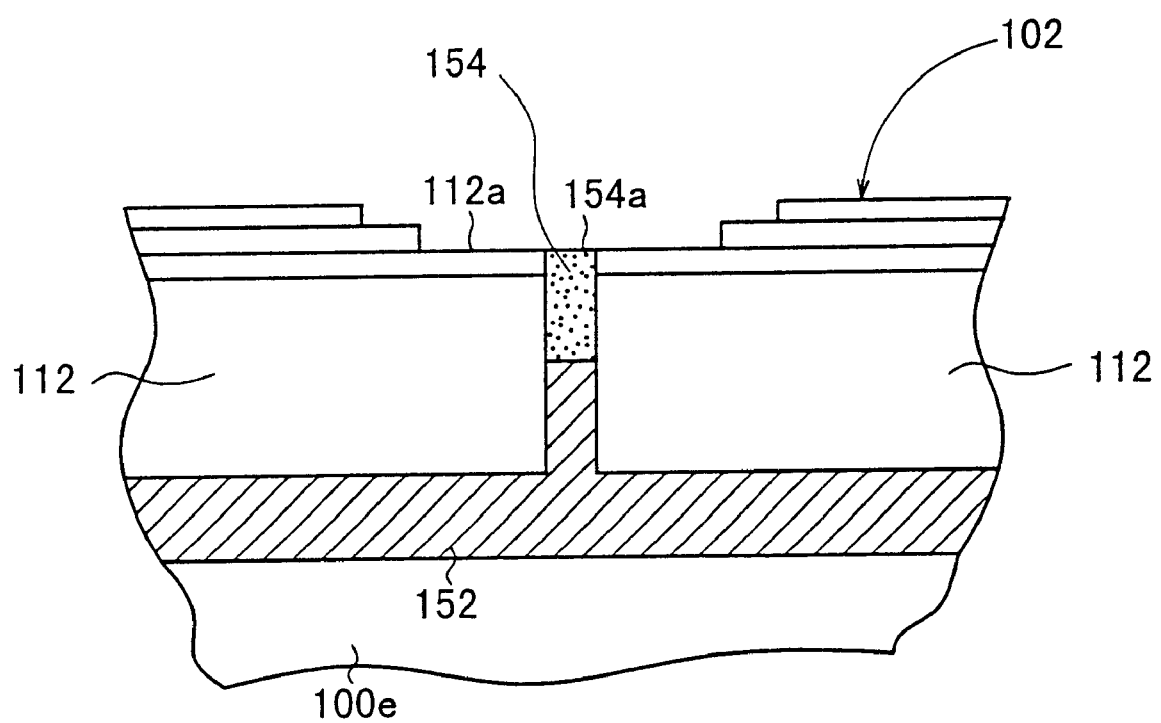
FIG. 32 shows a magnified view illustrating an example of an end surface portion of a divided optical guide plate.

As shown in FIG. 32, a seal member 154, which has substantially the same refractive index as that of the divided optical guide plate 112, is applied between the substance 152 and the atmospheric air between the end surfaces of the respective divided optical guide plates.

The seal member 154 includes adhesive, glue or sticker, adhesive to be solidified after curing, adhesive to be flexible after curing, rubber-like adhesive, and gel-like adhesive. Alternatively, the seal member 154 may be obtained by depositing such a material on a film-shaped member.

The material may be either an inorganic material or an organic material. It is preferable to use a material which does not cause any reaction with a substance to make contact therewith. Specifically, for example, it is possible to use those based on silicone, modified silicone, polysulfide, polyurethane, acrylic, epoxy, SBR, and butyl rubber. In this embodiment, the seal member 154 is preferably flexible, in view of the repair performance and the mitigation of thermal expansion.

It is preferable that the end 154a of the seal member 154, which contacts with the atmospheric air, is subjected to surface adjustment with respect to (flushed with) the back surface 112a of the divided optical guide plate 112 as shown in FIG. 32, in order that the light 18 traveling in the divided optical guide plate 112 is reflected at an appropriate angle.

Figure 33:
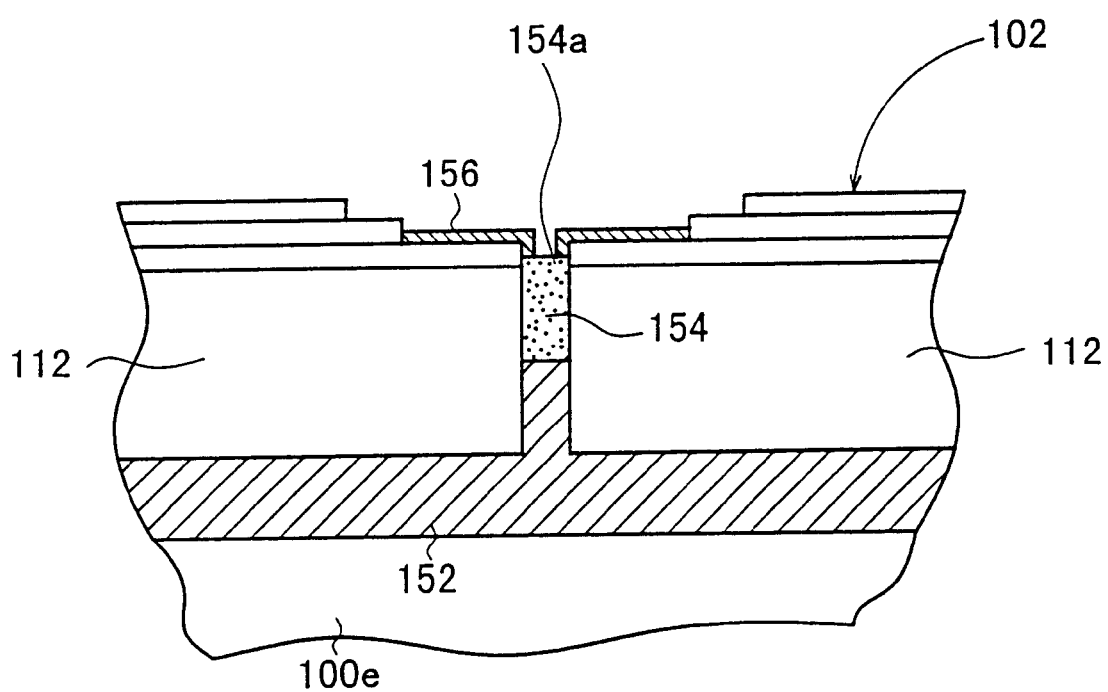
FIG. 33 shows a magnified view illustrating another example of an end surface portion of a divided optical guide plate.

In order to avoid the invasion of light from the back, as shown in FIG. 33, it is preferable that the adhesive 154 is applied between the end surfaces of the divided optical guide plates, and a light-absorbing material 156 is applied at the circumferential portions of the divided optical guide plates 112.

In this embodiment, the light-absorbing material 156 is applied to the end 154a of the seal member 154. Accordingly, the light, which incomes at an unsuitable angle, can be absorbed. Therefore, it is possible to improve the image quality. In this case, it is unnecessary to make the surface adjustment for the end 154a with respect to the optical guide plate 112. Accordingly, the degree of freedom of design is increased. Those usable as the light-absorbing material 156 include, for example, pigments and dyes.

Figure 34:
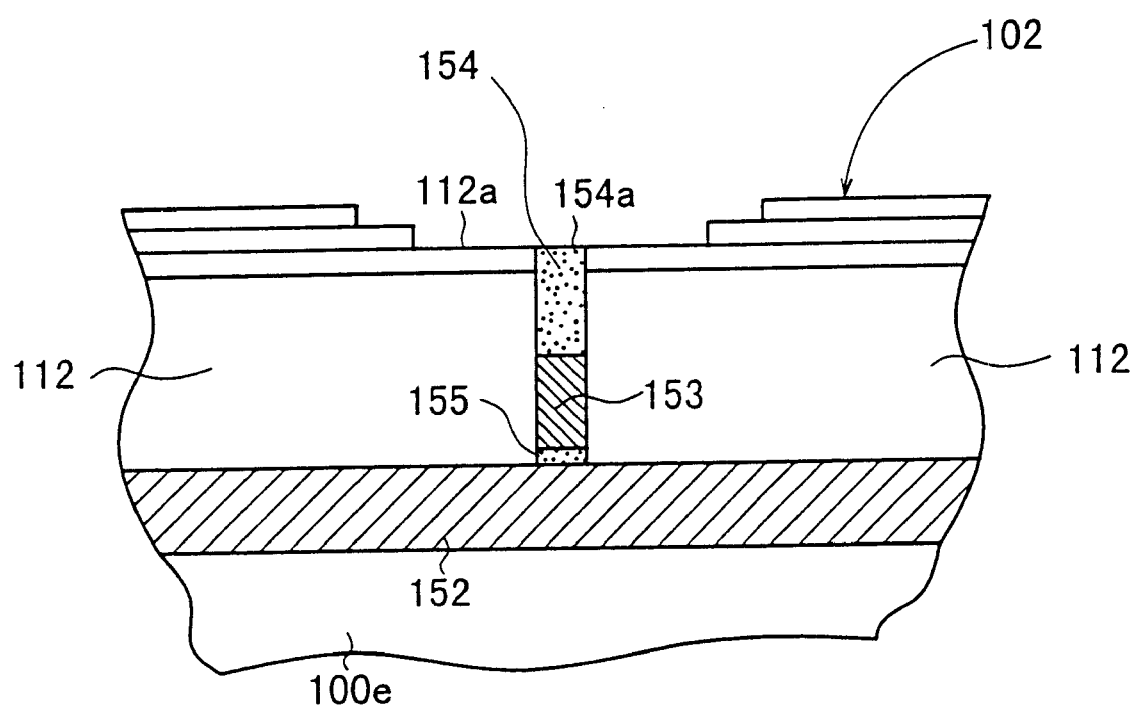
FIG. 34 shows a magnified view illustrating still another example of an end surface portion of a divided optical guide plate.

As shown in FIG. 34, it is not necessarily indispensable that the substance 152 having the light-transmitting property adjusted for its refractive index (conveniently referred to as "first substance 152"), which is allowed to exist between the front panel 100e and the divided optical guide plate 112, is identical with the substance 153 having the light-transmitting property adjusted for its refractive index (conveniently referred to as "second substance 153") which is allowed to exist at the end surface portion of the divided optical guide plate 112.

When the first and second substances 152, 153 to be used are composed of different materials, it is preferable that the refractive index $N_3$ of the first substance 152 satisfies the following expression, provided that the refractive index of the divided optical guide plate 112 is $N_1$, and the refractive index of the front panel 100e is $N_2$:

$$0.9N_1 \leq N_3 \leq 1.1N_2 (N_1 \leq N_2)$$

or $$0.9N_2 \leq N_3 \leq 1.1N_1 (N_2 \leq N_1)$$

Accordingly, the light 18 can be sufficiently introduced into the display component 14, and it is possible to ensure the display brightness of the screen. In order to efficiently introduce the light 18 into the display component 14 and suppress the electric power consumption, it is preferable that the transmittance is not less than 50% for the perpendicular incident light at the wavelength in the visible light region. It is more preferable that the transmittance is not less than 70%.

When the first and second substances 152, 153 to be used are composed of mutually different materials, and when the both are liquid, it is possible to prevent them from being mixed with each other by allowing the seal member 155 to intervene between the both. When any one of them is solid or when both of them are solid, they are not mixed with each other. Therefore, it is possible to omit the installation of the seal member 155. When the foregoing conditions are satisfied, the first and second substances 152, 153 may be in any form including gas, liquid, and solid, or they may be a mixture thereof.

When the display device 10E according to the fifth embodiment is produced, the casing 150 having the front panel 100e is prepared. The display device 10E can be produced with ease by allowing the display surfaces of the respective divided optical guide plates 112 to be opposed to the first principal surface of the front panel 100e, and allowing the substance 152 to intervene between the surfaces, wherein the respective divided optical guide plates 112 are arranged along the first principal surface of the front panel 100e.

As described above, the display device 10E according to the fifth embodiment is effective as follows in the same manner as the display device 10C according to the third embodiment described above. That is, in the display device 10E, when the plurality of divided optical guide plates 112 are arranged to produce the display device 10E, the juncture portion between the divided optical guide plates 112 is scarcely conspicuous. Further, the display device 10E is excellent in repair performance. Especially, in the display device 10E according to the fifth embodiment, when the substance 152 is the matching oil, it is possible to decrease the amount of use of the expensive matching oil. Thus, the display device 10E is advantageous to reduce the production cost.

Next, explanation will be made with reference to FIGS. 35 and 36 for a modified embodiment of the display device 10E according to the fifth embodiment.

Figure 35:
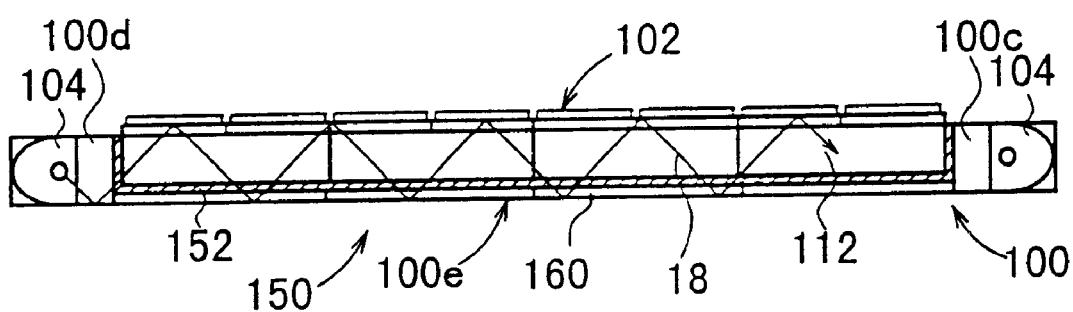
FIG. 35 shows, with partial omission, a sectional view illustrating a modified embodiment of the display device according to the fifth embodiment.
Figure 36:
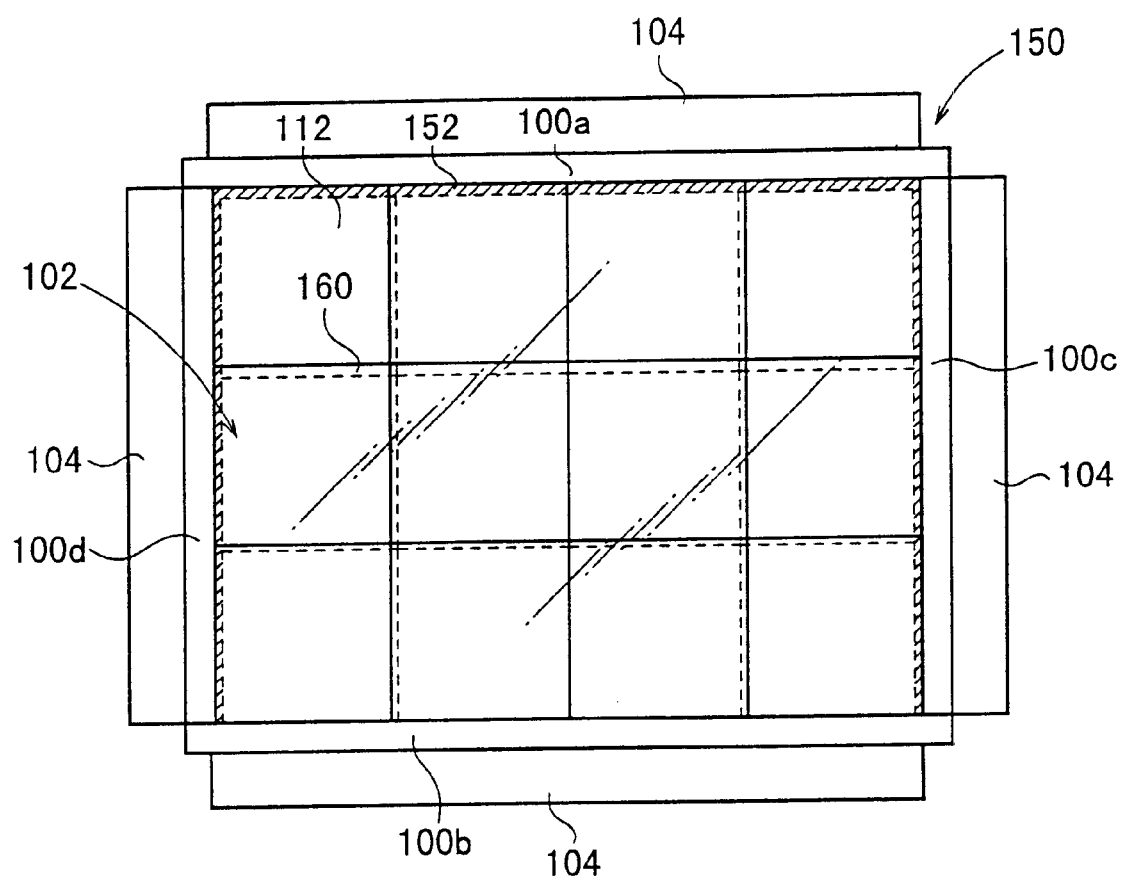
FIG. 36 shows, with partial omission, a plan view illustrating the modified embodiment of the display device according to the fifth embodiment.

As shown in FIGS. 35 and 36, a display device 10Ea according to this modified embodiment is constructed in approximately the same manner as the display device 10E according to the fifth embodiment described above. However, the former is different from the latter in that a front panel 100e is constructed by arranging a plurality of divided plates 160 in a matrix configuration, and end surfaces of the respective divided plates 160 are secured to one another, for example, with an adhesive of the completely solidifying type.

Therefore, when the display device 10Ea according to this modified embodiment is produced, the process includes a step of producing the front panel 100e, and a step of securing the front panel 100e to the frame 100 to produce the casing 150, followed by the same steps as those of the method for producing the display device 10E according to the fifth embodiment described above.

In the display device 10Ea according to this modified embodiment, the same effect as that of the display device 10E according to the fifth embodiment described above is obtained. Further, the front panel 100e is constructed by arranging the plurality of divided plates 160. Therefore, the divided plate 160 to be used can be compact and inexpensive. Further, it is possible to use the divided plate having a good quality involving few defects such as bubbles and foreign matters at the inside. The display device 10Ea can be also assembled at a working site.

Figure 37:
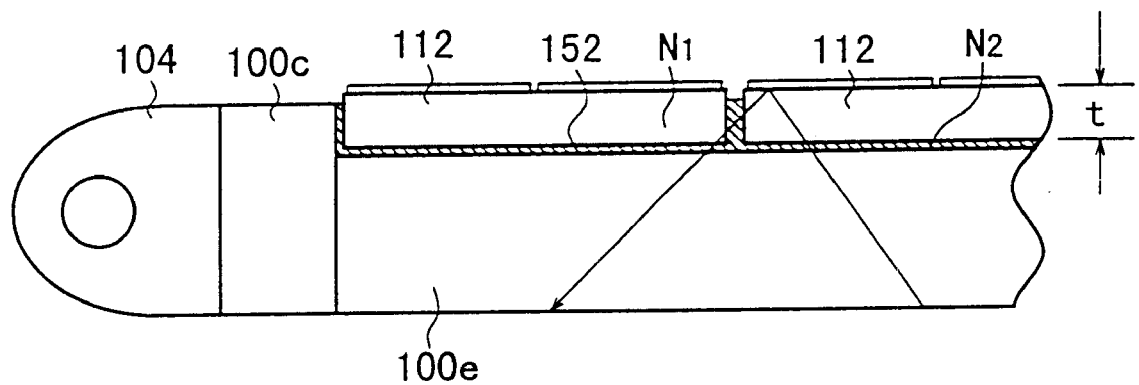
FIG. 37 illustrates the relationship concerning the thickness of the divided optical guide plate and the refractive index of the substance (matching oil)

In the display device 10E according to the fifth embodiment described above and the display device 10Ea according to the modified embodiment, in order to eliminate the sense of incongruity of the image at the juncture portion between the divided optical guide plates 112, it is necessary to control the difference in refractive index between the divided optical guide plate 112 and the substance 152 and the thickness t of the divided optical guide plate 112 as shown in FIG. 37. The difference in refractive index herein refers to the difference ($N_1-N_2$) between the refractive index $N_1$ of the divided optical guide plate 112 and the refractive index $N_2$ of the substance 152.

When the thickness t of the divided optical guide plate 112 is thick, the assembling performance is improved. However, it is necessary to strictly decrease the difference in refractive index. The relationship between the thickness t of the divided optical guide plate 112 and the allowable difference in refractive index resides in a relationship as represented by the following expression and illustrated by the region A indicated by hatched lines in FIG. 38. It is assumed that x represents the thickness t of the divided optical guide plate 112, and y represents the allowable difference in refractive index.

$$y \leq (1.46/x)$$

The sense of incongruity at the juncture disappears if the difference in refractive index ($N_1-N_2$) between the divided optical guide plate 112 and the substance 152 is set to be within the range of the allowable difference in refractive index.

Specifically, if the thickness t of the divided optical guide plate 112 is 20 mm, the difference in refractive index is 0.05 which is severe. If the thickness t is 5 mm, the difference in refractive index is allowed to be up to 0.25. That is, the divided optical guide plate 112 and the difference in refractive index can be arbitrarily selected depending on the assembling performance and the environmental conditions such as the temperature at the installation place for the display device.

In the embodiment of the present invention, an acrylic material having a refractive index of 1.490 at ordinary temperature may be used as the material for the divided optical guide plate 112. In this case, the material for the substance 152 may be obtained by mixing two methyl phenyl silicone oils, i.e., TSF434 produced by GE Toshiba Silicone and SH550 produced by Toray Dow Corning. Thus, the matching oil having a predetermined refractive index (1.485 to 1.500) is successfully obtained.

Next, explanation will be made with reference to FIGS. 39 and 40 for a display device 10F according to a sixth embodiment.

Figure 39:
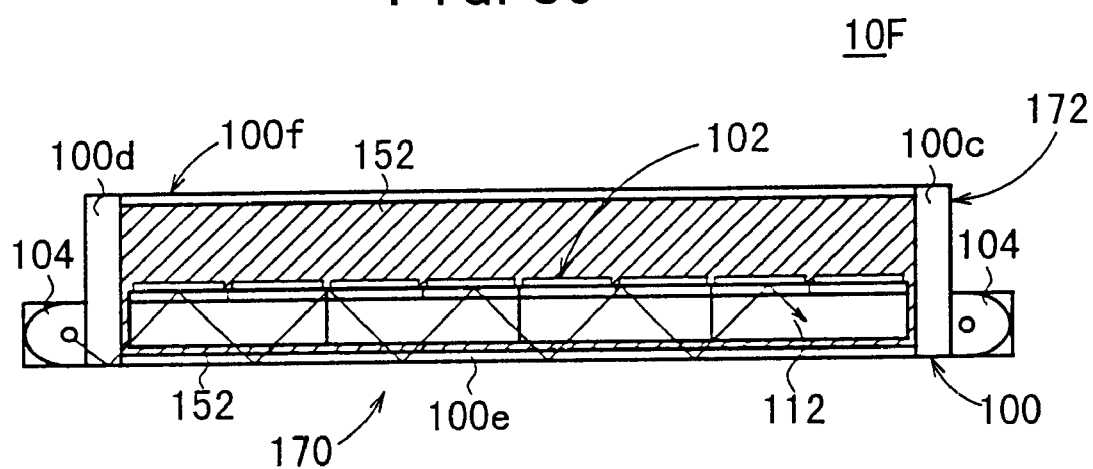
FIG. 39 shows, with partial omission, a sectional view illustrating a display device according to a sixth embodiment.
Figure 40:
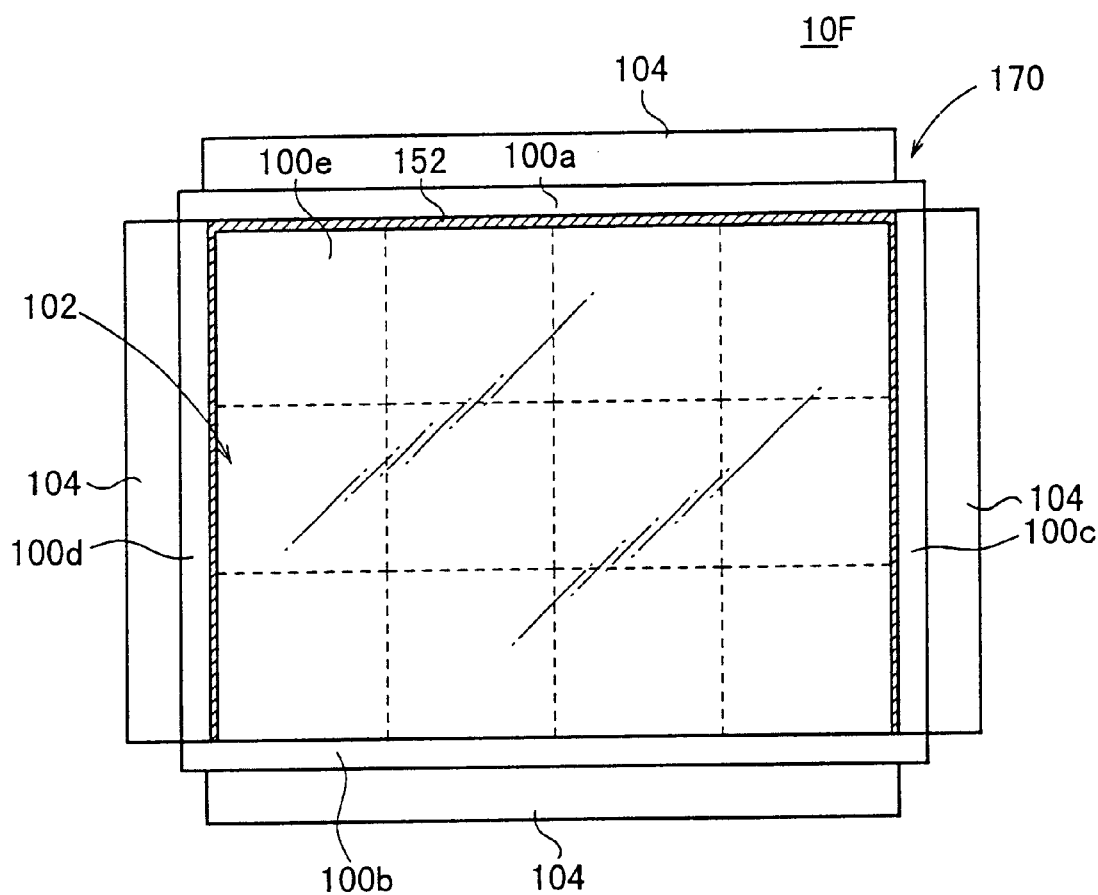
FIG. 40 shows, with partial omission, a plan view illustrating the display device according to the sixth embodiment.

As shown in FIGS. 39 and 40, in the display device 10F according to the sixth embodiment, a main display device body 102, which is constructed by arranging a large number of divided optical guide plates 112 in a matrix configuration and arranging and securing display components 14 or display modules 114, is accommodated in a completely closed type vessel 170 comprising an upper plate 100a, a lower plate 100b, side plates 100c, 100d, a front panel 100e, and a back panel 100f each of which is made of an acrylic material. Of course, the upper plate 100a may be omitted.

The vessel 170 is constructed such that the upper plate 100a, the lower plate 100b, the side plates 100c, 100d, the front panel 100e, and the back panel 100f are secured to one another, for example, with an adhesive of the completely solidifying type. It is not necessarily indispensable that the back panel 100f is transparent.

A substance 152, which has a light-transmitting property and which is adjusted for its refractive index, is charged in the vessel 170. As for the main display device body 102, the substance 152 is allowed to intervene between the display surface and the front panel 100e, between the end surfaces of the respective divided optical guide plates 112, and between the back surfaces of the divided optical guide plates 112 and the back panel 100f. The display surface and the front panel 100e make tight contact with each other by the aid of the substance 152 intervening therebetween. Further, the end surfaces of the respective divided optical guide plates 112 make tight contact with each other by the aid of the substance 152 intervening therebetween. Also in the display device 10F according to the sixth embodiment, it is possible to use the matching oil as the substance 152. The matching oil has been already described in detail, duplicate explanation of which is omitted in this section.

When the display device 10F according to the sixth embodiment is produced, at first, a case 172, which comprises the lower plate 100b, the side plates 100c, 100d, the front panel 100e, and the back panel 100f except for the upper plate 100a, is produced. After that, the main display device body 102, which is constructed by arranging the large number of divided optical guide plates 112 in the matrix configuration and arranging and securing the display components 14 or the display modules 114, is accommodated in the case 172. Subsequently, the inside of the case 172 is filled with the substance 152, and then the upper plate 100a is secured. Thus, the display device 10F can be produced with ease.

Figure 41:
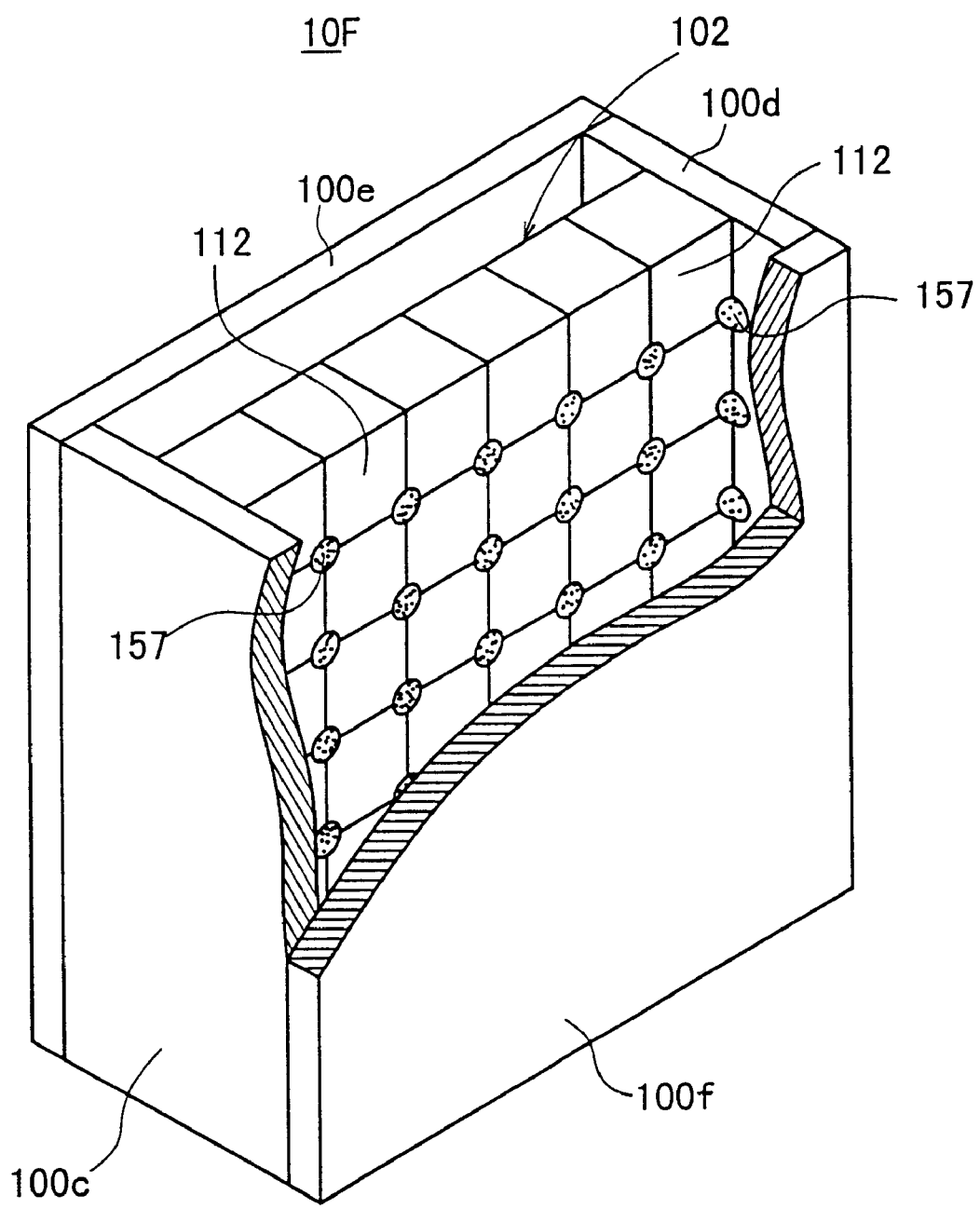
FIG. 41 illustrates an example of the method for fixing the main display device body.

Another method is available. That is, for example, the display surfaces of the divided optical guide plates 112 are allowed to be opposed to the first principal surface of the front panel 100e, and the substance 152 is allowed to intervene therebetween, while the plurality of divided optical guide plates 112 are arranged in a tight contact manner along the first principal surface of the front panel 100e. After that, as shown in FIG. 41, contact point portions at the corners of the respective divided optical guide plates 112 are secured with an adhesive 157. The adhesive 157 is preferably of the flexible type in view of the mitigation of thermal expansion as well. Subsequently, the plurality of display components 14 or the plurality of display modules 144 are arranged and secured to produce the main display device body 102.

After that, the lower plate 100b, the side plates 100c, 100d, and the back panel 100f are secured to the front panel 100e to produce the case 172. Subsequently, the inside of the case 172 is filled with the substance 152, and then the upper plate 100a is secured. Thus, the display device 10F can be easily produced.

Figure 42:
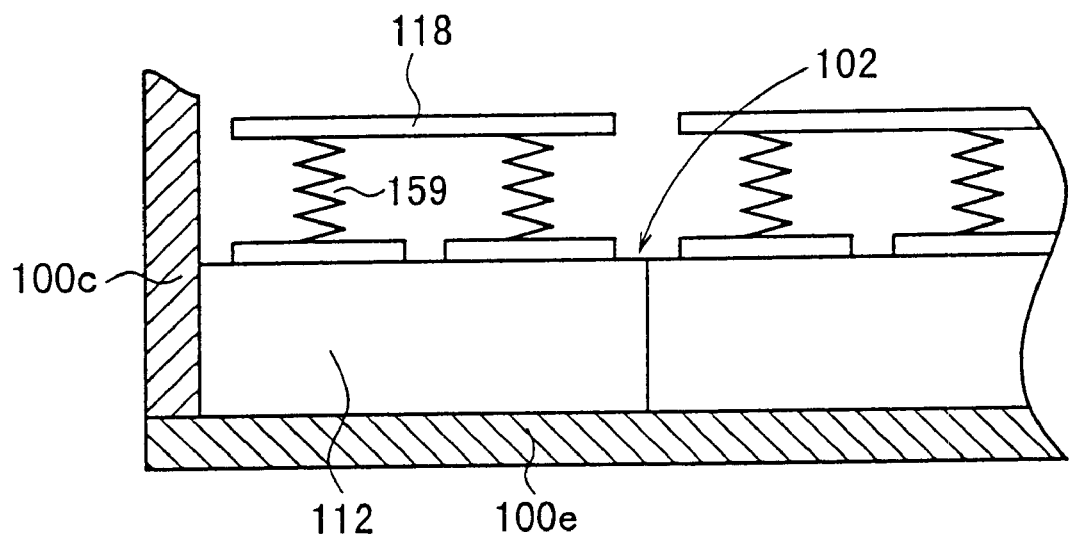
FIG. 42 illustrates another example of the method for fixing the main display device body.

Other than the method shown in FIG. 41, another method is available for fixing the main display device body 102 as shown in FIG. 42. That is, a resilient material 159 may be installed between the main display device body 102 and the driver board 118, and the main display device body 102 may be fixed by being pressed against the front panel 100e. Those usable as the resilient material 159 include, for example, coil spring, plate spring, rubber, and compressed air (cylinder).

As described above, the display device 10F according to the sixth embodiment is effective in the same manner as the display device 10C according to the third embodiment described above. That is, in the display device 10F, when the plurality of divided optical guide plates 112 are arranged to produce the display device 10F, the juncture portion between the divided optical guide plates 112 is scarcely conspicuous. Further, the display device 10F is excellent in repair performance.

Usually, when the matching oil is allowed to intervene between the end surfaces of the objects, it is necessary to fix any seal member so that the matching oil is not leaked. However, in this embodiment, a state is given, in which the main display device body 102 is accommodated in the substance 152 charged in the vessel 170. Therefore, even when the matching oil is used as the substance 152, then the seal member is unnecessary, and it is possible to realize the simplification of the production steps. Further, this embodiment is also advantageous in that any bubble is not generated, which would be otherwise caused by the presence of the seal member. However, the circuit board 114, the driver board 118, and the display controller exist in the case 172 which is filled with the substance 152. Therefore, it is preferable to use the substance 152 having high insulating performance.

Next, explanation will be made with reference to FIGS. 43 to 55 for several modified embodiments of the display device 10F according to the sixth embodiment.

Figure 43:
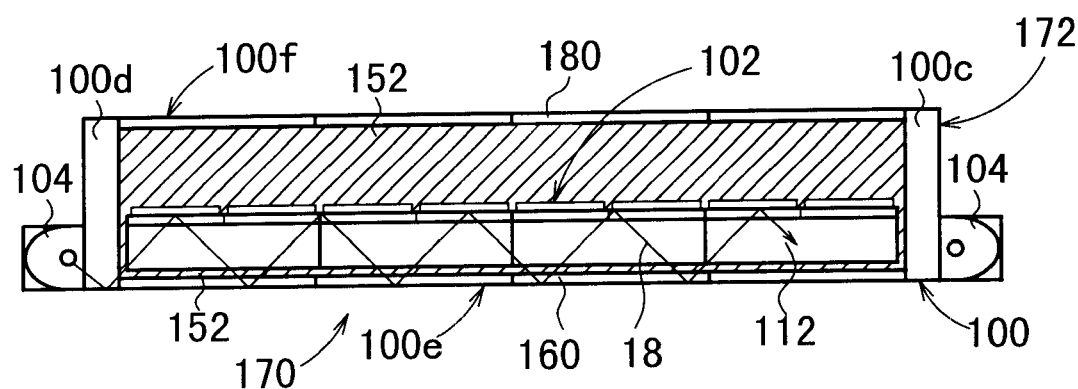
FIG. 43 shows, with partial omission, a sectional view illustrating a first modified embodiment of the display device according to the sixth embodiment.
Figure 44:
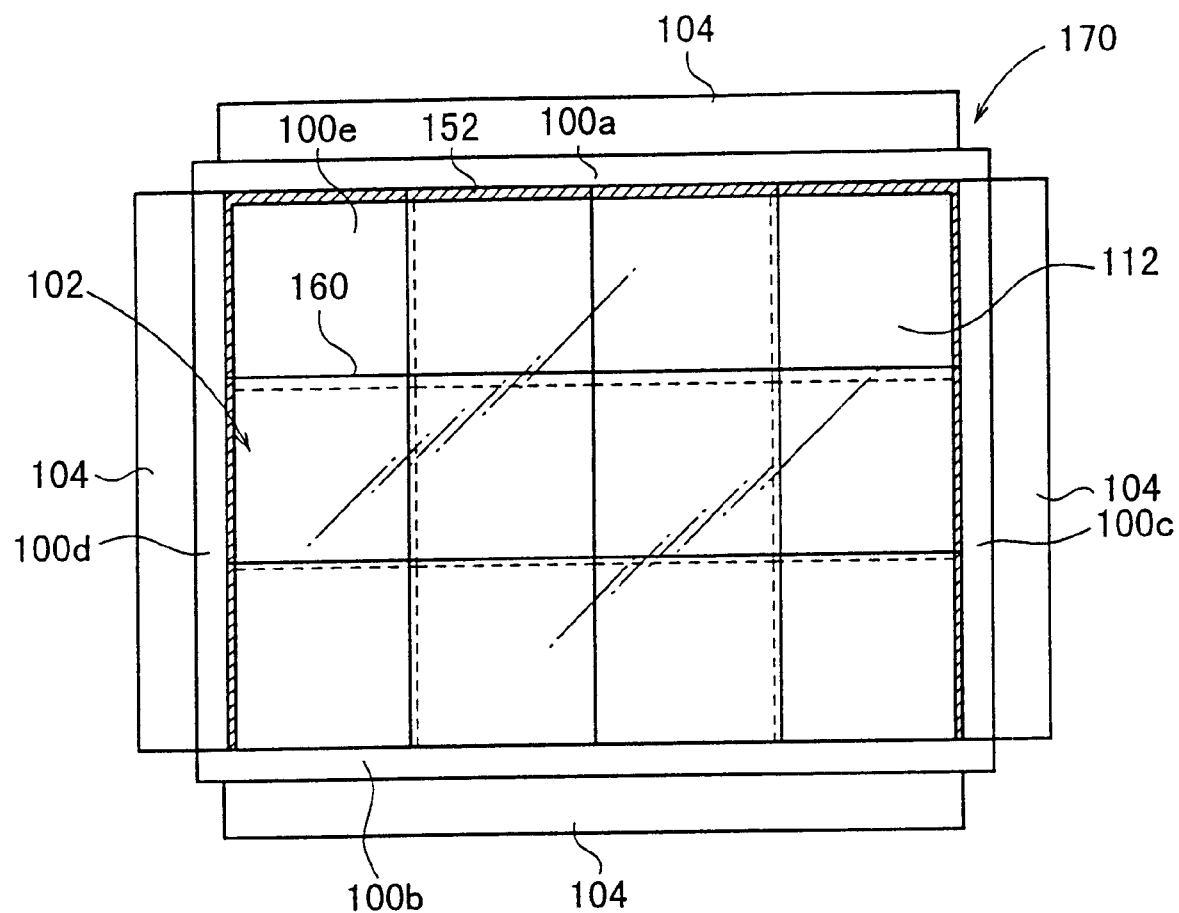
FIG. 44 shows, with partial omission, a plan view illustrating the first modified embodiment of the display device according to the sixth embodiment.

At first, as shown in FIGS. 43 and 44, a display device 10Fa according to a first modified embodiment is constructed in approximately the same manner as the display device 10F according to the sixth embodiment described above. However, the former is different from the latter in that the front panel 100e for constructing the vessel 170 is constructed by arranging a plurality of divided plates 160 in a matrix configuration, and end surfaces of the respective divided plates 160 are secured to one another, for example, with an adhesive of the completely solidifying type. In this embodiment, the back panel 100f is constructed by arranging a plurality of divided plates 180 in a matrix configuration, and end surfaces of the respective divided plates 180 are secured to one another, for example, with an adhesive of the completely solidifying type.

Therefore, when the display device 10Fa according to this modified embodiment is produced, the process includes a step of producing the front panel 100e and the back panel 100f, and a step of producing the vessel 170, followed by the same steps as those of the method for producing the display device 10F according to the sixth embodiment described above.

In the display device 10Fa according to the first modified embodiment, the same effect as that of the display device 10F according to the sixth embodiment described above is obtained. Further, the front panel 100e is constructed by arranging the plurality of divided plates 160. Therefore, the divided plate 160 to be used can be compact and inexpensive. Further, it is possible to use the divided plate 160 having a good quality involving few defects such as bubbles and foreign matters at the inside. The display device 10Fa can be also assembled at a working site.

Figure 45:
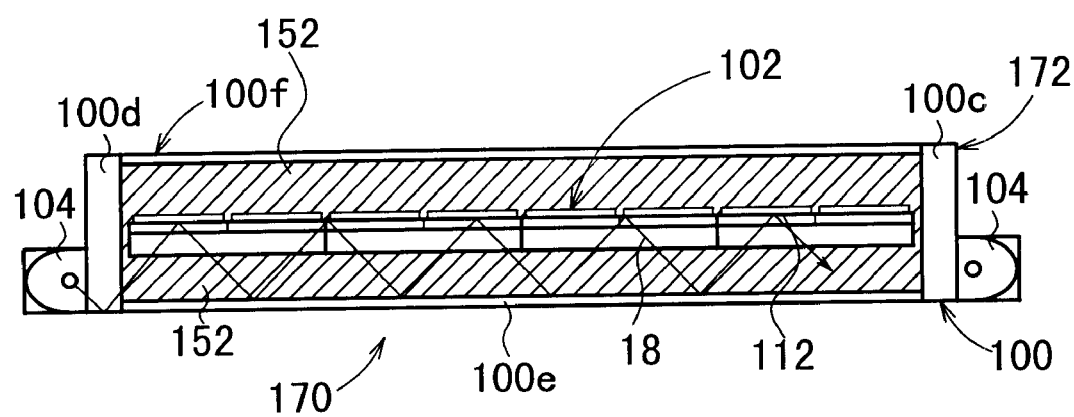
FIG. 45 shows, with partial omission, a sectional view illustrating a second modified embodiment of the display device according to the sixth embodiment.
Figure 46:
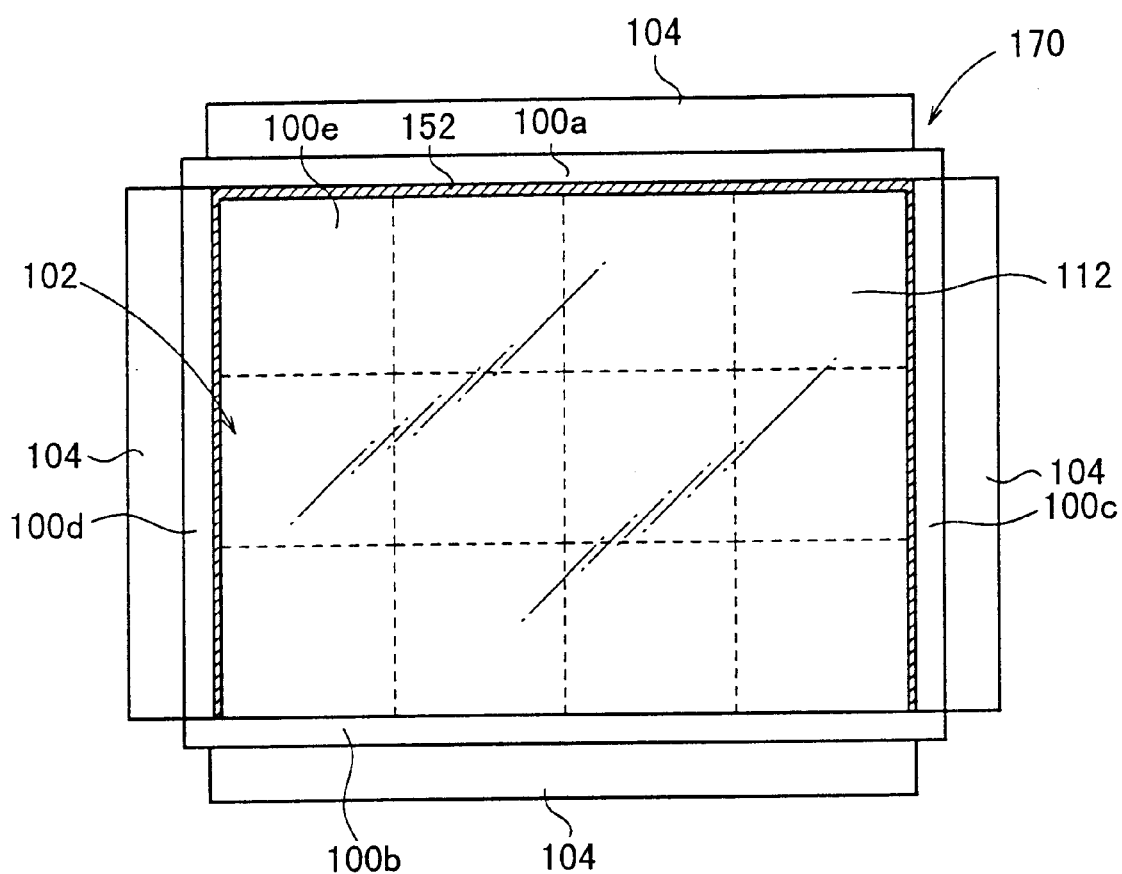
FIG. 46 shows, with partial omission, a plan view illustrating the second modified embodiment of the display device according to the sixth embodiment.

As shown in FIGS. 45 and 46, a display device 10Fb according to a second modified embodiment is constructed in approximately the same manner as the display device 10F according to the sixth embodiment described above. However, the former is different from the latter in that each of the divided optical guide plates 112 is composed of a thin divided optical guide plate 112. The main display device body 102 is preferably accommodated at a central portion in the thickness direction of the vessel 170, as compared with the case in which the main display device body 102 is accommodated so that it makes tight contact with the front panel 100e. Accordingly, the light 18 from the light source 104 passes through the substance 152 more dominantly. Therefore, the display device 10Fb is scarcely affected by the defect and the dirt in the front panel 100e and the thin divided optical guide plate 112. Thus, it is possible to improve the image quality.

When the display device 10Fb according to the second embodiment is produced, especially when the main display device body 102 is positioned at the center in the thickness direction of the vessel 170, for example, the arrangement can be easily made by arranging, in the vessel 170, the lattice-shaped support member 136 as used, for example, in the third modified embodiment 10Cc (see FIG. 23) of the display device 10C according to the third embodiment. For example, a case with a back opening is produced by securing a front panel 100e, an upper plate 100a, a lower plate 100b, and side plates 100c, 100d. The lattice-shaped support member 136 is arranged in the case. The case is placed so that the front panel 100e serves as a bottom surface, and a predetermined amount of the substance 152 is poured into the case. During this process, the substance 152 is poured to such an extent that the main display device body 102 is positioned at the central portion in the thickness direction of the vessel 170.

Subsequently, the respective divided optical guide plates 112 are inserted, for example, into the lattice windows 136a of the lattice-shaped support member 136. During this process, the divided optical guide plate 112 is inserted so that the display surface of the divided optical guide plate 112 is opposed to the substance 152. Subsequently, the plurality of display components 14 or the plurality of display modules 144 are arranged and fixed to construct the main display device body 102, and then the inside of the case is filled with the substance 152. The back panel 100f is secured to construct the vessel 170 to be placed so that the lower plate 100b serves as a bottom surface. Thus, the display device 10Fb according to the second modified embodiment is completed.

Figure 47:
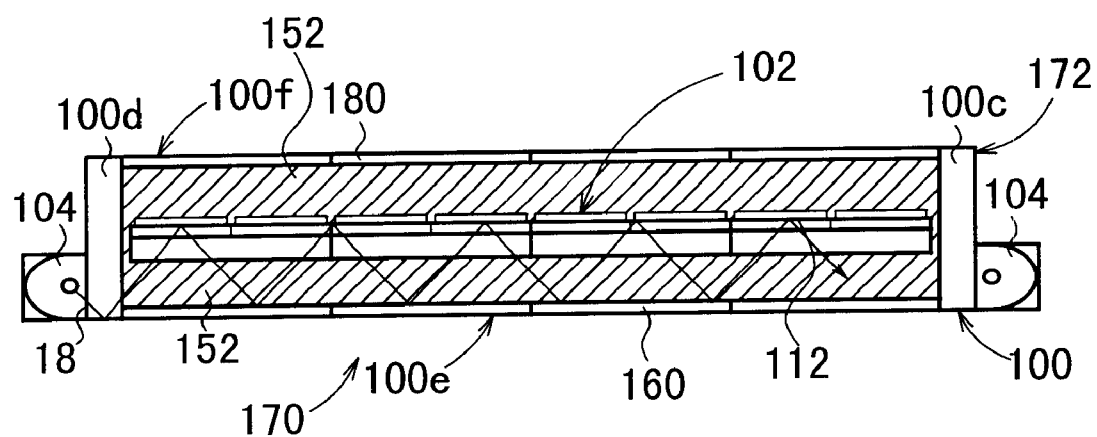
FIG. 47 shows, with partial omission, a sectional view illustrating a third modified embodiment of the display device according to the sixth embodiment.
Figure 48:
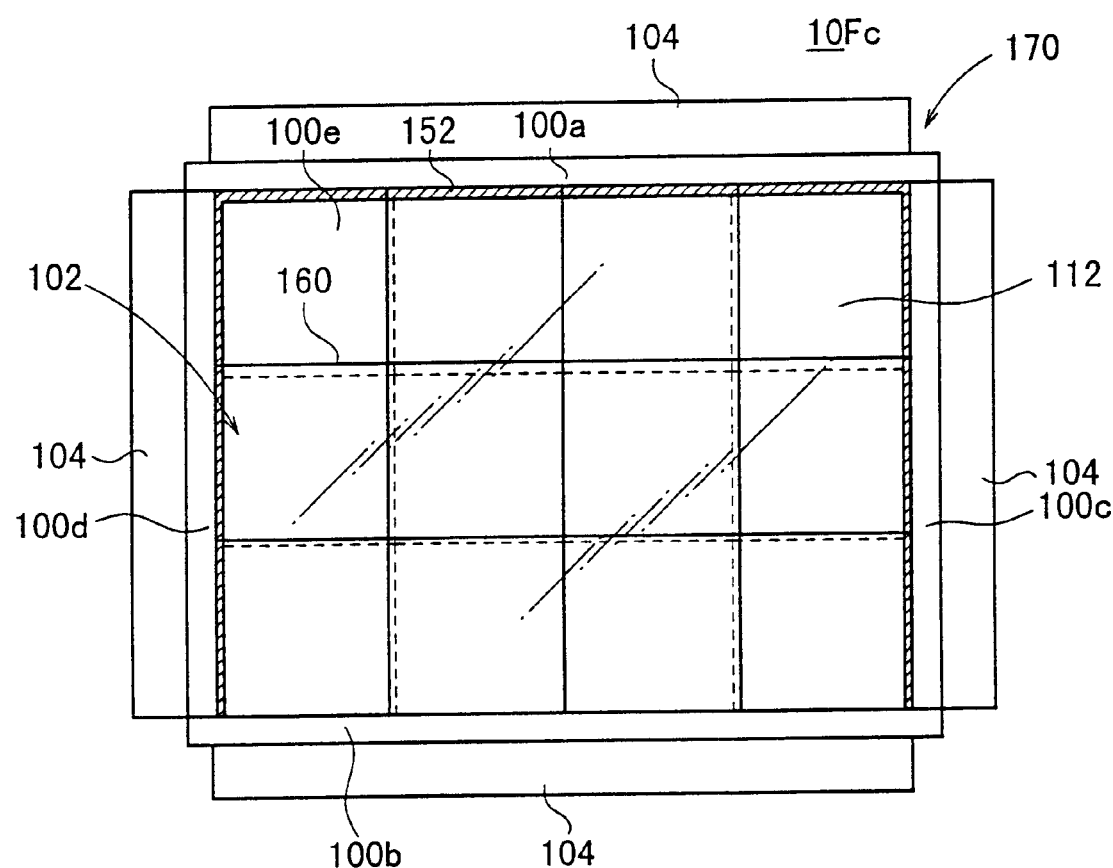
FIG. 48 shows, with partial omission, a plan view illustrating the third modified embodiment of the display device according to the sixth embodiment.

Next, as shown in FIGS. 47 and 48, a display device 10Fc according to a third modified embodiment is constructed in approximately the same manner as the display device 10Fb according to the second modified embodiment described above. However, the former is different from the latter in that the front panel 100e and the back panel 100f for constructing the vessel 170 are respectively constructed by arranging a plurality of divided plates 160 and a plurality of divided plates 180 in a matrix configuration, and end surfaces of the respective divided plates 160 and end surfaces of the respective divided plates 180 are secured to one another, for example, with an adhesive of the completely solidifying type.

Therefore, when the display device 10Fc according to the third modified embodiment is produced, the process includes a step of producing the front panel 100e and the back panel 100f, followed by the same steps as those of the method for producing the display device 10Fb according to the second modified embodiment described above.

In the display device 10Fc according to the third modified embodiment, the same effect as that of the display device 10Fb according to the second modified embodiment described above is obtained. However, the front panel 100e is constructed by arranging the plurality of divided plates 160. Therefore, the divided plate 160 to be used can be compact and inexpensive. Further, it is possible to use the divided plate 160 having a good quality involving few defects such as bubbles and foreign matters at the inside. The display device 10Fc can be also assembled at a working site.

Figure 49:
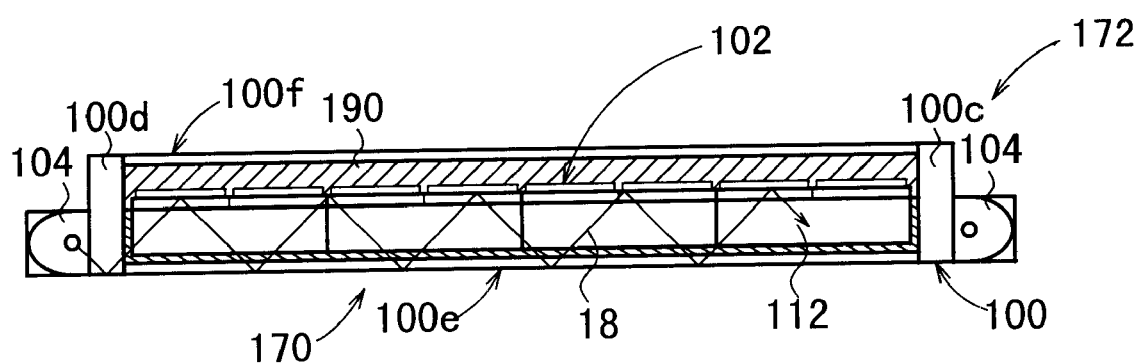
FIG. 49 shows, with partial omission, a sectional view illustrating a fourth modified embodiment of the display device according to the sixth embodiment.
Figure 50:
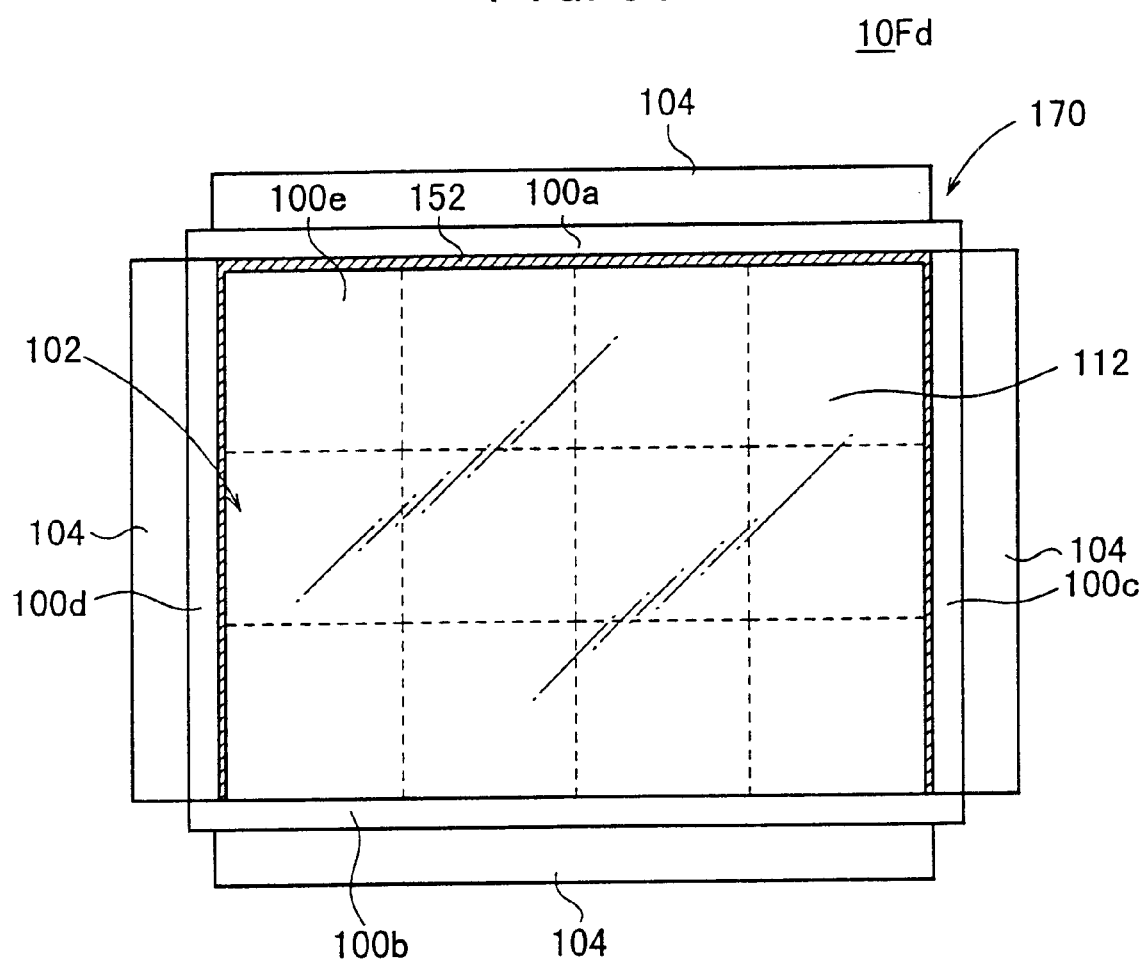
FIG. 50 shows, with partial omission, a plan view illustrating the fourth modified embodiment of the display device according to the sixth embodiment.

Next, as shown in FIGS. 49 and 50, a display device 10Fd according to a fourth modified embodiment is constructed in approximately the same manner as the display device 10F according to the sixth embodiment described above. However, the former is different from the latter in that the substance 152 is allowed to intervene between the display surface and the front panel 100e and between the end surfaces of the respective divided optical guide plates 112 respectively, and a substance 190, which is different from the substance 152, is allowed to intervene between the back surface of the main display device body 102 and the back panel 100f.

The substance 190 is in a form of liquid or grease. It is preferable to use those which have high insulating performance and low ignitability, because the driving circuit for the main display device body 102 is also immersed in the substance 190.

Figure 51:
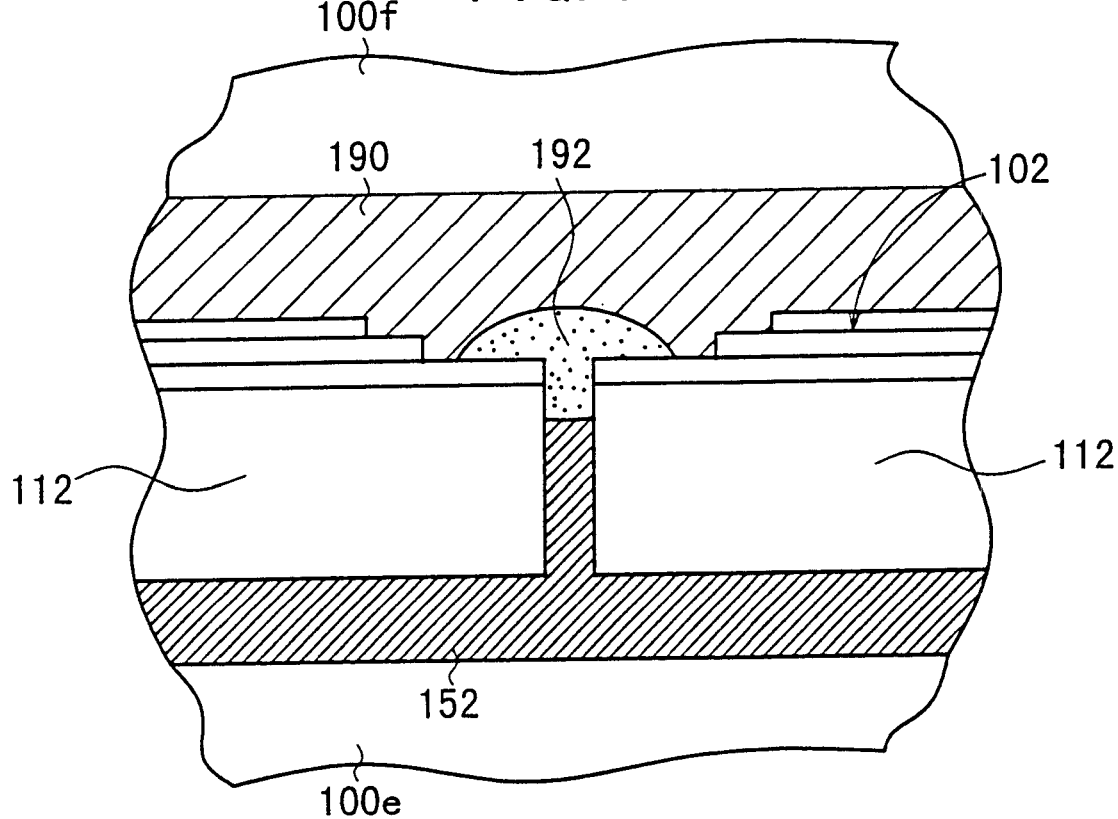
FIG. 51 shows a magnified view illustrating an example of an end surface portion of a divided optical guide plate, in the fourth modified embodiment of the display device according to the sixth embodiment.

Further, as shown in FIG. 51, a seal member 192 for preventing the substances 152, 190 from being mixed with each other is applied between the substance 152 which is allowed to intervene between the end surfaces of the respective divided optical guide plates 112 and the substance 190 which is allowed to intervene between the back surface of the main display device body 102 and the back panel 100f.

Therefore, when the display device 10Fd according to the fourth modified embodiment is produced, for example, the main display device body 102 is constructed by allowing the display surfaces of the divided optical guide plates 112 to be opposed to the first principal surface of the front panel 100e, and allowing the substance 152 to intervene between the surfaces, wherein the plurality of divided optical guide plates 112 are tightly contacted and arranged along the first principal surface of the front panel 100e, and then the plurality of display components 14 or the plurality of display modules 144 are arranged and fixed to construct the main display device body 102. After that, for example, the main display device body 102 is fixed by using the technique shown in FIG. 41 or 42. Subsequently, the case 172 is produced by securing the lower plate 100b, the side plates 100c, 100d, and the back panel 100f to the front panel 100e, and then the substance 190 is charged to the inside of the case 172. Subsequently, the upper plate 100a is secured. Thus, the display device 10Fd can be produced with ease.

The display device 10Fd according to the fourth modified embodiment provides substantially the same effect as that of the display device 10F according to the sixth embodiment described above. Especially, when the substance 152 is the matching oil, it is possible to decrease the amount of use of the expensive matching oil. Further, an oil, which is inexpensive and which has high insulation resistance, can be used as the substance 190. Thus, the display device 10Fd is advantageous to reduce the production cost.

When the substance 190 to be used has a specific gravity which is equivalent to that of the substance 152, the pressure, which is exerted on the main display device 102, is uniform without being affected by the depth, which is preferred.

Figure 52:
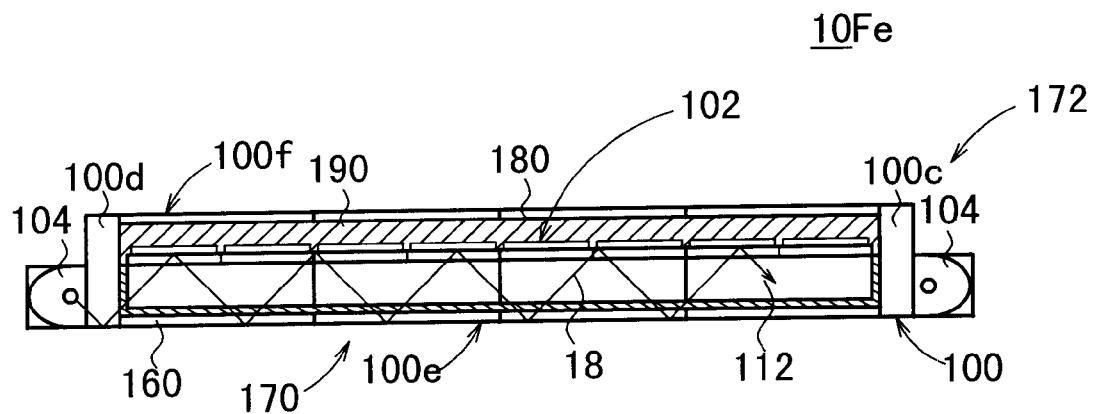
FIG. 52 shows, with partial omission, a sectional view illustrating a fifth modified embodiment of the display device according to the sixth embodiment.
Figure 53:
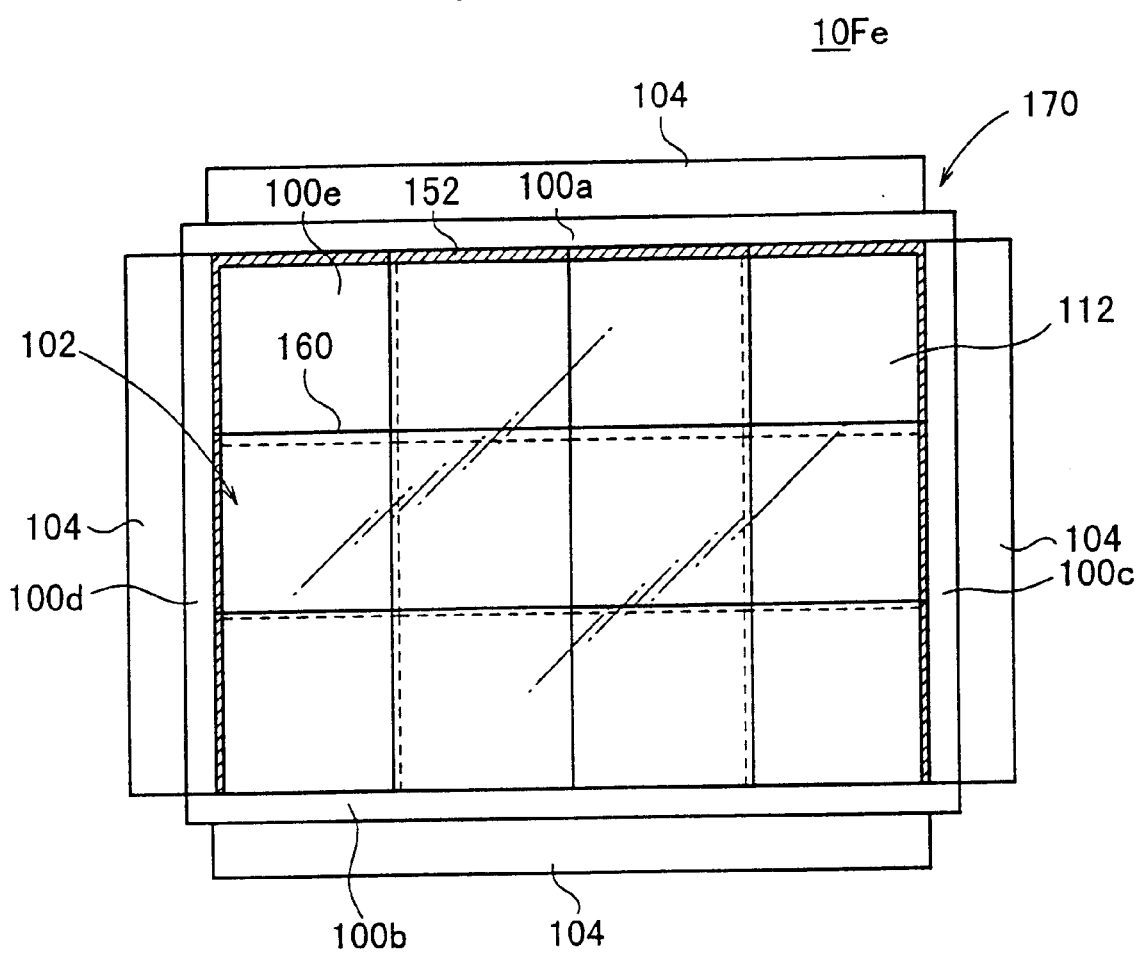
FIG. 53 shows, with partial omission, a plan view illustrating the fifth modified embodiment of the display device according to the sixth embodiment.

As shown in FIGS. 52 and 53, a display device 10Fe according to a fifth modified embodiment is constructed in approximately the same manner as the display device 10F*d* according to the fourth modified embodiment described above. However, the former is different from the latter in that the front panel 100*e* and the back panel 100*f* for constructing the vessel 170 are respectively constructed by arranging a plurality of divided plates 160 and a plurality of divided plates 180 in a matrix configuration, and end surfaces of the respective divided plates 160 and end surfaces of the respective divided plates 180 are secured to one another, for example, with an adhesive of the completely solidifying type.

Therefore, when the display device 10F*e* according to the fifth modified embodiment is produced, the process includes a step of producing the front panel 100*e* and the back panel 100*f*, followed by the same steps as those of the method for producing the display device 10F*d* according to the fourth modified embodiment described above.

In the display device 10F*e* according to the fifth modified embodiment, the same effect as that of the display device 10F*d* according to the fourth modified embodiment described above is obtained. However, the front panel 100*e* is constructed by arranging the plurality of divided plates 160. Therefore, the divided plate 160 to be used can be compact and inexpensive. Further, it is possible to use the divided plate 160 having a good quality involving few defects such as bubbles and foreign matters at the inside. The display device 10F*e* can be also assembled at a working site.

Figure 54:
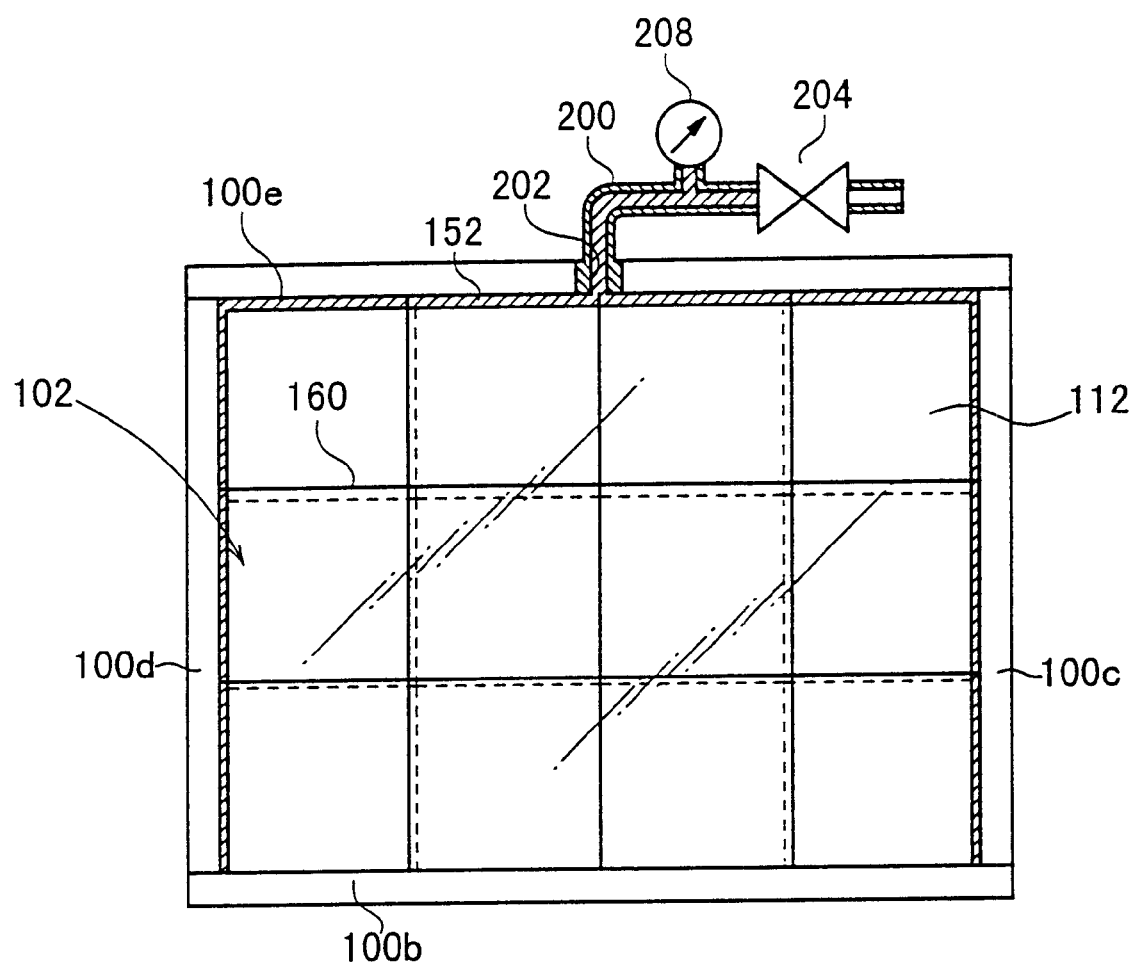
FIG. 54 shows, with partial omission, a plan view illustrating a sixth modified embodiment of the display device according to the sixth embodiment.
Figure 55:
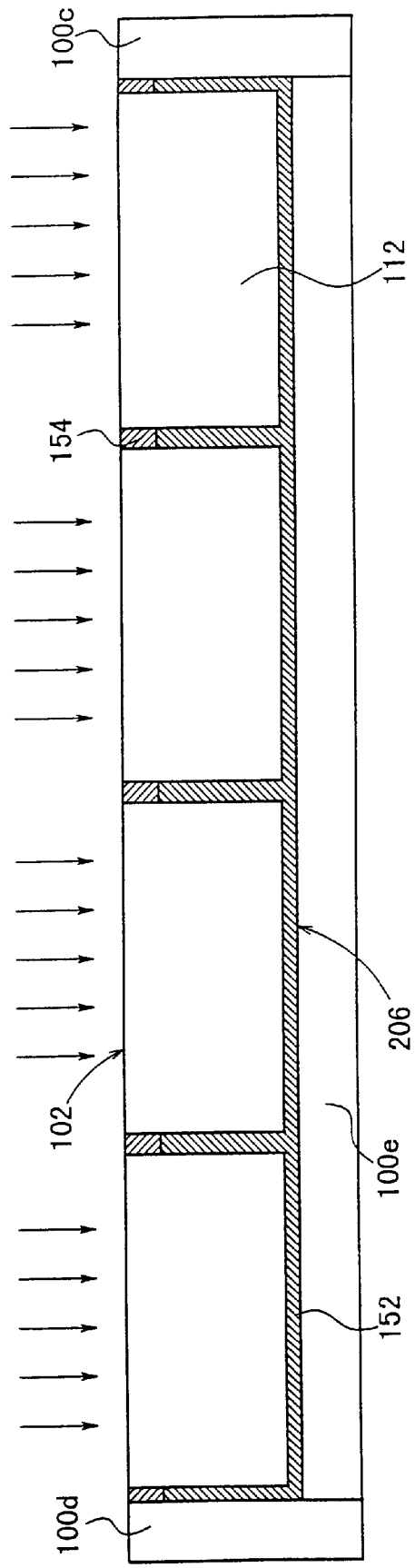
FIG. 55 shows, with partial omission, a sectional view illustrating the sixth modified embodiment of the display device according to the sixth embodiment.
Figure 56:
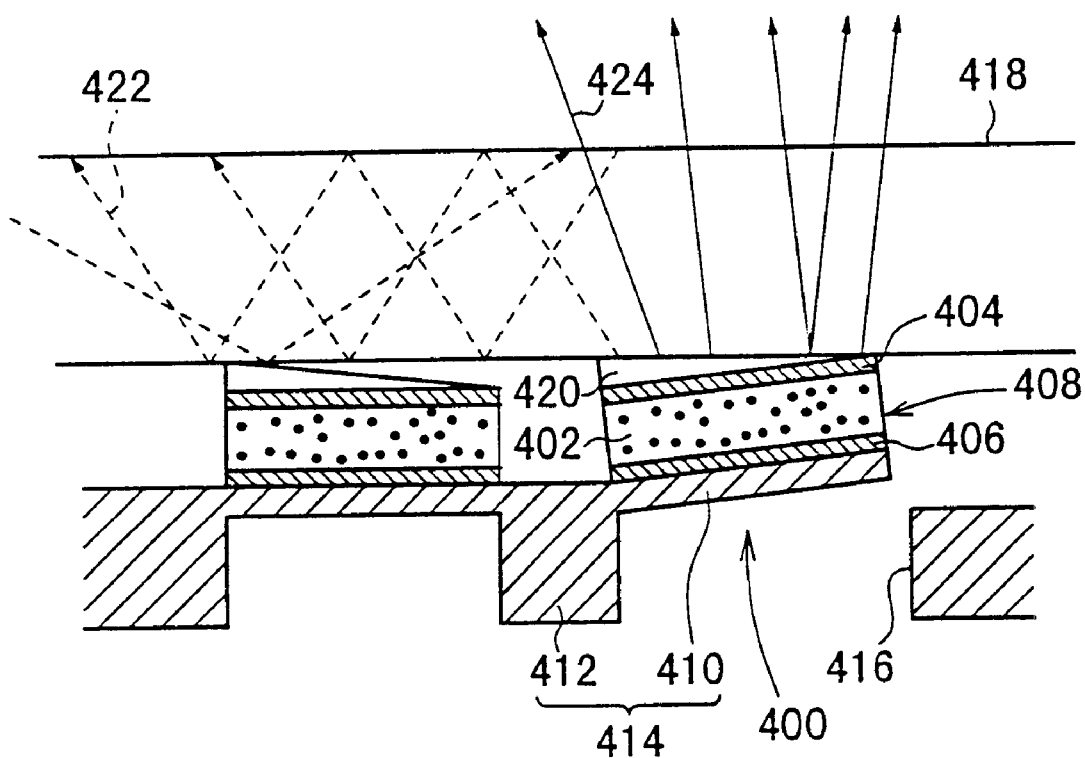
FIG. 56 shows an arrangement illustrating the display component concerning the illustrative conventional technique.

Concerning the display device 10E according to the fifth embodiment or the fourth modified embodiment 10F*d* of the display device 10F according to the sixth embodiment described above, it is also possible to realize a modified embodiment (display device 10F*f* according to a sixth embodiment) as shown in FIGS. 54 and 55.

That is, as shown in FIGS. 54 and 55, for example, the display device 10F*f* according to the sixth modified embodiment is provided with a through-hole 202 to be connected to a conduit 200 at a predetermined position of the upper plate 100*a* (or optionally the side plates 100*c*, 100*d* or the lower plate 100*b*). The through-hole 202 is formed at the position which faces the space between the display surface of the main display device body 102 and the front panel 100*e*. The conduit 200 is connected to the through-hole 202. An unillustrated vacuum pump is connected to the conduit 200 via a valve 204.

The space between the display surface of the main display device body 102 and the front panel 100*e* is filled with the substance 152, and the substance 152 is sealed, for example, with a seal member 154. After that, the vacuum pump is operated to reduce the pressure in the region (region 206 charged with the substance 152) between the display surface of the main display device body 102 and the front panel 100*e* to be lower than the atmospheric pressure. Subsequently, the valve 204 is closed to maintain the reduced pressure state. At this stage, the vacuum pump can be separated off.

By doing so, as shown in FIG. 55, the pressure of the region 206 charged with the substance 152 is lower than the surrounding pressure (atmospheric pressure). Therefore, the main display device body 102 is pressed toward the front panel 100*e* owing to the difference in pressure. In other words, the fixation of the main display device body 102, which is otherwise effected by only the strength of the seal member 154 or the like, can be supplemented by the difference in pressure. Thus, it is possible to improve the assembling performance and the rigidity. In this arrangement, the deterioration state of the seal member 154 can be recognized by managing the pressure of the region 208 charged with the substance 152 by using a pressure gauge 208 (see FIG. 54). Therefore, this arrangement is preferably adopted.

Figure 38:
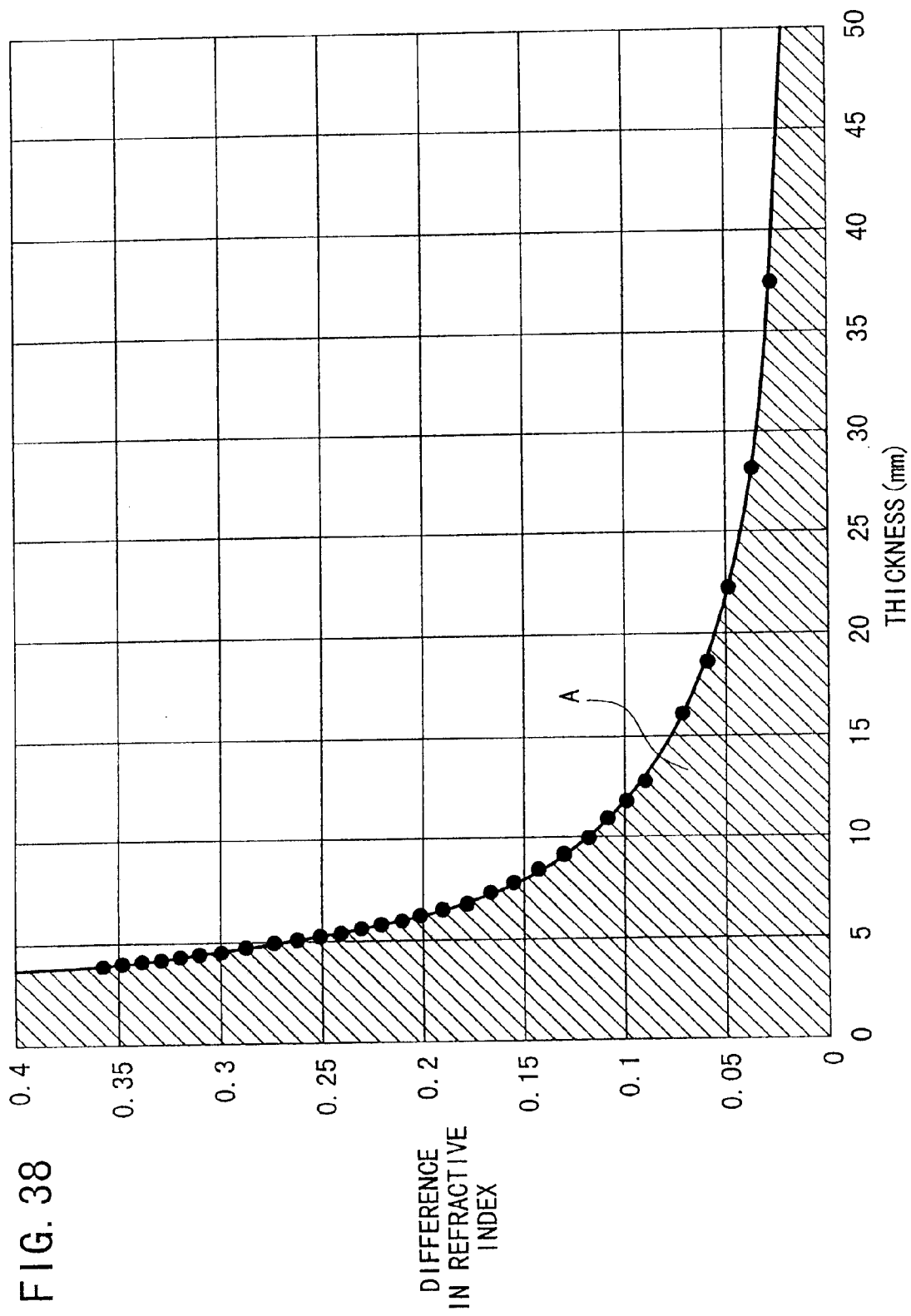
FIG. 38 shows a characteristic curve illustrating the relationship concerning the thickness of the divided optical guide plate and the difference between the refractive index of the divided optical guide plate and the refractive index of the substance (matching oil)

As having been explained above, in order to eliminate the sense of congruity of the image at the juncture portion between the divided optical guide plates 112 in the display device 10F according to the sixth embodiment and the display devices 10F*a* to 10F*f* according to the various modified embodiments described above, it is preferable to control the difference in refractive index between the divided optical guide plate 112 and the substance 152 and the thickness t of the divided optical guide plate 112 so that the relationship as shown in FIG. 38 is satisfied.

It is a matter of course that the display device and the method for producing the same according to the present invention are not limited to the embodiments described above, which may be embodied in other various forms without deviating from the gist or essential characteristics of the present invention.

As explained above, according to the display device and the method for producing the same concerning the present invention, it is possible to allow the juncture portion between the display components to be scarcely conspicuous in the large screen display device when the large screen display device is produced by arranging the plurality of display components. Further, the repair performance is excellent, it is possible to assemble the display device at a working site, and it is possible to effectively reduce the production cost.

What is claimed is:

1. A display device comprising a main display device body including two or more display components arranged on a first principal surface of an optical guide plate for introducing light from a light source thereinto, wherein a substance having a light-transmitting property adjusted for its refractive index is allowed to intervene at least between said optical guide plate and said display components, said substance being a matching oil.

2. The display device according to claim 1, wherein said optical guide plate itself is used as an optical waveguide plate, and it serves as a constitutive component of said display component.

3. A display device comprising a main display device body including two or more display modules arranged on a first principal surface of an optical guide plate for introducing light from a light source thereinto, wherein a substance having a light-transmitting property adjusted for its refractive index is allowed to intervene at least between said optical guide plate and said display modules, said substance being a matching oil.

4. The display device according to claim 3, wherein:
   said display module is constructed by arranging two or more display components on a first principal surface of a module optical waveguide plate for introducing said light from said light source thereinto; and
   a second substance having a light-transmitting property adjusted for its refractive index is allowed to intervene at least between said module optical waveguide plate and said display components.

5. The display device according to claim 4, wherein said module optical waveguide plate itself is used as an optical waveguide plate, and it serves as a constitutive component of said display component.

6. The display device according to claim 4, wherein said second substance having said light-transmitting property adjusted for its refractive index is an adhesive.

7. The display device according to claim 4, wherein said second substance having said light-transmitting property adjusted for its refractive index is matching oil.

8. The display device according to claim 1, wherein said optical guide plate includes a plurality of divided optical guide plates which are arranged in a matrix configuration, and said plurality of divided optical guide plates are secured to one another with an adhesive having a light-transmitting property adjusted for its refractive index.

9. The display device according to claim 8, wherein vertically ruled and/or horizontally ruled support members are allowed to intervene between at least two of said divided optical guide plates.

10. The display device according to claim 9, wherein said support members are formed to have a lattice-shaped configuration.

11. The display device according to claim 1, further comprising:
    another optical guide plate arranged for a display surface of said main display device body, wherein:
    a substance having a light-transmitting property adjusted for its refractive index is allowed to exist between said display surface and said another optical guide plate.

12. The display device according to claim 11, wherein said substance having said light-transmitting property adjusted for its refractive index is matching oil.

13. The display device according to claim 1, wherein a seal member is allowed to intervene between said matching oil and atmospheric air.

14. The display device according to claim 11, wherein said another optical guide plate is constructed such that a plurality of divided optical guide plates are arranged in a matrix configuration, and they are secured to one another with an adhesive having a light-transmitting property adjusted for its refractive index.

15. The display device according to claim 1, wherein:
    said main display device body is accommodated in a vessel with at least one surface having transparency; and
    a substance having a light-transmitting property adjusted for its refractive index is allowed to exist between a display surface of said main display device body and said surface of said vessel having said transparency.

16. The display device according to claim 15, wherein said vessel is filled therein with said substance having said light-transmitting property adjusted for its refractive index.

17. The display device according to claim 15, wherein another substance, which is different from said substance having said light-transmitting property adjusted for its refractive index, exists between said vessel and a surface opposite to said display surface of said main display device body.

18. The display device according to claim 15, wherein said substance having said light-transmitting property adjusted for its refractive index is matching oil.

19. The display device according to claim 17, wherein:
    when said substance having said light-transmitting property adjusted for its refractive index is matching oil;
    a seal member is allowed to intervene between said matching oil and said another substance.

20. The display device according to claim 15, wherein said vessel has at least a plate member for constructing said surface of said vessel having said transparency, said plate member including a plurality of divided plates arranged in a matrix configuration and secured to one another with an adhesive having a light-transmitting property adjusted for its refractive index.

21. The display device according to claim 1, wherein said optical guide plate is constructed by a transparent vessel having a hollow section.

22. The display device according to claim 21, wherein at least a front panel of said vessel for projecting a display image thereon includes a plurality of divided plates arranged in a matrix configuration and secured to one another with an adhesive having a light-transmitting property adjusted for its refractive index.

23. The display device according to claim 21, wherein said hollow section is filled with a substance having a light-transmitting property adjusted for its refractive index.

24. The display device according to claim 23, wherein said substance having said light-transmitting property adjusted for its refractive index is matching oil.

25. A method for producing a display device, comprising allowing display surfaces of display components to be opposed to a first principal surface of an optical guide plate for introducing light from a light source thereinto, and allowing a substance having a light-transmitting property adjusted for its refractive index to intervene between said surfaces, said substance being a matching oil, wherein said display components are arranged along said first principal surface to produce a main display device body.

26. A method for producing a display device, comprising allowing display surfaces of display modules to be opposed to a first principal surface of an optical guide plate for introducing light from a light source thereinto, and allowing a substance having a light-transmitting property adjusted for its refractive index to intervene between said surfaces, said substance being a matching oil, wherein said display modules are arranged along said first principal surface to produce a main display device body.

27. The method for producing said display device according to claim 25, wherein display surfaces of display components are allowed to be opposed to a first principal surface of a module optical waveguide plate for introducing said light from said light source thereinto, and a second substance having a light-transmitting property adjusted for its refractive index is allowed to intervene between said surfaces, while said display components are arranged along said first principal surface of said module optical waveguide plate to produce said display module.

28. The method for producing said display device according to claim 25, wherein said optical guide plate is produced by arranging a plurality of divided optical guide plates in a matrix configuration, and securing them to one another with an adhesive having a light-transmitting property adjusted for its refractive index.

29. The method for producing said display device according to claim 25, wherein a surface of said optical guide plate is coated with a hard coating material.

30. The method for producing said display device according to claim 25, wherein an end surface of said optical guide plate is mirror-finished so that Rmax is not more than 0.3.

31. The method for producing said display device according to claim 25, wherein:
    when said optical guide plate is machined;
    dimensional accuracy of said optical guide plate is not more than ±0.1 mm with respect to a reference dimension of 100 mm, perpendicularity between end surfaces and between said end surface and a flat surface is not more than 0.1 mm, and parallelism between said end surfaces and between said flat surfaces is not more than 0.1 mm.

32. The method for producing said display device according to claim 27, wherein at least an adhesive is used as said second substance having said light-transmitting property adjusted for its refractive index.

33. The method for producing said display device according to claim 27, wherein at least matching oil is used as said second substance having said light-transmitting property adjusted for its refractive index.

34. The method for producing said display device according to claim 28, wherein:
before said plurality of divided optical guide plates are arranged in said matrix configuration;
vertically ruled and/or horizontally ruled support members are installed, and said support members are interposed between at least two of said divided optical guide plates to produce said display device.

35. The method for producing said display device according to claim 34, wherein at least a surface of said support member, to which an end surface of said divided optical guide plate is opposed, is mirror-finished so that Rmax is not more than 0.3.

36. The method for producing said display device according to claim 25, wherein:
another optical guide plate having a large size is prepared; and
a display surface of said main display device body is allowed to be opposed to a first principal surface of said another optical guide plate, and a substance having a light-transmitting property adjusted for its refractive index is allowed to intervene between said surfaces to produce said display device thereby.

37. The method for producing said display device according to claim 36, wherein said another optical guide plate to be used is constructed by a transparent vessel which is filled with a substance having a light-transmitting property adjusted for its refractive index at the inside.

38. The method for producing said display device according to claim 25, wherein:
said main display device body is accommodated in a vessel with at least one surface having transparency; and
said vessel is filled therein with a substance having a light-transmitting property adjusted for its refractive index to produce said display device.

39. The method for producing said display device according to claim 25, wherein:
a display surface of said main display device body is allowed to be opposed to a first principal surface of a plate member having transparency, and a substance having a light-transmitting property adjusted for its refractive index is allowed to intervene between said surfaces so that said main display device body is fixed;
a vessel including said plate member as one constitutive component is produced; and
said vessel is filled therein with said substance having said light-transmitting property adjusted for its refractive index to produce said display device.

40. The method for producing said display device according to claim 25, wherein:
a display surface of said main display device body is allowed to be opposed to a first principal surface of a plate member having transparency, and a substance having a light-transmitting property adjusted for its refractive index is allowed to intervene between said surfaces so that said main display device body is fixed;
a vessel including said plate member as one constitutive component is produced; and
said vessel is filled therein with another substance which is different from said substance having said light-transmitting property adjusted for its refractive index to produce said display device.

41. The method for producing said display device according to claim 39, wherein said plate member is produced by arranging a plurality of divided plates in a matrix configuration, and securing them to one another with an adhesive having a light-transmitting property adjusted for its refractive index.

42. A display device comprising a main display device body including two or more display components arranged on a first principal surface of an optical guide plate for introducing light from a light source thereinto, wherein a substance having a light-transmitting property adjusted for its refractive index is allowed to intervene at least between said optical guide plate and said display components, said substance being an adhesive that is flexible.

43. The display device according to claim 42, wherein said optical guide plate itself is used as an optical waveguide plate, and it serves as a constitutive component of said display component.

44. A display device comprising a main display device body including two or more display modules arranged on a first principal surface of an optical guide plate for introducing light from a light source thereinto, wherein a substance having a light-transmitting property adjusted for its refractive index is allowed to intervene at least between said optical guide plate and said display modules, said substance being an adhesive that is flexible.

45. The display device according to claim 44, wherein:
said display module is constructed by arranging two or more display components on a first principal surface of a module optical waveguide plate for introducing said light from said light source thereinto; and
a second substance having a light-transmitting property adjusted for its refractive index is allowed to intervene at least between said module optical waveguide plate and said display components.

46. The display device according to claim 45, wherein said module optical waveguide plate itself is used as an optical waveguide plate, and it serves as a constitutive component of said display component.

47. The display device according to claim 45, wherein said second substance having said light-transmitting property adjusted for its refractive index is an adhesive.

48. The display device according to claim 45, wherein said second substance having said light-transmitting property adjusted for its refractive index is matching oil.

49. The display device according to claim 42, wherein said optical guide plate includes a plurality of divided optical guide plates which are arranged in a matrix configuration, and said plurality of divided optical guide plates are secured to one another with an adhesive having a light-transmitting property adjusted for its refractive index.

50. The display device according to claim 49, wherein vertically ruled and/or horizontally ruled support members are allowed to intervene between at least two of said divided optical guide plates.

51. The display device according to claim 50, wherein said support members are formed to have a lattice-shaped configuration.

52. The display device according to claim 42, further comprising:
another optical guide plate arranged for a display surface of said main display device body, wherein:
a substance having a light-transmitting property adjusted for its refractive index is allowed to exist between said display surface and said another optical guide plate.

53. The display device according to claim 52, wherein said substance having said light-transmitting property adjusted for its refractive index is matching oil.

54. The display device according to claim 52, wherein said another optical guide plate is constructed such that a plurality of divided optical guide plates are arranged in a matrix configuration, and they are secured to one another with an adhesive having a light-transmitting property adjusted for its refractive index.

55. The display device according to claim 42, wherein:
said main display device body is accommodated in a vessel with at least one surface having transparency; and
a substance having a light-transmitting property adjusted for its refractive index is allowed to exist between a display surface of said main display device body and said surface of said vessel having said transparency.

56. The display device according to claim 55, wherein said vessel is filled therein with said substance having said light-transmitting property adjusted for its refractive index.

57. The display device according to claim 55, wherein another substance, which is different from said substance having said light-transmitting property adjusted for its refractive index, exists between said vessel and a surface opposite to said display surface of said main display device body.

58. The display device according to claim 55, wherein said substance having said light-transmitting property adjusted for its refractive index is matching oil.

59. The display device according to claim 57, wherein:
when said substance having said light-transmitting property adjusted for its refractive index is matching oil;
a seal member is allowed to intervene between said matching oil and said another substance.

60. The display device according to claim 55, wherein said vessel has at least a plate member for constructing said surface of said vessel having said transparency, said plate member including a plurality of divided plates arranged in a matrix configuration and secured to one another with an adhesive having a light-transmitting property adjusted for its refractive index.

61. The display device according to claim 42, wherein said optical guide plate is constructed by a transparent vessel having a hollow section.

62. The display device according to claim 61, wherein at least a front panel of said vessel for projecting a display image thereon includes a plurality of divided plates arranged in a matrix configuration and secured to one another with an adhesive having a light-transmitting property adjusted for its refractive index.

63. The display device according to claim 61, wherein said hollow section is filled with a substance having a light-transmitting property adjusted for its refractive index.

64. The display device according to claim 63, wherein said substance having said light-transmitting property adjusted for its refractive index is matching oil.

65. A method for producing a display device, comprising allowing display surfaces of display components to be opposed to a first principal surface of an optical guide plate for introducing light from a light source thereinto, and allowing a substance having a light-transmitting property adjusted for its refractive index to intervene between surfaces, said substance being an adhesive that is flexible, wherein said display components are arranged along said first principal surface to produce a main display device body.

66. A method for producing a display device, comprising allowing display surfaces of display modules to be opposed to a first principal surface of an optical guide plate for introducing light from a light source thereinto, and allowing a substance having a light-transmitting property adjusted for its refractive index to intervene between said surfaces, said substance being an adhesive that is flexible, wherein said display modules are arranged along said first principal surface to produce a main display device body.

67. The method for producing said display device according to claim 66, wherein display surfaces of display components are allowed to be opposed to a first principal surface of a module optical waveguide plate for introducing said light from said light source thereinto, and a second substance having a light-transmitting property adjusted for its refractive index is allowed to intervene between said surfaces, while said display components are arranged along said first principal surface of said module optical waveguide plate to produce said display module.

68. The method for producing said display device according to claim 65, wherein said optical guide plate is produced by arranging a plurality of divided optical guide plates in a matrix configuration, and securing them to one another with an adhesive having a light-transmitting transmitting property adjusted for its refractive index.

69. The method for producing said display device according to claim 65, wherein a surface of said optical guide plate is coated with a hard coating material.

70. The method for producing said display device according to claim 65, wherein an end surface of said optical guide plate is mirror-finished so that Rmax is not more than 0.3.

71. The method for producing said display device according to claim 65, wherein:
when said optical guide plate is machined;
dimensional accuracy of said optical guide plate is not more than ±0.1 mm with respect to a reference dimension of 100 mm, perpendicularity between end surfaces and between said end surface and a flat surface is not more than 0.1 mm, and parallelism between said end surfaces and between said flat surfaces is not more than 0.1 mm.

72. The method for producing said display device according to claim 67, wherein at least an adhesive is used as said second substance having said light-transmitting property adjusted for its refractive index.

73. The method for producing said display device according to claim 67, wherein at least matching oil is used as said second substance having said light-transmitting property adjusted for its refractive index.

74. The method for producing said display device according to claim 68, wherein:
before said plurality of divided optical guide plates are arranged in said matrix configuration;
vertically ruled and/or horizontally ruled support members are installed, and said support members are interposed between at least two of said divided optical guide plates to produce said display device.

75. The method for producing said display device according to claim 74, wherein at least a surface of said support member, to which an end surface of said divided optical guide plate is opposed, is mirror-finished so that Rmax is not more than 0.3.

76. The method for producing said display device according to claim 65, wherein:
another optical guide plate having a large size is prepared; and
a display surface of said main display device body is allowed to be opposed to a first principal surface of said another optical guide plate, and a substance having a light-transmitting property adjusted for its refractive index is allowed to intervene between said surfaces to produce said display device thereby.

77. The method for producing said display device according to claim 76, wherein said another optical guide plate to be used is constructed by a transparent vessel which is filled with a substance having a light-transmitting property adjusted for its refractive index at the inside.

78. The method for producing said display device according to claim 65, wherein:

said main display device body is accommodated in a vessel with at least one surface having transparency; and said vessel is filled therein with a substance having a light-transmitting property adjusted for its refractive index to produce said display device.

79. The method for producing said display device according to claim 65, wherein:

a display surface of said main display device body is allowed to be opposed to a first principal surface of a plate member having transparency, and a substance having a light-transmitting property adjusted for its refractive index is allowed to intervene between said surfaces so that said main display device body is fixed;

a vessel including said plate member as one constitutive component is produced; and said vessel is filled therein with said substance having said light-transmitting property adjusted for its refractive index to produce said display device.

80. The method for producing said display device according to claim 65, wherein:

a display surface of said main display device body is allowed to be opposed to a first principal surface of a plate member having transparency, and a substance having a light-transmitting property adjusted for its refractive index is allowed to intervene between said surfaces so that said main display device body is fixed;

a vessel including said plate member as one constitutive component is produced; and said vessel is filled therein with another substance which is different from said substance having said light-transmitting property adjusted for its refractive index to produce said display device.

81. The method for producing said display device according to claim 79, wherein said plate member is produced by arranging a plurality of divided plates in a matrix configuration, and securing them to one another with an adhesive having a light-transmitting property adjusted for its refractive index.

* * * * *

UNITED STATES PATENT AND TRADEMARK OFFICE
CERTIFICATE OF CORRECTION

PATENT NO.    : 6,453,100 B1
DATED         : September 17, 2002
INVENTOR(S)   : Yukihisa Takeuchi et al.

It is certified that error appears in the above-identified patent and that said Letters Patent is hereby corrected as shown below:

<u>Title page,</u>
Item [75], Inventors: "Twao Ohwada, Nagoya" should read as follows:
-- Iwao Ohwada, Nagoya --

Signed and Sealed this

Twenty-eighth Day of January, 2003

JAMES E. ROGAN
*Director of the United States Patent and Trademark Office*